United States Patent
Thompson et al.

(10) Patent No.: US 11,999,419 B2
(45) Date of Patent: Jun. 4, 2024

(54) TRACK SYSTEM FOR TRACTION OF A VEHICLE

(71) Applicant: CAMSO INC., Magog (CA)

(72) Inventors: Ronald H. Thompson, Greenville, SC (US); Jeremie Zuchoski, Sherbrooke (CA)

(73) Assignee: CAMSO INC., Magog (CA)

( * ) Notice: Subject to any disclaimer, the term of this patent is extended or adjusted under 35 U.S.C. 154(b) by 799 days.

(21) Appl. No.: 16/063,102

(22) PCT Filed: Dec. 16, 2016

(86) PCT No.: PCT/US2016/067327
§ 371 (c)(1),
(2) Date: Jun. 15, 2018

(87) PCT Pub. No.: WO2017/106750
PCT Pub. Date: Jun. 22, 2017

(65) Prior Publication Data
US 2020/0277012 A1    Sep. 3, 2020

Related U.S. Application Data

(60) Provisional application No. 62/268,309, filed on Dec. 16, 2015.

(51) Int. Cl.
*B62D 55/10* (2006.01)
*B60C 7/14* (2006.01)
(Continued)

(52) U.S. Cl.
CPC ............ *B62D 55/10* (2013.01); *B60C 7/143* (2013.01); *B60C 7/146* (2021.08); *B62D 55/12* (2013.01);
(Continued)

(58) Field of Classification Search
CPC ..... B60C 7/14; B60C 7/143; B60C 2007/146; B62D 55/10; B62D 55/14; B62D 55/202; B62D 55/26; B62D 55/12
See application file for complete search history.

(56) References Cited

U.S. PATENT DOCUMENTS 2,704,102 A    3/1955  Starr et al.
3,494,402 A    2/1970  Goldberger
(Continued)

FOREIGN PATENT DOCUMENTS

CA    2458002    8/2010
CA    2651523    2/2012
(Continued)

OTHER PUBLICATIONS

International Search Report dated Nov. 3, 2014 in connection with International Application No. PCT/US2014/042327.
(Continued)

*Primary Examiner* — Jason R Bellinger
(74) *Attorney, Agent, or Firm* — Hahn Loeser & Parks LLP; Bret A. Hrivnak

(57) ABSTRACT

A track system for traction of a vehicle (e.g., an all-terrain vehicle (ATV), an agricultural vehicle, etc.) may be designed (e.g., may comprise non-pneumatic tires) to enhance its use or performance and/or that of the vehicle such as, for example, by being lightweight and/or by better handling loads, including, for instance, those resulting from track tension within the track system and/or from unevenness or other aspects of the ground, including encounters (e.g., impacts) with obstacles on the ground (e.g., rocks, portions of trees, debris, bumps, abrupt changes in ground level, etc.). The track system may comprise tension-based non-pneumatic tires.

31 Claims, 37 Drawing Sheets

(51) Int. Cl.
  *B62D 55/12* (2006.01)
  *B62D 55/14* (2006.01)
  *B62D 55/20* (2006.01)
  *B62D 55/26* (2006.01)
  *B62D 55/30* (2006.01)

(52) U.S. Cl.
  CPC ........... *B62D 55/14* (2013.01); *B62D 55/202* (2013.01); *B62D 55/26* (2013.01); *B62D 55/305* (2013.01)

(56) References Cited

U.S. PATENT DOCUMENTS

| | | |
|---|---|---|
| 3,804,144 A | 4/1974 | Sand, Sr. |
| 3,814,158 A | 6/1974 | Ryder |
| 3,827,792 A | 8/1974 | Hollins |
| 3,901,300 A | 8/1975 | Toplis |
| 3,907,370 A | 9/1975 | Bard |
| 3,957,101 A | 5/1976 | Ippen et al. |
| 4,164,251 A | 8/1979 | Chung |
| 4,169,494 A | 10/1979 | Kubica et al. |
| 4,201,744 A | 5/1980 | Makinson |
| 4,226,273 A | 10/1980 | Long et al. |
| 4,235,270 A | 11/1980 | Kahaner et al. |
| 4,244,413 A | 1/1981 | Takahashi et al. |
| 4,253,893 A | 3/1981 | Clinefelter |
| 4,262,724 A | 4/1981 | Sarkissian |
| 4,273,176 A | 6/1981 | Wyman et al. |
| 4,281,700 A | 8/1981 | Ross |
| 4,287,927 A | 9/1981 | Caravito et al. |
| 4,310,042 A | 1/1982 | Wyman et al. |
| 4,345,633 A | 8/1982 | Gilmore |
| 4,350,196 A | 9/1982 | Hampshire |
| 4,387,071 A | 6/1983 | Kirkhuff |
| 4,446,903 A | 5/1984 | Clinefelter et al. |
| 4,471,827 A | 7/1984 | Czapar |
| 4,558,727 A | 12/1985 | Golata et al. |
| 4,580,610 A | 4/1986 | Jackson |
| 4,705,087 A | 11/1987 | Markow |
| 4,739,810 A | 4/1988 | Markow |
| 4,773,461 A | 9/1988 | Landers et al. |
| 4,784,201 A | 11/1988 | Palinkas et al. |
| 4,832,098 A | 5/1989 | Palinkas et al. |
| 4,867,217 A | 9/1989 | Laurent |
| 4,917,162 A | 4/1990 | De Longcamp |
| 4,921,029 A | 5/1990 | Palinkas et al. |
| 4,934,425 A | 6/1990 | Gajewski et al. |
| 4,945,962 A | 8/1990 | Pajtas |
| 4,966,212 A | 10/1990 | Hill |
| 5,022,718 A | 6/1991 | Diekevers |
| 5,023,040 A | 6/1991 | Gajewski et al. |
| 5,024,028 A | 6/1991 | Pierce et al. |
| 5,042,544 A | 8/1991 | Dehasse |
| 5,050,656 A | 9/1991 | Ho |
| 5,086,815 A | 2/1992 | Panaroni et al. |
| 5,090,464 A | 2/1992 | Kauzlarich et al. |
| 5,139,066 A | 8/1992 | Jarman |
| 5,168,910 A | 12/1992 | Zhang et al. |
| 5,174,634 A | 12/1992 | Blanck et al. |
| 5,223,599 A | 6/1993 | Gajewski |
| 5,236,027 A | 8/1993 | Lu |
| 5,265,659 A | 11/1993 | Pajtas et al. |
| 5,313,994 A | 5/1994 | Hill et al. |
| 5,343,916 A | 9/1994 | Duddey et al. |
| 5,353,853 A | 10/1994 | Hansson |
| 5,460,213 A | 10/1995 | Pajtas |
| 5,494,090 A | 2/1996 | Kejha |
| 5,520,232 A | 5/1996 | Fukutake et al. |
| 5,676,900 A | 10/1997 | Pajtas |
| 5,743,316 A | 4/1998 | Chrobak |
| 5,879,482 A | 3/1999 | Rooney et al. |
| 6,068,353 A | 5/2000 | Juncker et al. |
| 6,095,216 A | 8/2000 | Cenni |
| 6,167,931 B1 | 1/2001 | Hsiao |
| 6,170,544 B1 | 1/2001 | Hottebart |
| 6,279,630 B1 | 8/2001 | Herbert IMS |
| 6,298,891 B1 | 10/2001 | Harris |
| 6,364,424 B1 | 1/2002 | Lashlee et al. |
| 6,431,235 B1 | 8/2002 | Steinke |
| 6,450,222 B1 | 9/2002 | Fleming |
| 6,530,404 B1 | 3/2003 | Rooney |
| 6,540,629 B2 * | 4/2003 | Redmond ................. F16H 7/20 474/135 |
| 6,615,885 B1 | 9/2003 | Ohm |
| 6,617,383 B2 | 9/2003 | Msahiro |
| 6,640,859 B1 | 11/2003 | Laurent et al. |
| 6,640,861 B2 | 11/2003 | Pereira et al. |
| 6,681,822 B2 | 1/2004 | Adams et al. |
| 6,698,480 B1 | 3/2004 | Cornellier |
| 6,767,495 B2 | 7/2004 | Aperce et al. |
| 6,769,465 B2 | 8/2004 | Rhyne et al. |
| 6,769,746 B2 | 8/2004 | Rodgers et al. |
| 6,820,942 B1 | 11/2004 | Knack |
| 6,983,776 B2 | 1/2006 | Thompson et al. |
| 6,994,134 B2 | 2/2006 | Grah |
| 6,994,135 B2 | 2/2006 | Delfino et al. |
| 7,013,939 B2 | 3/2006 | Rhyne et al. |
| 7,032,634 B2 | 4/2006 | Laurent et al. |
| 7,032,637 B2 | 4/2006 | Meraldi |
| 7,044,180 B2 | 5/2006 | Rhyne et al. |
| 7,066,225 B2 | 6/2006 | Rhyne et al. |
| 7,128,794 B2 | 10/2006 | Veas |
| 7,159,632 B2 | 1/2007 | Fukui |
| 7,201,194 B2 | 4/2007 | Rhyne et al. |
| 7,231,948 B2 | 6/2007 | Forney et al. |
| 7,281,558 B2 | 10/2007 | Merino Lopez |
| 7,329,325 B2 | 2/2008 | Prost |
| 7,418,988 B2 | 9/2008 | Cron et al. |
| 7,473,472 B2 | 1/2009 | Chenaux et al. |
| 7,506,878 B2 | 3/2009 | Feick |
| 7,546,862 B2 | 6/2009 | Moon et al. |
| 7,604,029 B2 | 10/2009 | Myatt |
| 7,650,919 B2 | 1/2010 | Rhyne et al. |
| 7,743,806 B2 | 6/2010 | Abe |
| 7,832,263 B2 | 11/2010 | Rensel et al. |
| 7,950,428 B2 | 5/2011 | Hanada et al. |
| 7,950,429 B2 | 5/2011 | Re Fiorentin et al. |
| 8,056,593 B2 | 11/2011 | Palinkas et al. |
| 8,061,398 B2 | 11/2011 | Palinkas et al. |
| 8,091,596 B2 | 1/2012 | Louden |
| 8,104,524 B2 | 1/2012 | Manesh et al. |
| 8,109,308 B2 | 2/2012 | Manesh et al. |
| 8,113,253 B2 | 2/2012 | Arakawa et al. |
| 8,141,606 B2 | 3/2012 | Benzing, II et al. |
| 8,166,809 B2 | 5/2012 | Weston |
| 8,176,957 B2 | 5/2012 | Manesh et al. |
| 8,207,286 B2 | 6/2012 | Rukavina |
| 8,215,351 B2 | 7/2012 | Thompson |
| 8,240,782 B2 * | 8/2012 | Bessette ................. B62D 55/14 305/131 |
| 8,276,628 B2 | 10/2012 | Hanada et al. |
| 8,277,590 B2 | 10/2012 | Delfino et al. |
| 8,347,991 B2 * | 1/2013 | Zuchoski ................ B62D 49/06 180/9.25 |
| 8,419,408 B2 | 4/2013 | Wang |
| 8,476,808 B2 | 7/2013 | Weston et al. |
| 8,491,981 B2 * | 7/2013 | Delfino ..................... B60C 7/14 428/113 |
| 8,517,068 B2 | 8/2013 | Delfino et al. |
| 8,544,515 B2 | 10/2013 | Ma et al. |
| 8,555,941 B2 | 10/2013 | Chadwick et al. |
| 8,567,461 B2 | 10/2013 | Williams et al. |
| 8,578,607 B2 | 11/2013 | Kim |
| 8,585,947 B2 | 11/2013 | Meraldi et al. |
| 8,609,220 B2 | 12/2013 | Summers et al. |
| 8,623,169 B2 | 1/2014 | Delfino et al. |
| 8,631,844 B2 | 1/2014 | Anderfaas et al. |
| 8,636,490 B2 | 1/2014 | Martin et al. |
| 8,646,497 B2 | 2/2014 | Cron |
| 8,651,156 B2 | 2/2014 | Fadel et al. |
| 8,662,122 B2 | 3/2014 | Benzing, II |
| 8,672,006 B2 | 3/2014 | Moon |
| 8,688,421 B2 | 4/2014 | Summers et al. |
| 8,714,217 B2 | 5/2014 | Chon et al. |

(56) References Cited

U.S. PATENT DOCUMENTS

| | | |
|---|---|---|
| 8,720,504 B2 | 5/2014 | Benzing, II et al. |
| 8,720,505 B2 | 5/2014 | Fiorentin et al. |
| 8,742,265 B2 | 6/2014 | Weston et al. |
| 8,746,302 B2 | 6/2014 | Sachdev et al. |
| 8,783,310 B2 | 7/2014 | Abe |
| D711,815 S | 8/2014 | Abe et al. |
| 8,813,797 B2 | 8/2014 | Anderson et al. |
| 8,827,383 B2 | 9/2014 | Simula |
| 8,851,131 B2 | 10/2014 | Luchini et al. |
| 8,863,798 B2 | 10/2014 | Re Fiorentin et al. |
| 8,883,283 B2 | 11/2014 | Delfino et al. |
| 8,919,404 B2 | 12/2014 | Schweitzer et al. |
| 8,931,531 B2 | 1/2015 | Kubeck et al. |
| 8,950,451 B2 | 2/2015 | Abe |
| 8,960,248 B2 | 2/2015 | Cron et al. |
| 8,962,120 B2 | 2/2015 | Delfino et al. |
| 8,944,125 B2 | 3/2015 | Manesh et al. |
| 8,978,723 B2 | 3/2015 | McCulley |
| 8,991,455 B2 | 3/2015 | Cron |
| 8,999,480 B2 | 4/2015 | Summers et al. |
| 9,004,127 B2 | 4/2015 | Manesh et al. |
| 9,004,901 B2 | 4/2015 | Wilson |
| 9,016,336 B2 | 4/2015 | Benzing, II et al. |
| 9,027,615 B2 | 5/2015 | Dermience et al. |
| D731,958 S | 6/2015 | Kiwaki |
| 9,090,121 B2 | 7/2015 | Korus et al. |
| 9,108,470 B2 | 8/2015 | Tercha et al. |
| 9,120,351 B2 | 9/2015 | Mun et al. |
| 9,139,045 B2 | 9/2015 | Palinkas et al. |
| 9,144,946 B2 | 9/2015 | Creasap et al. |
| 9,149,994 B2 | 10/2015 | Martin et al. |
| 9,156,313 B2 | 10/2015 | Thompson |
| 9,162,407 B2 | 10/2015 | Martin et al. |
| 9,180,732 B2 | 11/2015 | Endicott |
| 9,180,737 B2 | 11/2015 | Amstutz et al. |
| 9,186,934 B2 | 11/2015 | Korus |
| 9,205,706 B2 | 12/2015 | Kline et al. |
| 9,242,509 B2 | 1/2016 | Chang |
| 9,242,510 B2 | 1/2016 | Korus |
| 9,248,697 B2 | 2/2016 | Iwamura |
| 9,254,716 B2 | 2/2016 | Cron et al. |
| 9,266,388 B2 | 2/2016 | Schaedler et al. |
| 9,266,506 B2 | 2/2016 | Korus et al. |
| 9,272,576 B2 | 3/2016 | Dotson et al. |
| 9,278,494 B2 | 3/2016 | Anderson et al. |
| 9,283,806 B2 | 3/2016 | Korus et al. |
| 9,283,810 B2 | 3/2016 | Korus et al. |
| 9,283,811 B2 | 3/2016 | Kim |
| 9,290,045 B2 | 3/2016 | Cron et al. |
| 9,290,053 B2 | 3/2016 | Choi et al. |
| 9,290,054 B2 | 3/2016 | Pfrenger et al. |
| 9,290,059 B2 | 3/2016 | Fredenburg et al. |
| 9,302,539 B2 | 4/2016 | Korus et al. |
| 9,321,312 B2 | 4/2016 | Asper |
| 9,333,799 B2 | 5/2016 | Choi et al. |
| 9,346,317 B2 | 5/2016 | Dotson et al. |
| 9,346,499 B2 | 5/2016 | Rudakevych et al. |
| 9,352,617 B2 | 5/2016 | Zhang |
| 9,358,704 B2 | 6/2016 | Kagota et al. |
| 9,381,773 B2 | 7/2016 | Seljan |
| 9,387,637 B2 | 7/2016 | Martin et al. |
| 9,387,726 B2 | 7/2016 | Choi et al. |
| 9,393,835 B2 | 7/2016 | Dotson et al. |
| D763,785 S | 8/2016 | Abe et al. |
| 9,421,820 B2 | 8/2016 | Wilson et al. |
| 9,440,404 B2 | 9/2016 | Martin |
| 9,440,494 B2 | 9/2016 | Asper |
| 9,463,603 B2 | 10/2016 | Chadwick et al. |
| 9,463,668 B2 | 10/2016 | Fredenburg et al. |
| 9,475,244 B2 | 10/2016 | Williams et al. |
| 9,475,379 B2 | 10/2016 | Imamiya et al. |
| 9,481,208 B2 | 11/2016 | Matsuda et al. |
| 9,487,046 B2 | 11/2016 | Amstutz et al. |
| 9,487,052 B1 | 11/2016 | Asper |
| 9,487,892 B2 | 11/2016 | Abad |
| 9,493,045 B2 | 11/2016 | Cron et al. |
| 9,511,625 B2 | 12/2016 | Nishida et al. |
| 9,511,631 B2 | 12/2016 | Fudemoto et al. |
| 9,511,632 B2 | 12/2016 | Fudemoto et al. |
| 9,550,393 B2 | 1/2017 | Abe et al. |
| 9,573,422 B2 | 2/2017 | Gass et al. |
| 9,573,622 B2 | 2/2017 | Fujita et al. |
| 9,604,497 B2 | 3/2017 | Korus et al. |
| 9,616,703 B2 | 4/2017 | Nishida et al. |
| 9,616,713 B2 | 4/2017 | Lettieri et al. |
| 9,623,702 B2 | 4/2017 | Fudemoto et al. |
| 9,643,453 B2 | 5/2017 | Dotson et al. |
| 9,662,936 B2 | 5/2017 | Slanker et al. |
| 9,662,939 B2 | 5/2017 | Manesh et al. |
| 9,713,940 B2 | 7/2017 | Nishida et al. |
| 9,718,306 B2 | 8/2017 | Korus et al. |
| 9,731,556 B2 | 8/2017 | Martin et al. |
| 9,751,270 B2 | 9/2017 | Thompson |
| 9,758,002 B2 | 9/2017 | Carter et al. |
| 9,776,454 B2 | 10/2017 | Chen |
| 9,821,601 B2 | 11/2017 | Korus et al. |
| 9,834,040 B2 | 12/2017 | Benzing, II et al. |
| 10,166,732 B2 | 1/2019 | Thompson et al. |
| 10,953,696 B2 | 3/2021 | Thompson |
| 11,014,316 B2 | 5/2021 | Thompson |
| 2003/0201043 A1 | 10/2003 | Adams et al. |
| 2004/0007300 A1 | 1/2004 | Foucher |
| 2004/0012246 A1 | 1/2004 | Rhyne et al. |
| 2004/0112491 A1 | 6/2004 | Grah |
| 2006/0005903 A1 | 1/2006 | Fry et al. |
| 2006/0040077 A1 | 2/2006 | Wilson et al. |
| 2006/0060280 A1 | 3/2006 | Ladouce et al. |
| 2006/0102264 A1 | 5/2006 | Nicolas |
| 2006/0113016 A1 | 6/2006 | Cron et al. |
| 2006/0169797 A1 | 8/2006 | Kaltenheuser |
| 2006/0201597 A1 | 9/2006 | Lacour |
| 2006/0249235 A1 | 11/2006 | Lacour |
| 2007/0119531 A1 | 5/2007 | Steinke et al. |
| 2007/0200265 A1 | 8/2007 | Forney, III et al. |
| 2007/0267116 A1 | 11/2007 | Rhyne et al. |
| 2008/0029215 A1 | 2/2008 | Delfino et al. |
| 2008/0257463 A1 | 10/2008 | Re Fiorentin et al. |
| 2009/0107596 A1 | 4/2009 | Palinkas et al. |
| 2009/0183810 A1 | 7/2009 | Vannan et al. |
| 2009/0211677 A1 | 8/2009 | Palinkas et al. |
| 2009/0211678 A1 | 8/2009 | Palinkas et al. |
| 2009/0211681 A1 | 8/2009 | Palinkas et al. |
| 2009/0250149 A1 | 10/2009 | Sebe |
| 2009/0294000 A1 | 12/2009 | Cron |
| 2009/0301625 A1 | 12/2009 | Moon et al. |
| 2010/0071819 A1 | 3/2010 | McCulley |
| 2010/0078111 A1 | 4/2010 | Anderson et al. |
| 2010/0132858 A1 | 6/2010 | Arakawa et al. |
| 2010/0132865 A1 | 6/2010 | Iwase et al. |
| 2010/0154948 A1 | 6/2010 | Dahlberg et al. |
| 2010/0193097 A1 | 8/2010 | McNier et al. |
| 2010/0200131 A1 | 8/2010 | Iwase et al. |
| 2010/0276990 A1* | 11/2010 | Zuchoski ............ B62D 55/084 305/130 |
| 2011/0017377 A1 | 1/2011 | Albert et al. |
| 2011/0079336 A1 | 4/2011 | Thenault et al. |
| 2011/0104428 A1 | 5/2011 | Delfino et al. |
| 2011/0146872 A1 | 6/2011 | Tercha et al. |
| 2011/0180194 A1 | 7/2011 | Anderson et al. |
| 2011/0240193 A1 | 10/2011 | Matsuda et al. |
| 2011/0253281 A1 | 10/2011 | Christenbury |
| 2011/0260525 A1 | 10/2011 | Delfino et al. |
| 2011/0265926 A1 | 11/2011 | De Staercke |
| 2011/0278911 A1 | 11/2011 | Funaki |
| 2012/0038206 A1 | 2/2012 | Chadwick et al. |
| 2012/0038207 A1 | 2/2012 | Williams et al. |
| 2012/0193004 A1 | 8/2012 | Anderson et al. |
| 2012/0216932 A1 | 8/2012 | Cron et al. |
| 2012/0234444 A1 | 9/2012 | Palinkas et al. |
| 2012/0234445 A1 | 9/2012 | Manesh et al. |
| 2012/0241531 A1 | 9/2012 | Werner |
| 2012/0247635 A1 | 10/2012 | Manesh et al. |
| 2012/0261204 A1 | 10/2012 | Won |
| 2012/0318421 A1 | 12/2012 | Matsuda et al. |

(56) References Cited

U.S. PATENT DOCUMENTS

| | | |
|---|---|---|
| 2013/0048171 A1 | 2/2013 | Sandstrom et al. |
| 2013/0048174 A1 | 2/2013 | Cron |
| 2013/0150516 A1 | 6/2013 | Lettow |
| 2013/0167990 A1 | 7/2013 | Bae |
| 2013/0233458 A1 | 9/2013 | Meraldi et al. |
| 2013/0240097 A1 | 9/2013 | Cron et al. |
| 2013/0248067 A1 | 9/2013 | Delfino et al. |
| 2013/0276968 A1 | 10/2013 | Moore |
| 2013/0278045 A1 | 10/2013 | Dotson |
| 2013/0284329 A1 | 10/2013 | Wilson et al. |
| 2013/0340902 A1 | 12/2013 | Kemeny |
| 2014/0034219 A1 | 2/2014 | Chadwick et al. |
| 2014/0062168 A1 | 3/2014 | Martin et al. |
| 2014/0062169 A1 | 3/2014 | Martin et al. |
| 2014/0062170 A1 | 3/2014 | Martin et al. |
| 2014/0062171 A1 | 3/2014 | Martin et al. |
| 2014/0062172 A1 | 3/2014 | Martin et al. |
| 2014/0070460 A1 | 3/2014 | Martin et al. |
| 2014/0083581 A1 | 3/2014 | Schaedler et al. |
| 2014/0110028 A1 | 4/2014 | Benzing, II |
| 2014/0159280 A1 | 6/2014 | Martin et al. |
| 2014/0191564 A1 | 7/2014 | Gebeau |
| 2014/0191565 A1 | 7/2014 | Gebeau |
| 2014/0205836 A1 | 7/2014 | Hidrot et al. |
| 2014/0238561 A1 | 8/2014 | Choi et al. |
| 2014/0246135 A1 | 9/2014 | Andrews |
| 2014/0251518 A1 | 9/2014 | Abe et al. |
| 2014/0288763 A1 | 9/2014 | Bennett et al. |
| 2014/0326374 A1 | 11/2014 | Cron et al. |
| 2014/0367007 A1 | 12/2014 | Thompson |
| 2015/0007926 A1 | 1/2015 | Sandstrom et al. |
| 2015/0013871 A1 | 1/2015 | McEwen et al. |
| 2015/0034222 A1 | 2/2015 | Martin et al. |
| 2015/0034225 A1 | 2/2015 | Martin |
| 2015/0048547 A1 | 2/2015 | Benzing, II |
| 2015/0083296 A1 | 3/2015 | Asper |
| 2015/0096654 A1 | 4/2015 | Sandstrom et al. |
| 2015/0122385 A1 | 5/2015 | Cron et al. |
| 2015/0158337 A1 | 6/2015 | Korus et al. |
| 2015/0174953 A1 | 6/2015 | Cron et al. |
| 2015/0191157 A1 | 7/2015 | Korus et al. |
| 2015/0210025 A1 | 7/2015 | Martin |
| 2015/0246577 A1 | 9/2015 | Fudemoto et al. |
| 2015/0251493 A1 | 9/2015 | Ma |
| 2015/0273945 A1 | 10/2015 | Fudemoto et al. |
| 2015/0273946 A1 | 10/2015 | Abe et al. |
| 2015/0283852 A1 | 10/2015 | Chen et al. |
| 2015/0283856 A1 | 10/2015 | Pfrenger et al. |
| 2015/0291234 A1 | 10/2015 | Zuchoski et al. |
| 2015/0343840 A1 | 12/2015 | Kinney et al. |
| 2015/0343845 A1 | 12/2015 | Kinney et al. |
| 2016/0016426 A1 | 1/2016 | Endicott |
| 2016/0031137 A1 | 2/2016 | Wilson |
| 2016/0046091 A1 | 2/2016 | Kinney et al. |
| 2016/0046092 A1 | 2/2016 | Kinney et al. |
| 2016/0046153 A1 | 2/2016 | Yoo |
| 2016/0046154 A1 | 2/2016 | Kim |
| 2016/0096400 A1 | 4/2016 | Nomura et al. |
| 2016/0107402 A1 | 4/2016 | Cron et al. |
| 2016/0121656 A1 | 5/2016 | Sugiya et al. |
| 2016/0128266 A1 | 5/2016 | Phely et al. |
| 2016/0152078 A1 | 6/2016 | Korus et al. |
| 2016/0159150 A1 | 6/2016 | Pfrenger et al. |
| 2016/0159152 A1 | 6/2016 | Delfino et al. |
| 2016/0167434 A1 | 6/2016 | Nishida et al. |
| 2016/0193876 A1 | 7/2016 | Kyo et al. |
| 2016/0193877 A1 | 7/2016 | Jang et al. |
| 2016/0200144 A1 | 7/2016 | Iwamura et al. |
| 2016/0214435 A1 | 7/2016 | Schaedler |
| 2016/0221284 A1 | 8/2016 | Andrews et al. |
| 2016/0236514 A1 | 8/2016 | Abe |
| 2016/0250893 A1 | 9/2016 | Shoji et al. |
| 2016/0257170 A1 | 9/2016 | Sugiya et al. |
| 2016/0272006 A1 | 9/2016 | Abe |
| 2016/0280005 A1 | 9/2016 | Cron et al. |
| 2016/0288569 A1 | 10/2016 | Parfondry et al. |
| 2016/0297244 A1 | 10/2016 | Abe |
| 2016/0303812 A1 | 10/2016 | LePretre et al. |
| 2016/0311479 A1 | 10/2016 | Rudakevych |
| 2016/0312014 A1 | 10/2016 | Lemerle et al. |
| 2016/0318342 A1 | 11/2016 | Delfino |
| 2016/0319111 A1 | 11/2016 | Chouvel et al. |
| 2016/0347119 A1 | 12/2016 | Quiroz |
| 2017/0001470 A1 | 1/2017 | Merino Lopez |
| 2017/0008338 A1 | 1/2017 | Merino Lopez |
| 2017/0008341 A1 | 1/2017 | Martin |
| 2017/0008342 A1* | 1/2017 | Martin .................. B60C 7/14 |
| 2017/0015134 A1 | 1/2017 | Ma |
| 2017/0015141 A1 | 1/2017 | Shoji et al. |
| 2017/0057288 A1 | 3/2017 | Sugiya et al. |
| 2017/0057289 A1 | 3/2017 | Pratt |
| 2017/0057294 A1 | 3/2017 | Iwamura et al. |
| 2017/0072746 A1 | 3/2017 | Iwamura et al. |
| 2017/0080756 A1 | 3/2017 | Van Riper et al. |
| 2017/0087930 A1 | 3/2017 | McMaster et al. |
| 2017/0087931 A1 | 3/2017 | Gaylo et al. |
| 2017/0087937 A1 | 3/2017 | Korus et al. |
| 2017/0096032 A1 | 4/2017 | Iwamura et al. |
| 2017/0106699 A1 | 4/2017 | Iwamura et al. |
| 2017/0113484 A1 | 4/2017 | Iwamura et al. |
| 2017/0113488 A1 | 4/2017 | Iwamura et al. |
| 2017/0113490 A1 | 4/2017 | Iwamura et al. |
| 2017/0113491 A1 | 4/2017 | Iwamura et al. |
| 2017/0120671 A1 | 5/2017 | Miles et al. |
| 2017/0120680 A1 | 5/2017 | Takahashi et al. |
| 2017/0120681 A1 | 5/2017 | Toyosawa |
| 2017/0129285 A1 | 5/2017 | Toyosawa |
| 2017/0136814 A1 | 5/2017 | Abe et al. |
| 2017/0157983 A1 | 6/2017 | Siegel |
| 2017/0157984 A1 | 6/2017 | Van Riper et al. |
| 2017/0166002 A1 | 6/2017 | Benzing, II et al. |
| 2017/0174002 A1 | 6/2017 | Downing |
| 2017/0174003 A1 | 6/2017 | Benzing, II et al. |
| 2017/0174004 A1 | 6/2017 | Benzing, II et al. |
| 2017/0174005 A1 | 6/2017 | Van Riper et al. |
| 2017/0197467 A1 | 7/2017 | Iwamura et al. |
| 2017/0232787 A1 | 8/2017 | Hasegawa et al. |
| 2017/0239994 A1 | 8/2017 | Raulerson et al. |
| 2017/0253084 A1 | 9/2017 | Takahashi et al. |
| 2017/0267028 A1 | 9/2017 | Pfrenger et al. |
| 2017/0291453 A1 | 10/2017 | Sugiya et al. |
| 2017/0297370 A1 | 10/2017 | Korus et al. |
| 2017/0297371 A1 | 10/2017 | Sportelli |
| 2017/0297372 A1 | 10/2017 | Talbot et al. |
| 2017/0297373 A1 | 10/2017 | Sportelli et al. |
| 2017/0297374 A1 | 10/2017 | Sportelli |
| 2017/0305192 A1 | 10/2017 | Yokoyama |
| 2017/0305195 A1 | 10/2017 | Takahashi et al. |
| 2017/0326915 A1 | 11/2017 | Son et al. |
| 2017/0334245 A1 | 11/2017 | Laskowitz |
| 2017/0368775 A1 | 12/2017 | Thompson |
| 2018/0001699 A1 | 1/2018 | Shoji |
| 2018/0029422 A1 | 1/2018 | Thompson |
| 2019/0111645 A1 | 4/2019 | Thompson |
| 2019/0375239 A1* | 12/2019 | Thompson ............... B60C 7/00 |
| 2020/0009916 A1 | 1/2020 | Thompson et al. |
| 2020/0114687 A1* | 4/2020 | Thompson ............... B60C 7/18 |
| 2020/0276861 A1* | 9/2020 | Thompson ............... B60B 9/26 |
| 2020/0331221 A1* | 10/2020 | Thompson ......... B29D 30/0678 |
| 2022/0072907 A1 | 3/2022 | Thompson |

FOREIGN PATENT DOCUMENTS

| | | |
|---|---|---|
| CA | 2915483 | 12/2014 |
| CA | 2976055 | 8/2016 |
| CA | 3006801 | 6/2017 |
| CA | 3008828 | 6/2017 |
| CA | 3008846 | 6/2017 |
| EP | 0334522 | 9/1989 |
| EP | 0353006 | 1/1990 |
| EP | 0502353 | 9/1992 |
| EP | 1378377 | 1/2004 |
| EP | 2910387 | 8/2015 |
| EP | 3727881 | 10/2020 |

(56) References Cited

FOREIGN PATENT DOCUMENTS

| | | |
|---|---|---|
| EP | 3253591 | 6/2021 |
| EP | 3899824 | 7/2021 |
| JP | 3923073 | 5/2007 |
| JP | 2011-219009 | 11/2011 |
| NL | 2002956 | 12/2010 |
| WO | WO96/05917 | 2/1996 |
| WO | WO1996005917 | 2/1996 |
| WO | WO2000018592 | 4/2000 |
| WO | WO2000037269 | 6/2000 |
| WO | 2003037661 | 5/2003 |
| WO | WO2006022788 | 3/2006 |
| WO | 2008045098 | 4/2008 |
| WO | WO2008118983 | 10/2008 |
| WO | WO2009005945 | 1/2009 |
| WO | WO2009005946 | 1/2009 |
| WO | WO2009042460 | 4/2009 |
| WO | 2009135561 | 11/2009 |
| WO | WO2010138150 | 12/2010 |
| WO | WO2011011419 | 1/2011 |
| WO | WO2013095499 | 6/2013 |
| WO | WO2014036415 | 3/2014 |
| WO | WO2014039814 | 3/2014 |
| WO | WO2014093135 | 6/2014 |
| WO | WO2014172095 | 10/2014 |
| WO | 2015013036 | 1/2015 |
| WO | WO2015013036 | 1/2015 |
| WO | WO2015017100 | 2/2015 |
| WO | WO2015017133 | 2/2015 |
| WO | WO2015023969 | 2/2015 |
| WO | 2015058181 A1 | 4/2015 |
| WO | WO2015052987 | 4/2015 |
| WO | WO2015072222 | 5/2015 |
| WO | WO2015100080 | 7/2015 |
| WO | WO2015112417 | 7/2015 |
| WO | WO2015112720 | 7/2015 |
| WO | WO2015141579 | 9/2015 |
| WO | WO2015165777 | 11/2015 |
| WO | WO2015175002 | 11/2015 |
| WO | WO2015175003 | 11/2015 |
| WO | WO2015187394 | 12/2015 |
| WO | WO2015194087 | 12/2015 |
| WO | WO2015194088 | 12/2015 |
| WO | WO2015194277 | 12/2015 |
| WO | WO2015198387 | 12/2015 |
| WO | WO2015198637 | 12/2015 |
| WO | WO2016021300 | 2/2016 |
| WO | WO2016056444 | 4/2016 |
| WO | WO2016072181 | 5/2016 |
| WO | WO2016084512 | 6/2016 |
| WO | WO2016089480 | 6/2016 |
| WO | WO2016098477 | 6/2016 |
| WO | WO2016100004 | 6/2016 |
| WO | WO2016100005 | 6/2016 |
| WO | WO2016100006 | 6/2016 |
| WO | WO2016105654 | 6/2016 |
| WO | WO2016109557 | 7/2016 |
| WO | WO2016109648 | 7/2016 |
| WO | WO2016109702 | 7/2016 |
| WO | WO2016114167 | 7/2016 |
| WO | WO2016114168 | 7/2016 |
| WO | WO2016116457 | 7/2016 |
| WO | 2016126983 | 8/2016 |
| WO | WO2016123180 | 8/2016 |
| WO | WO2016148295 | 9/2016 |
| WO | WO2016152887 | 9/2016 |
| WO | WO2016189126 | 12/2016 |
| WO | WO2016189209 | 12/2016 |
| WO | WO2016203098 | 12/2016 |
| WO | WO2017024366 | 2/2017 |
| WO | WO2017035630 | 3/2017 |
| WO | WO2017039451 | 3/2017 |
| WO | WO2017039604 | 3/2017 |
| WO | WO2017040390 | 3/2017 |
| WO | WO2017052010 | 3/2017 |
| WO | WO2017061405 | 4/2017 |
| WO | WO2017067869 | 4/2017 |
| WO | WO2017072560 | 5/2017 |
| WO | WO2017072562 | 5/2017 |
| WO | WO2017086993 | 5/2017 |
| WO | WO2017087853 | 5/2017 |
| WO | 2017106723 | 6/2017 |
| WO | WO2017106704 | 6/2017 |
| WO | WO2017110769 | 6/2017 |
| WO | WO2017111944 | 6/2017 |
| WO | WO2017112130 | 6/2017 |
| WO | WO2017116384 | 7/2017 |
| WO | WO2017116385 | 7/2017 |
| WO | WO2017116386 | 7/2017 |
| WO | WO2017116389 | 7/2017 |
| WO | WO2017116390 | 7/2017 |
| WO | WO2017116454 | 7/2017 |
| WO | WO2017116463 | 7/2017 |
| WO | WO2017116472 | 7/2017 |
| WO | WO2017116475 | 7/2017 |
| WO | WO2017116478 | 7/2017 |
| WO | WO2017116481 | 7/2017 |
| WO | WO2017116556 | 7/2017 |
| WO | WO2017116557 | 7/2017 |
| WO | WO2017116561 | 7/2017 |
| WO | WO2017116565 | 7/2017 |
| WO | WO2017116804 | 7/2017 |
| WO | WO2017117365 | 7/2017 |
| WO | WO2017117368 | 7/2017 |
| WO | WO2017117587 | 7/2017 |
| WO | WO2017117598 | 7/2017 |
| WO | WO2017117599 | 7/2017 |
| WO | WO2017117605 | 7/2017 |
| WO | WO2017117606 | 7/2017 |
| WO | WO2017131742 | 8/2017 |
| WO | WO2017159899 | 9/2017 |
| WO | WO2017200645 | 11/2017 |
| WO | 2018111339 | 6/2018 |
| WO | WO2018112650 | 6/2018 |
| WO | 2018227276 | 12/2018 |
| WO | 2019119155 | 6/2019 |
| WO | 2020051715 | 3/2020 |
| WO | 2020082186 | 4/2020 |

OTHER PUBLICATIONS

Supplementary European Search Report issued in connection with European Patent Application No. 14811289,9 dated Feb. 1, 2017, 1 page.
Written Opinion issued in connection with International Application No. PCT/US2014/042327 dated Nov. 3, 2014, 5 pages.
Written Opinion issued in connection with PCT/2017/035008 dated Oct. 30, 2017, 15 pages.
Written Opinion dated Apr. 13, 2016 in connection with PCT application PCT/US2016/016630.
Written Opinion dated Feb. 19, 2018 in connection with PCT Patent Application No. PCT/CA2017/051577, 7 pages.
Muvdi, B.B. et al. "Shear and Bending Moment in Beams", Engineering Mechanics of Materials; Macmillan Publishing Co., Inc.; New York, NY; pp. 23-31.
Muvdi, B.B. et al. "Deflections of Beams", Engineering Mechanics of Materials; Macmillan Publishing Co., Inc.; New York, NY; pp. 266-333.
Rhyne, T. B. and Cron, S. M., "Development of a Non-Pneumatic Wheel," Tire Science and Technology, TSTCA, vol. 34, No. 3, Jul.-Sep. 2006, pp. 150-169.
Timothy B. Rhyne, Steven M. Cron, "Development of a Non-Pneumatic Wheel," submitted for presentation at the 2005 Tire Society meeting, and for consideration for publication in the journal Tire science and Technology.
Aheri, Saied, "Center for Tire Research (CenTiRe)," presentation at Virginia Tech on Nov. 8, 2017 (Client has emphasized slide 34).
Examiner's Report dated Nov. 13, 2018 in connection with European Patent Application No. 14811289.9, 15 pages.
International Search Report dated Feb. 19, 2018 in connection with PCT Patent application No. PCT/CA2017/051577, 7 pages.

(56) References Cited

OTHER PUBLICATIONS

International Serach Report dated Apr. 13, 2016 in connection with PCT application No. PCT/US2016/016630.
European Search Report dated May 24, 2019 in connection with European Patent Application No. 16876817.4, 18 pages.
International Preliminary Report on Patentability dated Mar. 7, 2019 in connection with International PCT Patent Application No. PCT/US2017/035008, 7 pages.
International Search Report dated Dec. 20, 2018 in connection with PCT Patent Application No. PCT/CA2018/050534, 3 pages.
International Search Report dated Mar. 28, 2019 in connection with International PCT application No. PCT/CA2018/051658, 3 pages.
Written Opinion dated Dec. 20, 2018 in connection with PCT Patent Application No. PCT/CA2018/050534, 4 pages.
Written Opinion dated Mar. 28, 2019 in connection with International PCT application No. PCT/CA2018/051658, 3 pages.
Michelin North America, "The Michelin X Tweel Turf", Targeted News Services, Apr. 3, 2015, 2 pages.
Tweel et al., "The Airless Radial Tire™ & wheel assembly. Designed for use on skid steer loaders. v no maintenance v no compromise v no downtime Now available in two models : All Tterrain for use on a wide range of surfaces, and Hard Surface for maximum tread life on pavement"., Jun. 16, 2015, 2 pages.
Powell, Robert, "Relationships between lane change performance and open-loop handling metrics", Clemson University Tigerprints, Jan. 1, 2009, 182 pages.
Anonymous, "Michelin's Tweel Airless" Tires Available for Skid Steers, Mowers-Real Agriculture, Jun. 17, 2015, 2 pages.
A.M. Aboul-Yazid et al., "Effet of spokes structures on characteristics performance of non-pneumatic tires", International Journal of Automotive and Mechanical Engineering, vol. 11, Jun. 30, 2015, 12 pages.
European Search Report dated Aug. 16, 2018 in connection with European Patent Application No. 16747290.1, 8 pages.
International Preliminary Report on Patentability issued in connection with International Patent Application No. PCT/US2014/042327 dated Dec. 23, 2015, 6 pages.
International Preliminary Report on Patentability issued in International Patent Application No. PCT/US2016/016630 dated Mar. 2, 2017, 40 pages.
International Search Report and Written Opinion issued in connection with PCT/US2016/016630 dated Apr. 13, 2016.
International Search Report issued in connection with International Applicatrion No. PCT/US2014/042327 dated Nov. 3, 2014, 3 pages.
International Search Report issued in connection with PCT/2017/035008 dated Oct. 30, 2017, 4 pages.
Written Opinion dated Dec. 10, 2019 in connection with International PCT application No. PCT/CA2019/051303, 6 pages.
Written Opinion dated Jul. 25, 2018 in connection with PCT Patent Application No. PCT/CA2018/050534, 4 pages.
International Search Report and Written Opinion dated Jan. 27, 2020, in connection with International PCT application No. PCT/CA2019/051514, 14 pages.
Examiner's Report dated Dec. 10, 2020, in connection with Canadian Patent Application No. 2915483, 3 pages.
Communication under Rule 71(3) EPC dated Oct. 12, 2020, by the Examining Division (EPO) in connection with European Patent Application No. 16747290.1, 5 pages.
European Search Report dated Oct. 30, 2020, in connection with European Patent Application No. 18890476.7, 14 pages.
Jaehyung Ju et al. "Rolling Resistance of a Nonpneumatic Tire Having a Porous Elastomer Composite Shear Band" Tire Science and Technology 41(3) (Jul. 2013) 154-173.
Michelin North America, "Michelin X Tweel SSL.", Targeted News Services, Jun. 16, 2015, 2 pages.
Dupont Hytrel Thermoplastic Polyester Elastomers: Design Guide, Oct. 1, 2016, 85 pages.
European Search Report dated Jul. 5, 2021, in connection with European Patent Application No. 18818205.9, 9 pages.
Communication pursuant to Article 94(3) dated Jul. 5, 2021, by the Examining Division (EPO) in connection with European Patent Application No. 18818205.9, 9 pages.
Andreini, G. et al. "Crack growth behavior of SBR, NR and BR rubber compounds: comparison of Pure-Shear versus Strip Tensile test", Jan. 1, 2013.
Baumard. "Investigation on Fatigue Failure in Tyres", The School of Engineering and Materials Science: Queen Mary University of London, Mar. 8, 2017, 226 pages.
Kaang, S. et al. "Fatigue crack growth of double-networked natural rubber", Polymer vol. 39 No. 11, pp. 2209-2214, Jan. 1, 1998, 6 pages.
"Non-pneumatic tire technology", Automotive Engineering, Society of Automotive Engineers, Warrendale, US, vol. 98, No. 11, pp. 29-33, Nov. 1, 1990, 5 pages.

\* cited by examiner

TRACK SYSTEM FOR TRACTION OF A VEHICLE

CROSS-REFERENCE TO RELATED APPLICATION

This application claims priority from U.S. Provisional Patent Application 62/268,309 filed on Dec. 16, 2015 and hereby incorporated by reference herein.

FIELD

The invention relates generally to track systems for tractions of vehicles, such as all-terrain vehicles (ATVs) and other off-road vehicles.

BACKGROUND

Certain vehicles, such as all-terrain vehicles (ATVs), agricultural vehicles (e.g., tractors, harvesters, etc.), may be equipped with track systems which enhance their traction and floatation on soft, slippery and/or irregular grounds (e.g., soil, mud, sand, ice, snow, etc.) on which they operate. A track system comprises a track disposed around a track-engaging assembly including a frame and track-contacting wheels that drive and guide the track around the track-engaging assembly.

As they travel on the ground, tracked vehicles can encounter various obstacles (e.g., rocks, portions of trees, debris, ice blocks, bumps or other abrupt changes in ground level, etc.) depending on their environment. Such obstacles can create shocks in their track systems. Depending on their intensity, these shocks may affect ride quality and/or structural integrity of the track systems. Also, some obstacles may sometimes prove more difficult to overcome. This can negatively impact a tracked vehicle's performance by slowing it down or in some cases bringing it to a standstill.

In some cases, shock absorption of track systems may be enhanced by providing some resilience within the track systems (e.g., wheels or other components that are less stiff). However, this may cause issues in view of track tensioning.

For these and other reasons, there is a need to improve track systems for traction of vehicles.

SUMMARY

According to various aspects of the invention, there is provided a track system for traction of a vehicle. The track system may be designed (e.g., may comprise non-pneumatic tires) to enhance its use or performance and/or that of the vehicle such as, for example, by being lightweight and/or by better handling loads, including, for instance, those resulting from track tension within the track system and/or from unevenness or other aspects of the ground, including encounters (e.g., impacts) with obstacles on the ground (e.g., rocks, portions of trees, debris, bumps, abrupt changes in ground level, etc.). For instance, in some embodiments, the track system may comprise tension-based non-pneumatic tires.

For example, according to an aspect of the invention, there is provided a track system for traction of a vehicle. The track system comprises: a track for engaging the ground; and a track-engaging assembly for driving and guiding the track around the track-engaging assembly. The track-engaging assembly comprises: a drive wheel for driving the track; and an idler wheel contacting a bottom run of the track. The idler wheel comprises a non-pneumatic tire. The non-pneumatic tire comprises: an annular beam configured to deflect at an area of contact of the non-pneumatic tire with the track; and an annular support disposed radially inwardly of the annular beam and configured to resiliently deform under loading on the idler wheel for supporting the loading on the idler wheel by tension.

According to an aspect of the invention, there is provided a track system for traction of a vehicle. The track system comprises: a track for engaging the ground; and a track-engaging assembly for driving and guiding the track around the track-engaging assembly. The track-engaging assembly comprises: a drive wheel for driving the track; and an idler wheel contacting a bottom run of the track. The idler wheel comprises a non-pneumatic tire. The non-pneumatic tire comprises an annular beam configured to deflect at an area of contact of the non-pneumatic tire with the track. The annular beam is configured to deflect more by shearing than by bending at the area of contact of the non-pneumatic tire with the track when the idler wheel encounters an obstacle on the ground. The non-pneumatic tire comprises an annular support disposed radially inwardly of the annular beam and configured to resiliently deform under loading on the idler wheel.

According to an aspect of the invention, there is provided a track system for traction of a vehicle. The track system comprises: a track for engaging the ground; and a track-engaging assembly for driving and guiding the track around the track-engaging assembly. The track-engaging assembly comprises: a drive wheel for driving the track; and an idler wheel contacting a bottom run of the track. The idler wheel comprises a non-pneumatic tire. The non-pneumatic tire comprises an annular beam configured to deflect at an area of contact of the non-pneumatic tire with the track. The annular beam is configured to deflect more by shearing than by bending at the area of contact of the non-pneumatic tire with the track when the idler wheel is loaded against a flat surface to a contact length of at least 40% of a diameter of the idler wheel. The non-pneumatic tire comprises an annular support disposed radially inwardly of the annular beam and configured to resiliently deform under loading on the idler wheel.

According to an aspect of the invention, there is provided a track system for traction of a vehicle. The track system comprises: a track for engaging the ground; and a track-engaging assembly for driving and guiding the track around the track-engaging assembly. The track-engaging assembly comprises: a drive wheel for driving the track; and an idler wheel contacting a bottom run of the track. The idler wheel comprises a non-pneumatic tire. The non-pneumatic tire comprises an annular beam configured to deflect at an area of contact of the non-pneumatic tire with the track. The annular beam comprises a plurality of openings distributed in a circumferential direction of the non-pneumatic tire. Each of the openings extends from a first lateral side of the non-pneumatic tire to a second lateral side of the non-pneumatic tire. The non-pneumatic tire comprises an annular support disposed radially inwardly of the annular beam and configured to resiliently deform under loading on the idler wheel.

According to an aspect of the invention, there is provided a track system for traction of a vehicle. The track system comprises: a track for engaging the ground; and a track-engaging assembly for driving and guiding the track around the track-engaging assembly. The track-engaging assembly comprises: a drive wheel for driving the track; and an idler wheel contacting a bottom run of the track. A radial stiffness of the idler wheel is different under different types of loading on the idler wheel.

According to an aspect of the invention, there is provided a track system for traction of a vehicle. The track system comprises: a track for engaging the ground; and a track-engaging assembly for driving and guiding the track around the track-engaging assembly. The track-engaging assembly comprises: a drive wheel for driving the track; and a leading idler wheel and a trailing idler wheel that contact a bottom run of the track. An axis of rotation of the drive wheel is located between an axis of rotation of the leading idler wheel and an axis of rotation of the trailing idler wheel in a longitudinal direction of the track system. The leading idler wheel is structurally different from the trailing idler wheel.

These and other aspects of the invention will now become apparent to those of ordinary skill in the art upon review of the following description of embodiments in conjunction with the accompanying drawings.

BRIEF DESCRIPTION OF THE DRAWINGS

A detailed description of embodiments is provided below, by way of example only, with reference to the accompanying drawings, in which.

It is to be expressly understood that the description and drawings are only for the purpose of illustrating certain embodiments and are an aid for understanding. They are not intended to be a definition of the limits of the invention.

DETAILED DESCRIPTION OF EMBODIMENTS

Figure 1A:
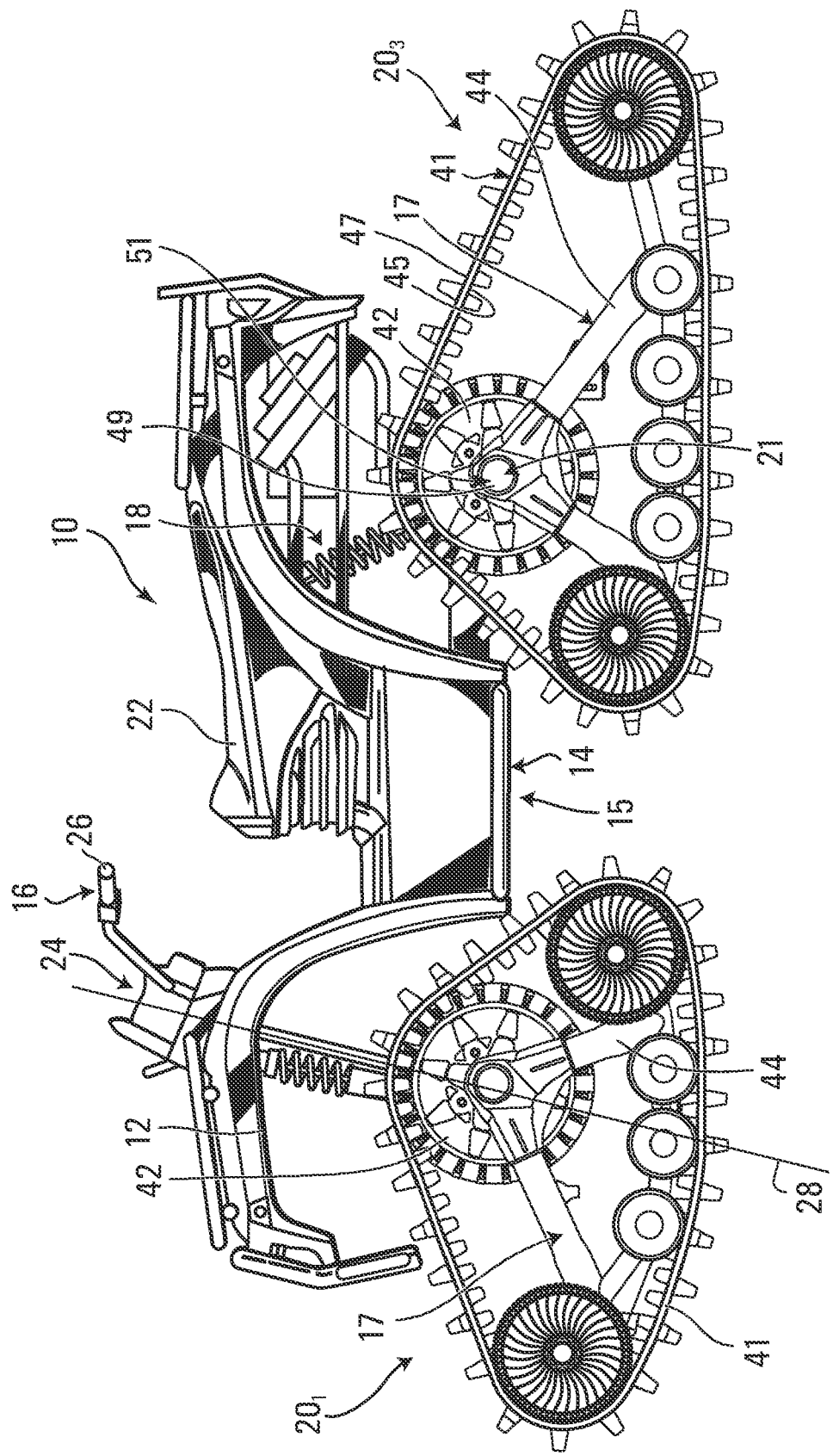
FIGS. 1A and 1B show an example of an all-terrain vehicle (ATV) comprising track systems in accordance with an embodiment of the invention.
Figure 1B:
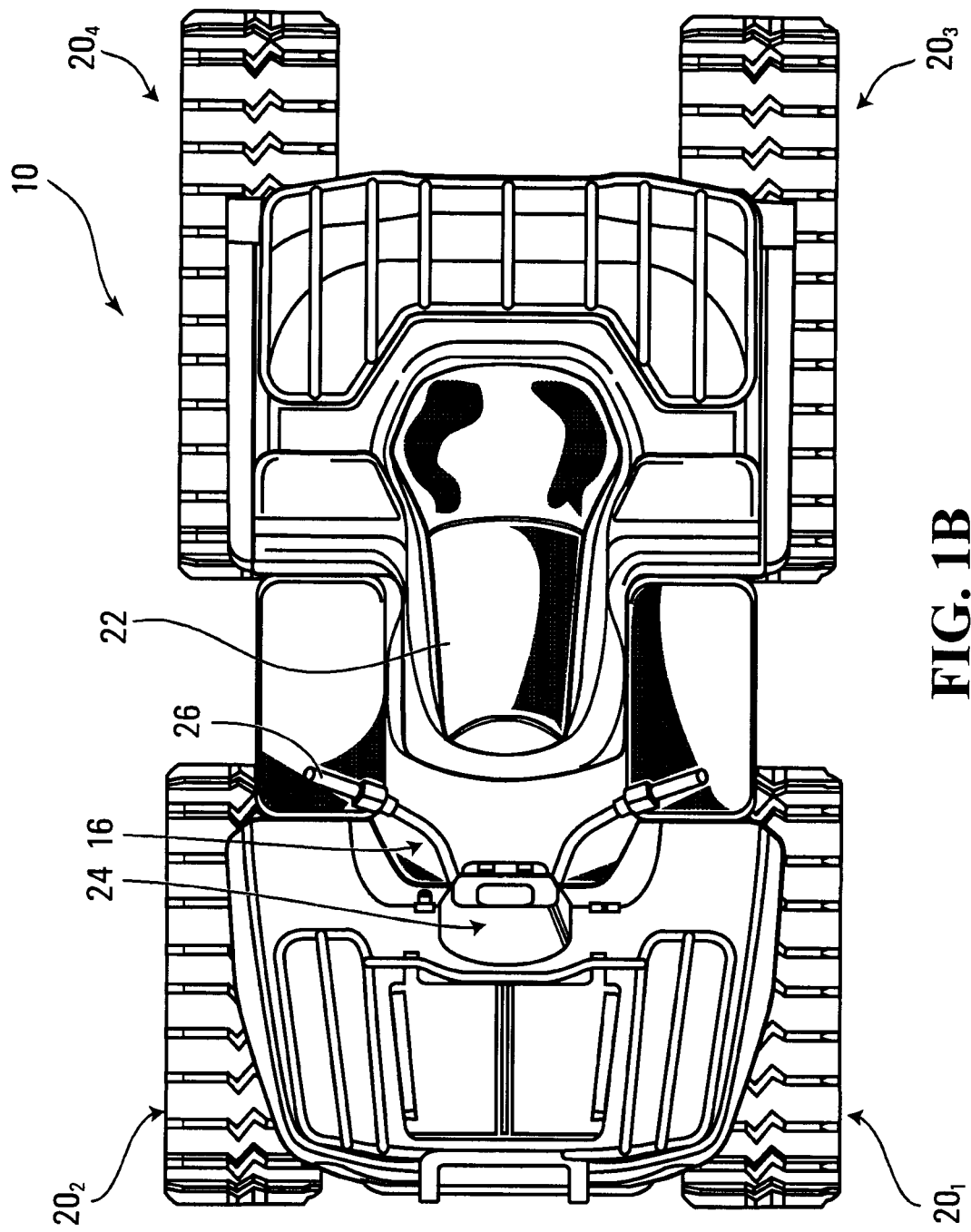

FIGS. 1A and 1B show an example of a vehicle 10 comprising track systems $20_1$-$20_4$ in accordance with an embodiment of the invention. In this embodiment, the tracked vehicle 10 is an all-terrain vehicle (ATV), which is a small open vehicle designed to travel off-road on a variety of terrains, including roadless rugged terrain, for recreational, utility and/or other purposes. The ATV 10 comprises a frame 12, a powertrain 14, a steering system 16, a suspension 18, the track systems $20_1$-$20_4$, a seat 22, and a user interface 24 which enable a user of the ATV 10 to ride the ATV 10 on the ground. The ATV 10 has a longitudinal direction, a widthwise direction and a height direction.

As further discussed later, in various embodiments, the track systems $20_1$-$20_4$ may be designed (e.g., may comprise non-pneumatic tires, such as tension-based non-pneumatic tires) to enhance use or performance of the track systems $20_1$-$20_4$ and/or the ATV 10, such as, for example, by being lightweight and/or by better handling loads, including, for instance, those resulting from track tension within the track systems $20_1$-$20_4$ (e.g., at low speed and high torque) and/or from unevenness or other aspects of the ground, including encounters (e.g., impacts) with obstacles (e.g., rocks, portions of trees, debris, bumps, abrupt changes in ground level, etc.) on the ground (e.g., at high speed).

The powertrain 14 is configured for generating motive power and transmitting motive power to respective ones of the track systems $20_1$-$20_4$ to propel the ATV 10 on the ground. To that end, the powertrain 14 comprises a prime mover 15, which is a source of motive power that comprises one or more motors. For example, in this embodiment, the prime mover 15 comprises an internal combustion engine. In other embodiments, the prime mover 15 may comprise another type of motor (e.g., an electric motor) or a combination of different types of motor (e.g., an internal combustion engine and an electric motor) for generating motive power to move the ATV 10. The prime mover 15 is in a driving relationship with one or more of the track systems $20_1$-$20_4$. That is, the powertrain 14 transmits motive power generated by the prime mover 15 to one or more of the track systems $20_1$-$20_4$ (e.g. via a transmission and/or a differential) in order to drive (i.e. impart motion to) these one or more of the track systems $20_1$-$20_4$.

The steering system 16 is configured to enable the user to steer the ATV 10 on the ground. To that end, the steering system 16 comprises a steering device 26 that is operable by the user to direct the ATV 10 along a desired course on the ground. In this embodiment, the steering device 26 comprises handlebars. The steering device 26 may comprise a steering wheel or any other steering component that can be operated by the user to steer the ATV 10 in other embodiments. In this embodiment, the steering system 16 responds to the user interacting with the steering device 26 by turning respective ones of the track systems $20_1$-$20_4$ to change their orientation relative to the frame 12 of the ATV 10 in order to cause the ATV 10 to move in a desired direction. In this example, the track systems $20_1$, $20_2$ (i.e., front ones of the track systems $20_1$-$20_4$) are turnable in response to input of the user at the steering device 26 to change their orientation relative to the frame 12 of the ATV 10 in order to steer the ATV 10 on the ground. More particularly, in this example, each of the track systems $20_1$, $20_2$ (i.e., each of the front ones of the track systems $20_1$-$20_4$) is pivotable about a steering axis 28 of the ATV 10 in response to input of the user at the steering device 26 in order to steer the ATV 10 on the ground. The track systems $20_3$, $20_4$ (i.e. rear ones of the track systems $20_1$-$20_4$) are not turned relative to the frame 12 of the ATV 10 by the steering system 16.

The suspension 18 is connected between the frame 12 and the track systems $20_1$-$20_4$ to allow relative motion between the frame 12 and the track systems $20_1$-$20_4$ as the ATV 10 travels on the ground. For example, the suspension 18 enhances handling of the ATV 10 on the ground by absorbing shocks and helping to maintain traction between the track systems $20_1$-$20_4$ and the ground. The suspension 18 may comprise an arrangement of springs and dampers. A spring may be a coil spring, a leaf spring, a gas spring (e.g., an air spring), or any other elastic object used to store mechanical energy. A damper (also sometimes referred to as a "shock absorber") may be a fluidic damper (e.g., a pneumatic damper, a hydraulic damper, etc.), a magnetic damper, or any other object which absorbs or dissipates kinetic energy to decrease oscillations. In some cases, a single device may itself constitute both a spring and a damper (e.g., a hydropneumatic, hydrolastic, or hydragas suspension device).

Figure 2A:
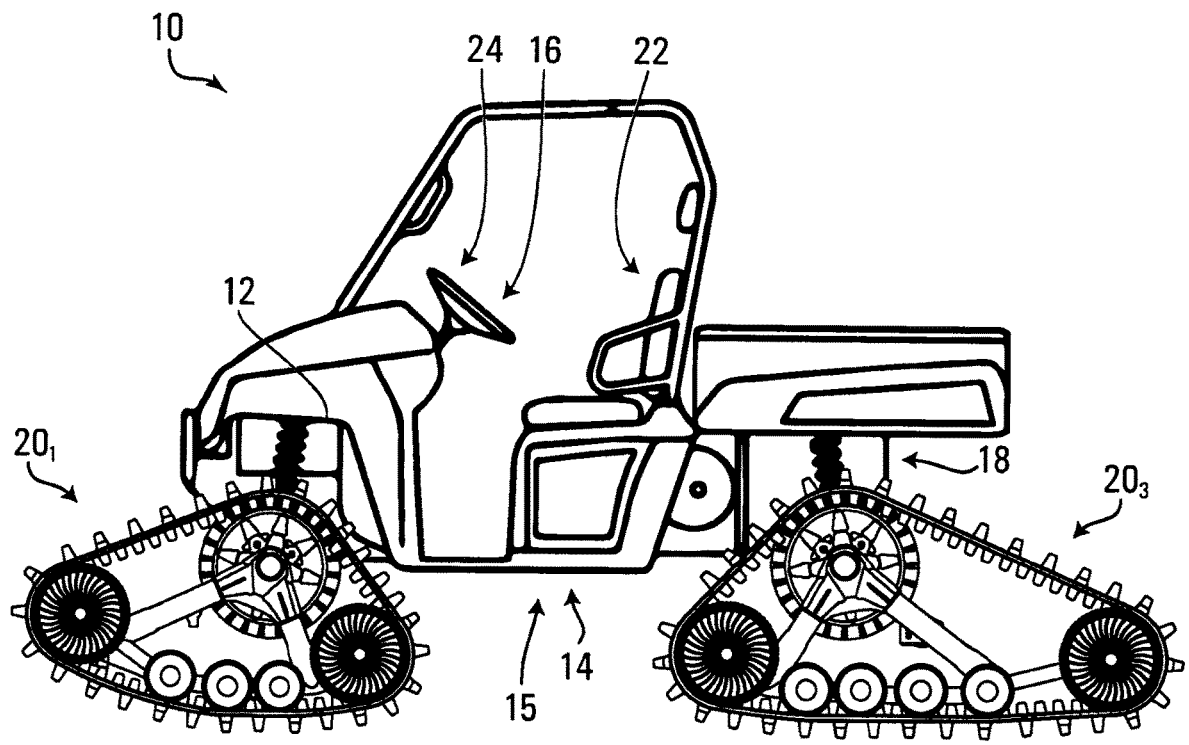
FIGS. 2A and 2B show another example in which the ATV is a utility terrain or utility task vehicle (UTV) in accordance with another embodiment of the invention.
Figure 2B:
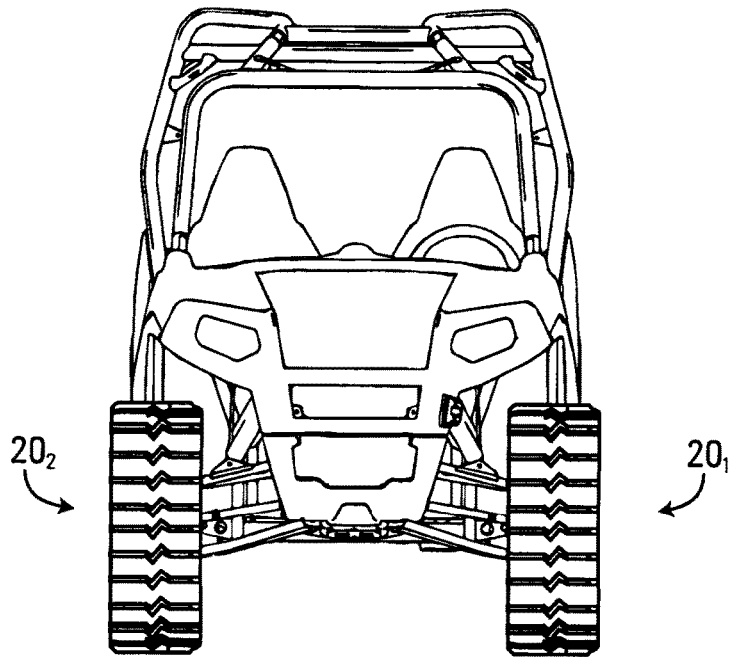

In this embodiment, the seat 22 is a straddle seat and the ATV 10 is usable by a single person such that the seat 22 accommodates only that person driving the ATV 10. In other embodiments, the seat 22 may be another type of seat, and/or the ATV 10 may be usable by two individuals, namely one person driving the ATV 10 and a passenger, such that the seat 22 may accommodate both of these individuals (e.g., behind one another or side-by-side) or the ATV 10 may comprise an additional seat for the passenger. For example, in other embodiments, as shown in FIGS. 2A and 2B, the ATV 10 may be a side-by-side ATV, sometimes referred to as a "utility terrain vehicle" or "utility task vehicle" (UTV), an example of which is shown in FIGS. 2A and 2B.

The user interface 24 allows the user to interact with the ATV 10. More particularly, the user interface 24 comprises an accelerator, a brake control, and the steering device 26 that are operated by the user to control motion of the ATV 10 on the ground. The user interface 24 also comprises an instrument panel (e.g., a dashboard) which provides indicators (e.g., a speedometer indicator, a tachometer indicator, etc.) to convey information to the user.

The track systems $20_1$-$20_4$ engage the ground to provide traction to the ATV 10. More particularly, in this example, the track systems $20_1$, $20_2$ (i.e., the front ones of the track systems $20_1$-$20_4$) provide front traction to the ATV 10 while the track systems $20_3$, $20_4$ (i.e. the rear ones of the track systems $20_1$-$20_4$) provide rear traction to the ATV 10.

Figure 3A:
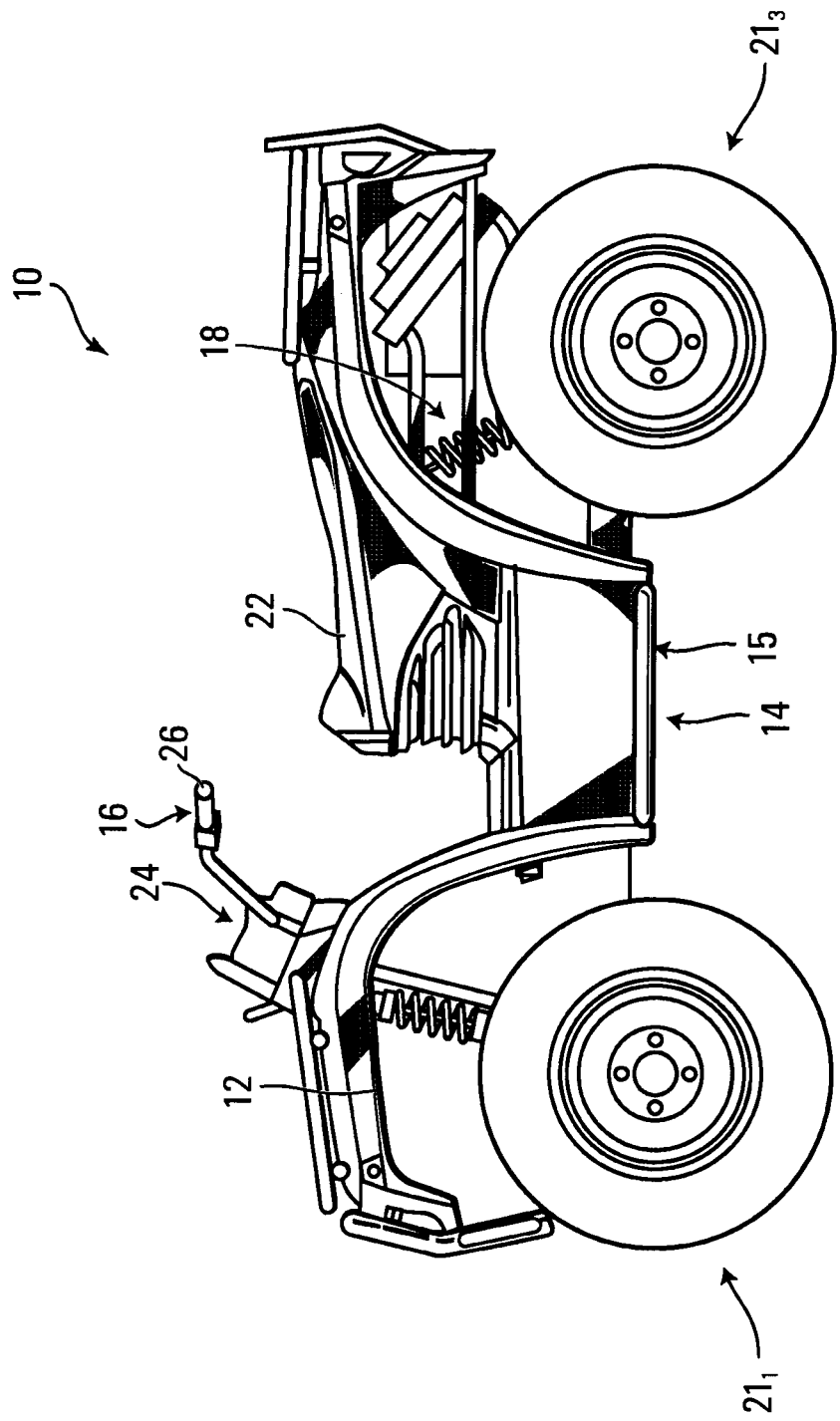
FIGS. 3A and 3B show the ATV equipped with ground-engaging wheels instead of the track systems.
Figure 3B:
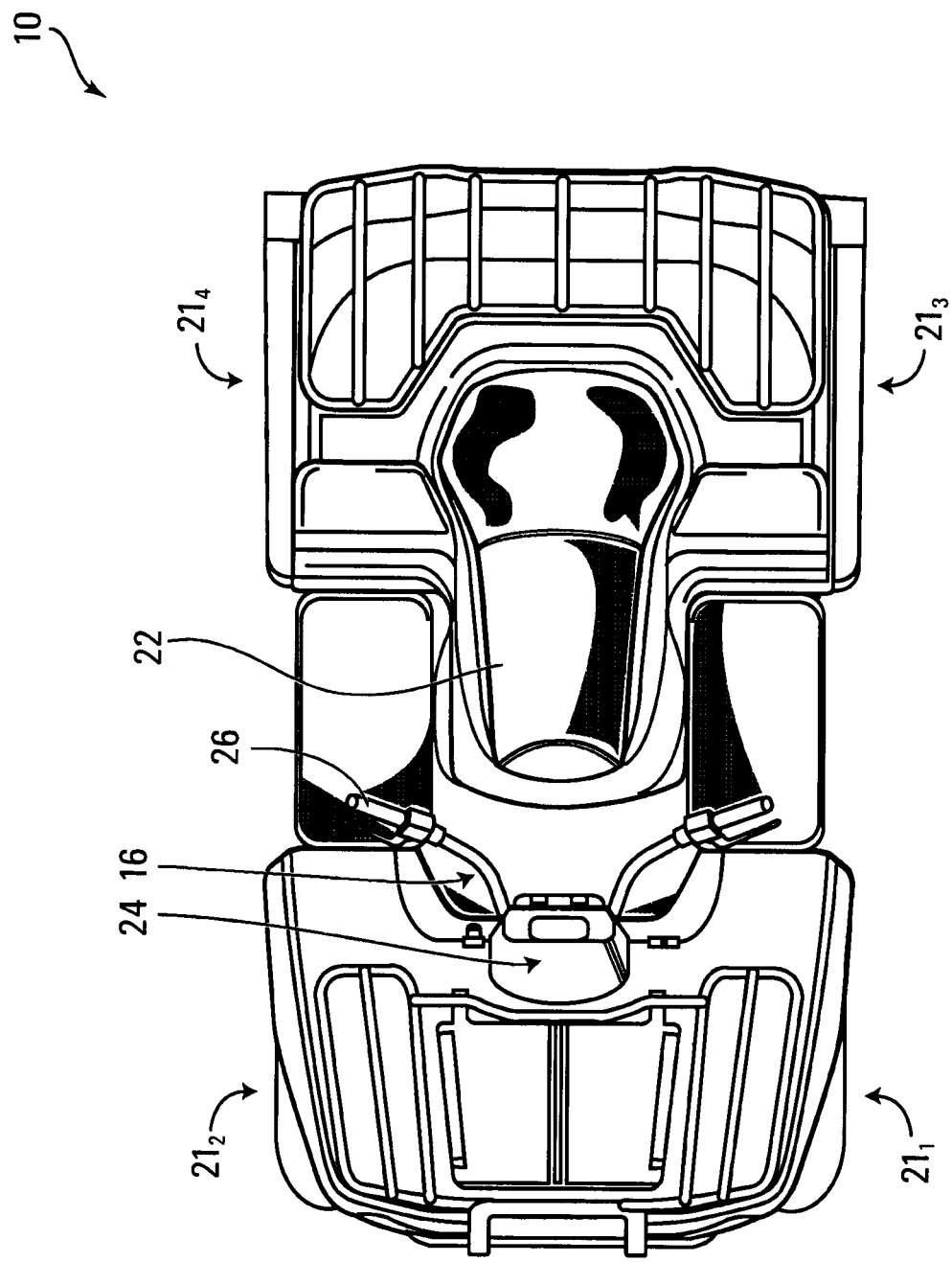
Figure 4:
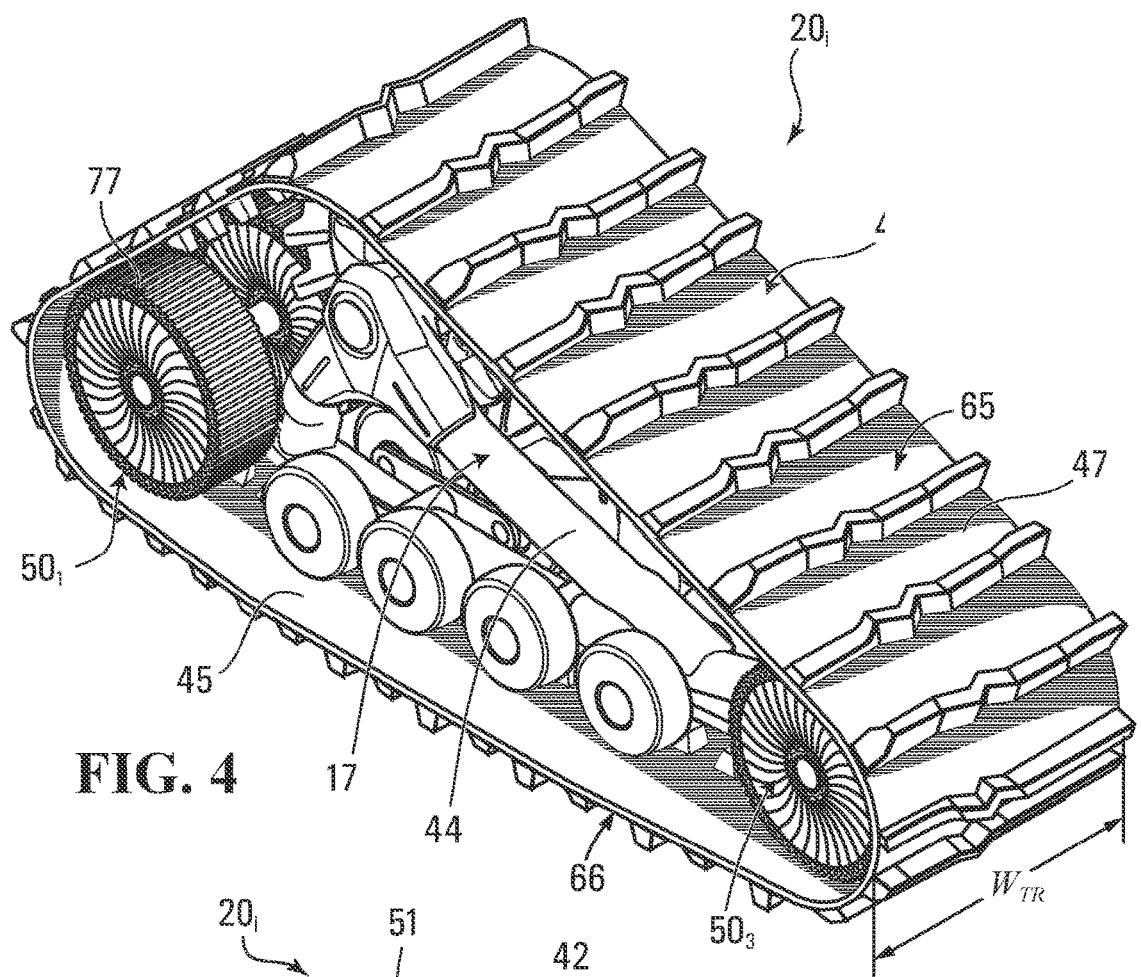
FIGS. 4 and 5 respectively show perspective and side views of a rear one of the track systems.
Figure 5:
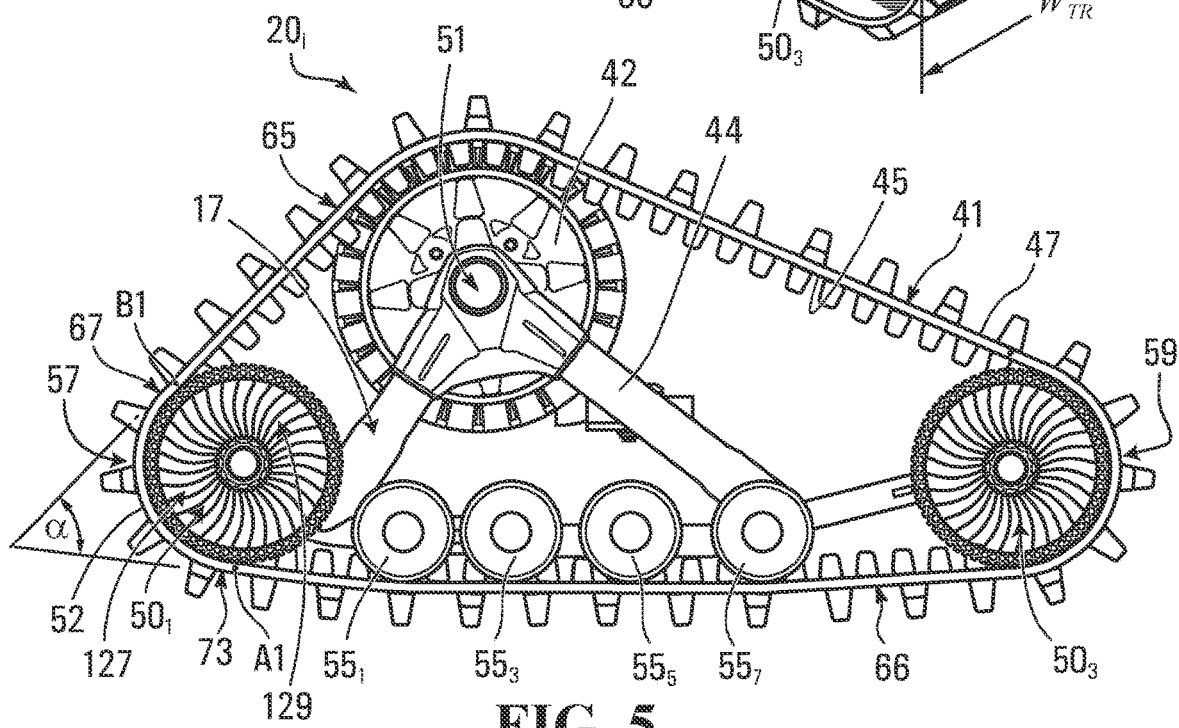
Figure 6:
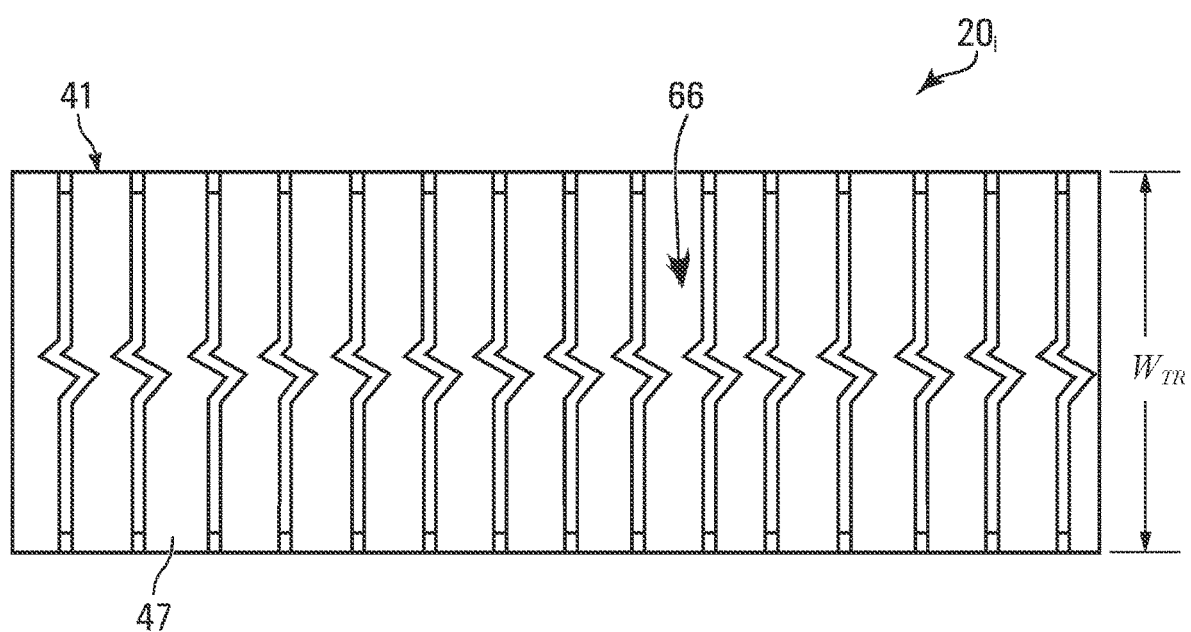
FIG. 6 shows a bottom view of the track system.
Figure 7:
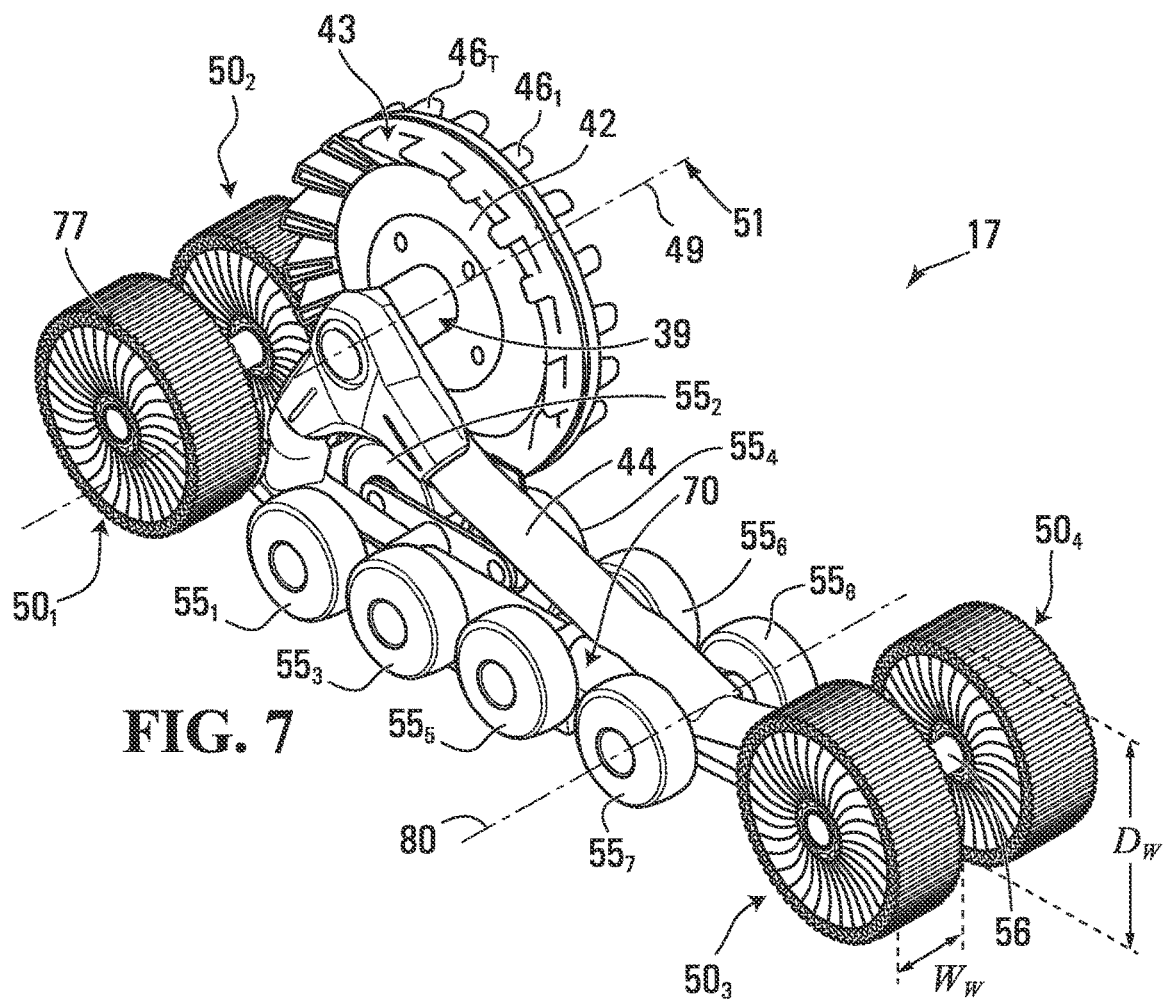
FIGS. 7 and 8 respectively show perspective and side views of the track system without its track.
Figure 8:
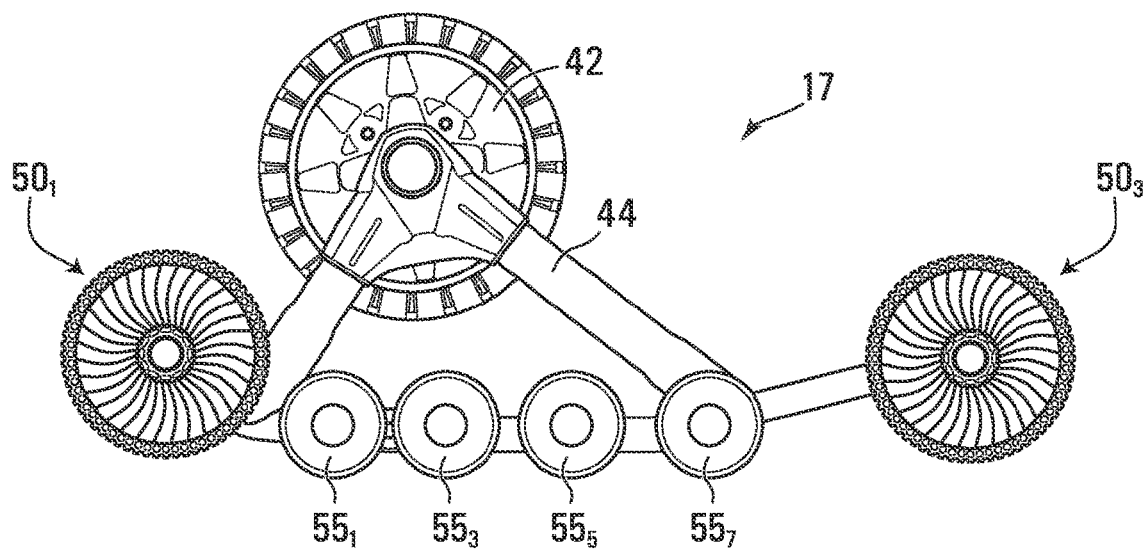

In this embodiment, as shown in FIGS. 3A and 3B, the track systems $20_1$-$20_4$ are respectively mounted in place of ground-engaging wheels $21_1$-$21_4$ with tires that may otherwise be mounted at positions of the track systems $20_1$-$20_4$ to propel the ATV 10 on the ground. Basically, in this embodiment, the track systems $20_1$-$20_4$ may be used to convert the ATV 10 from a wheeled vehicle into a tracked vehicle, thereby enhancing its traction and flotation on the ground.

With additional reference to FIGS. 4 to 8, in this embodiment, each track system $20_i$ comprises a track-engaging assembly 17 and a track 41 disposed around the track-engaging assembly 17. In this example, the track-engaging assembly 17 comprises a frame 44 and a plurality of track-contacting wheels which includes a drive wheel 42 and a plurality of idler wheels $50_1$-$50_4$, $55_1$-$55_8$, which includes leading (i.e., front) idler wheels $50_1$, $50_2$, trailing (i.e., rear) idler wheels $50_3$, $50_4$, and support wheels $55_1$-$55_8$ between the leading idler wheels $50_1$, $50_2$ and the trailing idler wheels $50_3$, $50_4$. The track system $20_i$ has a front longitudinal end 57 and a rear longitudinal end 59 that define a length of the track system $20_i$. A width of the track system $20_i$ is defined by a width of the track 41. The track system $20_i$ has a longitudinal direction, a widthwise direction, and a height direction.

Figure 9:
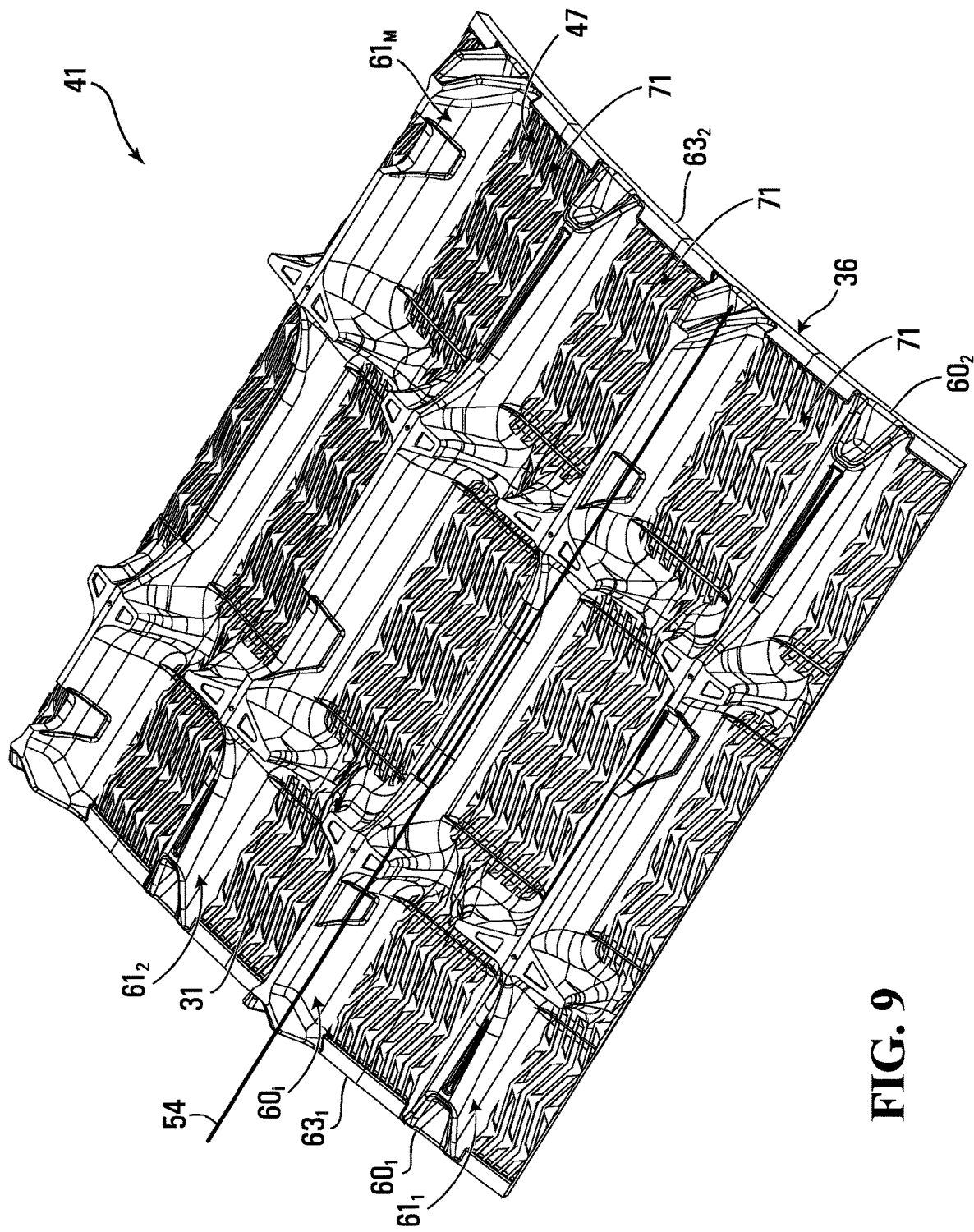
FIGS. 9 and 10 show perspective views of a segment of the track of the track system, which depict features of an inner side and a ground-engaging outer side of the track.
Figure 10:
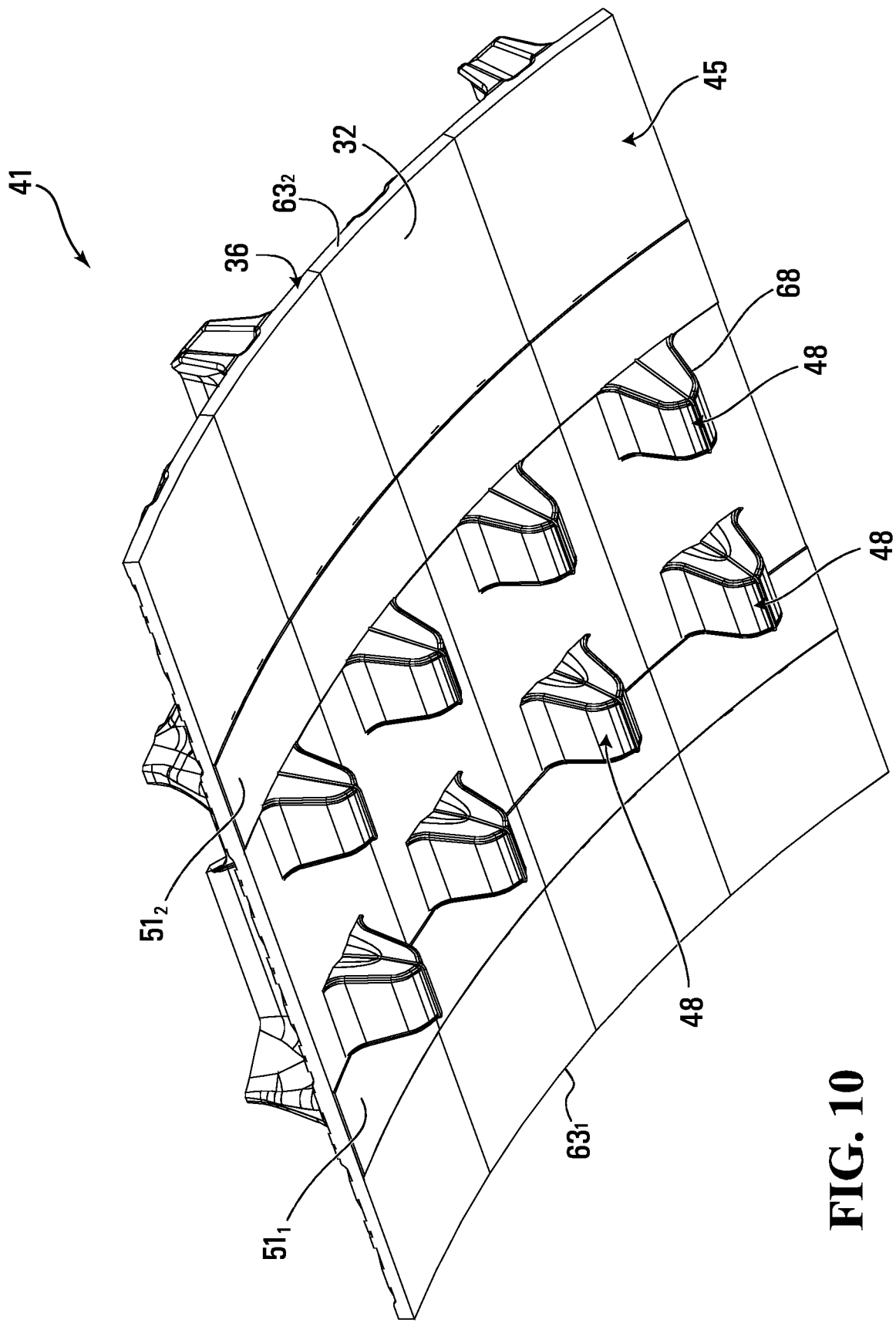
Figure 11:
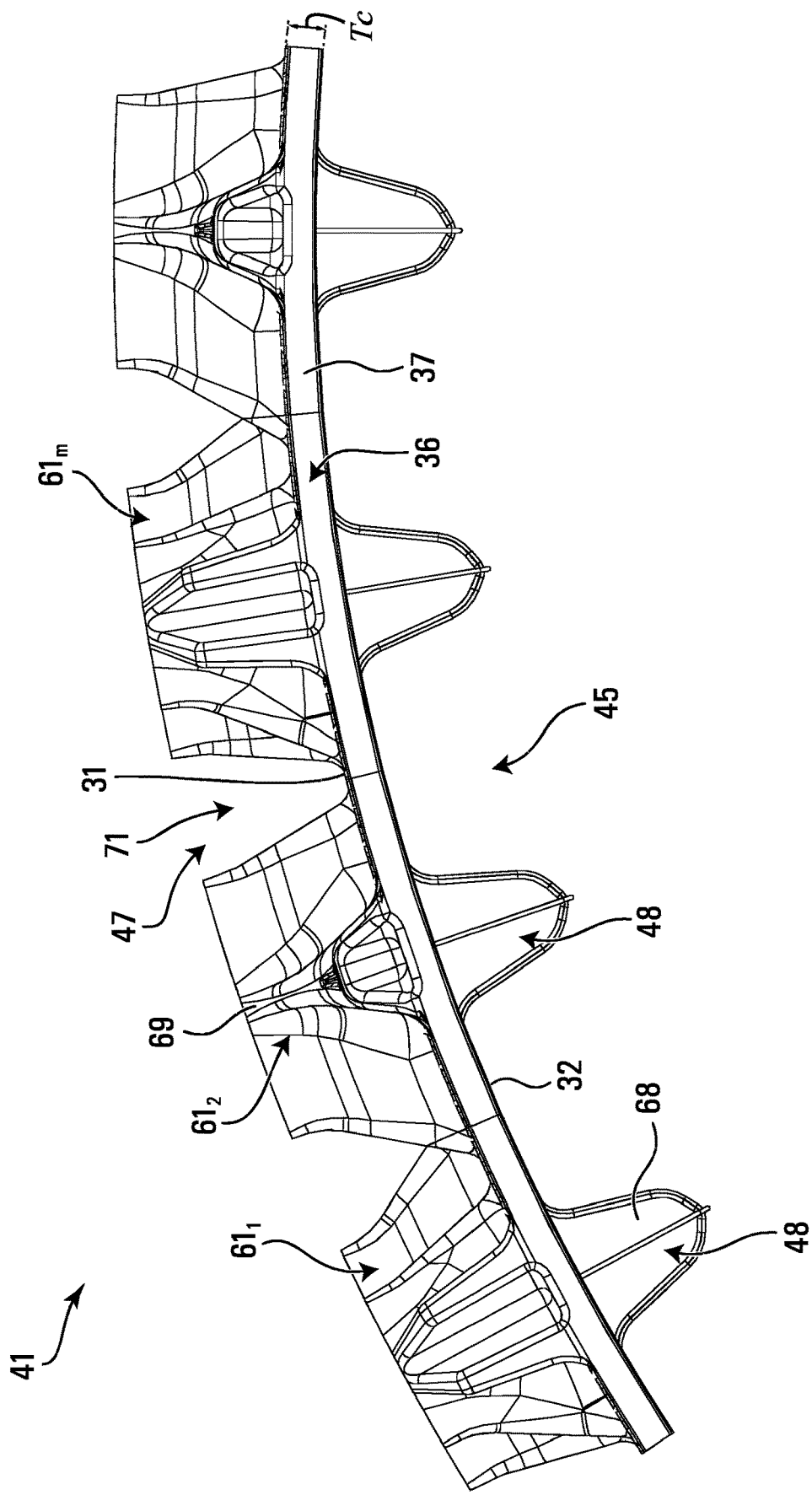
FIG. 11 shows a side view of the track of the track system.

The track 41 engages the ground to provide traction to the ATV 10. A length of the track 41 allows the track 41 to be mounted around the track-engaging assembly 17. In view of its closed configuration without ends that allows it to be disposed and moved around the track-engaging assembly 17, the track 41 can be referred to as an "endless" track. Referring additionally to FIGS. 9 to 11, the track 41 comprises an inner side 45 facing the wheels 42, $50_1$-$50_4$, $55_1$-$55_8$ and defining an inner area of the track 41 in which these wheels are located. The track 41 also comprises a ground-engaging outer side 47 opposite the inner side 45 for engaging the ground on which the ATV 10 travels. Lateral edges $63_1$, $63_2$ of the track 41 define the track's width. The track 41 has a top run 65 which extends between the longitudinal ends 57, 59 of the track system $20_i$ and over the track-engaging assembly 17, and a bottom run 66 which extends between the longitudinal ends 57, 59 of the track system $20_i$ and under the track-engaging assembly 17. The track 41 has a longitudinal direction, a widthwise direction, and a thickness direction.

The track 41 is elastomeric, i.e., comprises elastomeric material, allowing it to flex around the wheels 42, $50_1$-$50_4$, $55_1$-$55_8$. The elastomeric material of the track 41 can include any polymeric material with suitable elasticity. In this embodiment, the elastomeric material includes rubber. Various rubber compounds may be used and, in some cases, different rubber compounds may be present in different areas of the track 41. In other embodiments, the elastomeric material of the track 41 may include another elastomer in addition to or instead of rubber (e.g., polyurethane elastomer). The track 41 can be molded into shape in a mold by a molding process during which its elastomeric material is cured.

More particularly, the track 41 comprises an elastomeric belt-shaped body 36 underlying its inner side 45 and its ground-engaging outer side 47. In view of its underlying nature, the body 36 can be referred to as a "carcass". The carcass 36 comprises elastomeric material 37 which allows the track 41 to flex around the wheels 42, $50_1$-$50_4$, $55_1$-$55_8$.

Figure 12:
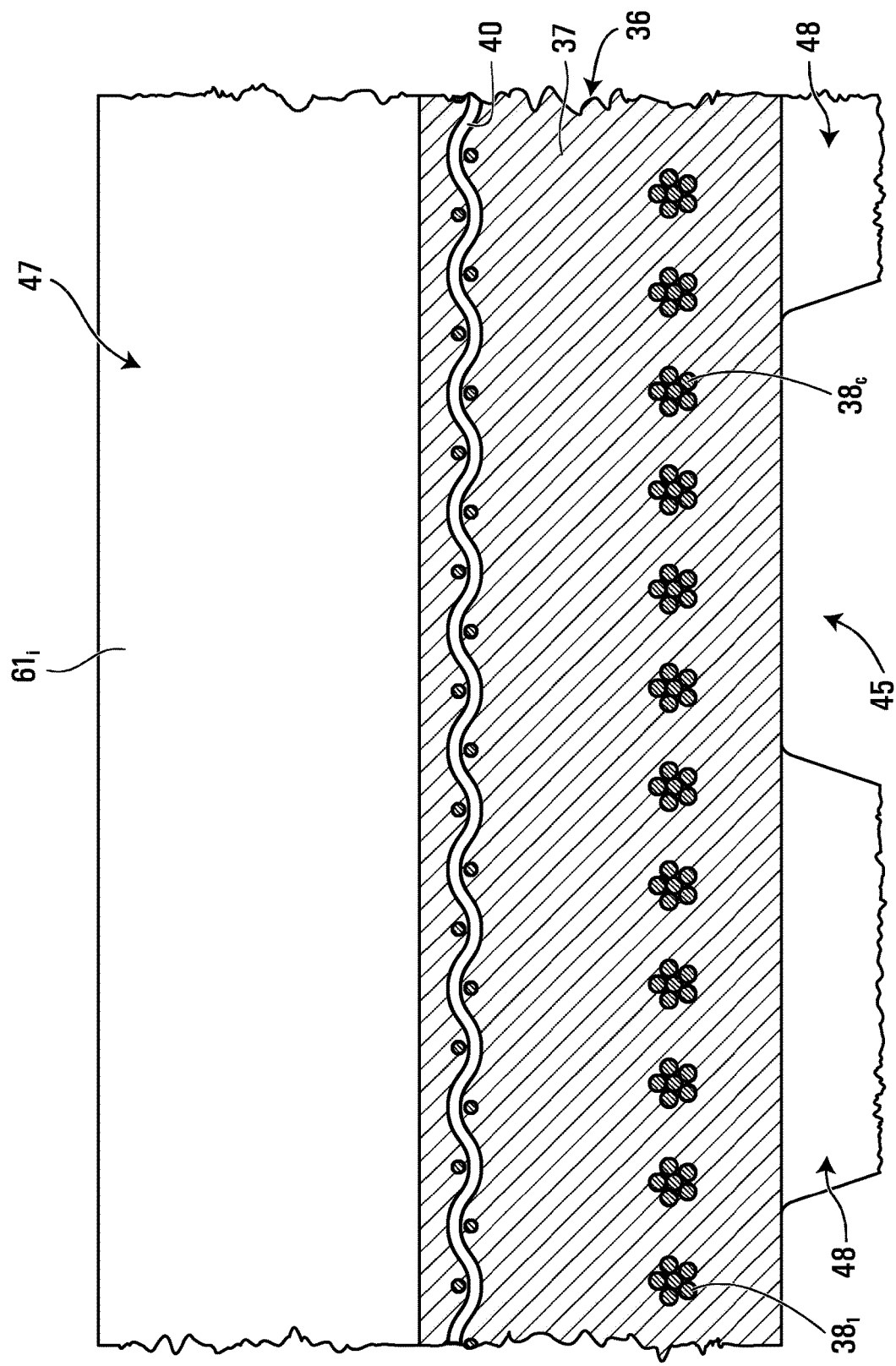
FIG. 12 shows a partial cross-sectional view of an embodiment of the track of the track system.

As shown in FIG. 12, in this embodiment, the carcass 36 comprises a plurality of reinforcements embedded in its elastomeric material 37. One example of a reinforcement is a layer of reinforcing cables $38_1$-$38_C$ that are adjacent to one another and that extend in the longitudinal direction of the track 41 to enhance strength in tension of the track 41 along its longitudinal direction. In some cases, a reinforcing cable may be a cord or wire rope including a plurality of strands or wires. In other cases, a reinforcing cable may be another type of cable and may be made of any material suitably flexible longitudinally (e.g., fibers or wires of metal, plastic or composite material). Another example of a reinforcement is a layer of reinforcing fabric 40. Reinforcing fabric comprises pliable material made usually by weaving, felting, or knitting natural or synthetic fibers. For instance, a layer of reinforcing fabric may comprise a ply of reinforcing woven fibers (e.g., nylon fibers or other synthetic fibers). Various other types of reinforcements may be provided in the carcass 36 in other embodiments.

The carcass 36 may be molded into shape in the track's molding process during which its elastomeric material 37 is cured. For example, in this embodiment, layers of elastomeric material providing the elastomeric material 37 of the carcass 36, the reinforcing cables $38_1$-$38_C$ and the layer of reinforcing fabric 40 may be placed into the mold and consolidated during molding.

In this embodiment, the inner side 45 of the track 41 comprises an inner surface 32 of the carcass 36 and a plurality of wheel-contacting projections 48 that project from the inner surface 32 to contact at least some of the wheels 42, $50_1$-$50_4$, $55_1$-$55_8$ and that are used to do at least one of driving (i.e., imparting motion to) the track 41 and guiding the track 41. In that sense, the wheel-contacting projections 48 can be referred to as "drive/guide projections", meaning that each drive/guide projection is used to do at least one of driving the track 41 and guiding the track 41. Also, such drive/guide projections are sometimes referred to as "drive/guide lugs" and will thus be referred to as such herein. More particularly, in this embodiment, the drive/guide lugs 48 interact with the drive wheel 42 in order to cause the track 41 to be driven, and also interact with the idler wheels $50_1$-$50_4$, $55_1$-$55_8$ in order to guide the track 41 as it is driven by the drive wheel 42. The drive/guide lugs 48 are thus used to both drive the track 41 and guide the track 41 in this embodiment.

The drive/guide lugs 48 are spaced apart along the longitudinal direction of the track 41. In this case, the drive/guide lugs 48 are arranged in a plurality of rows that are spaced apart along the widthwise direction of the track 41. The drive/guide lugs 48 may be arranged in other manners in other embodiments (e.g., a single row or more than two rows). Each of the drive/guide lugs 48 is an elastomeric drive/guide lug in that it comprises elastomeric material 68. The drive/guide lugs 48 can be provided and connected to the carcass 36 in the mold during the track's molding process.

The ground-engaging outer side 47 of the track 41 comprises a ground-engaging outer surface 31 of the carcass 36 and a plurality of traction projections $61_1$-$61_M$ that project from the outer surface 31 and engage and may penetrate into the ground to enhance traction. The traction projections $61_1$-$61_M$, which can sometimes be referred to as "traction lugs" or "traction profiles", are spaced apart in the longitudinal direction of the track system $20_i$. The ground-engaging outer side 47 comprises a plurality of traction-projection-free areas 71 (i.e., areas free of traction projections) between successive ones of the traction projections $61_1$-$61_M$. In this example, each of the traction projections $61_1$-$61_M$ is an elastomeric traction projection in that it comprises elastomeric material 69. The traction projections $61_1$-$61_M$ can be provided and connected to the carcass 36 in the mold during the track's molding process.

Each traction projection $61_i$ extends transversally to the longitudinal direction of the track 41. That is, the traction projection $61_i$ has a longitudinal axis 54 extending transversally to the longitudinal direction of the track 41. In this example, the longitudinal axis 54 of the traction projection $61_i$ is substantially parallel to the widthwise direction of the track 41. In other examples, the longitudinal axis 54 of the traction projection $61_i$ may be transversal to the longitudinal direction of the track 41 without being parallel to the widthwise direction of the track 41.

In this example, the carcass 36 has a thickness $T_c$ which is relatively small. The thickness $T_c$ of the carcass 36 is measured from the inner surface 32 to the ground-engaging outer surface 31 of the carcass 35 between longitudinally-adjacent ones of the traction projections $61_1$-$61_M$. For example, in some embodiments, the thickness $T_c$ of the carcass 36 may be no more than 0.375 inches, in some cases no more than 0.325 inches, in some cases no more than 0.275 inches, in some cases no more than 0.225 inches, in some cases no more than 0.200 inches, and in some cases even less (e.g., 0.180 or 0.170 inches). The thickness $T_c$ of the carcass 36 may have any other suitable value in other embodiments.

Figure 13:
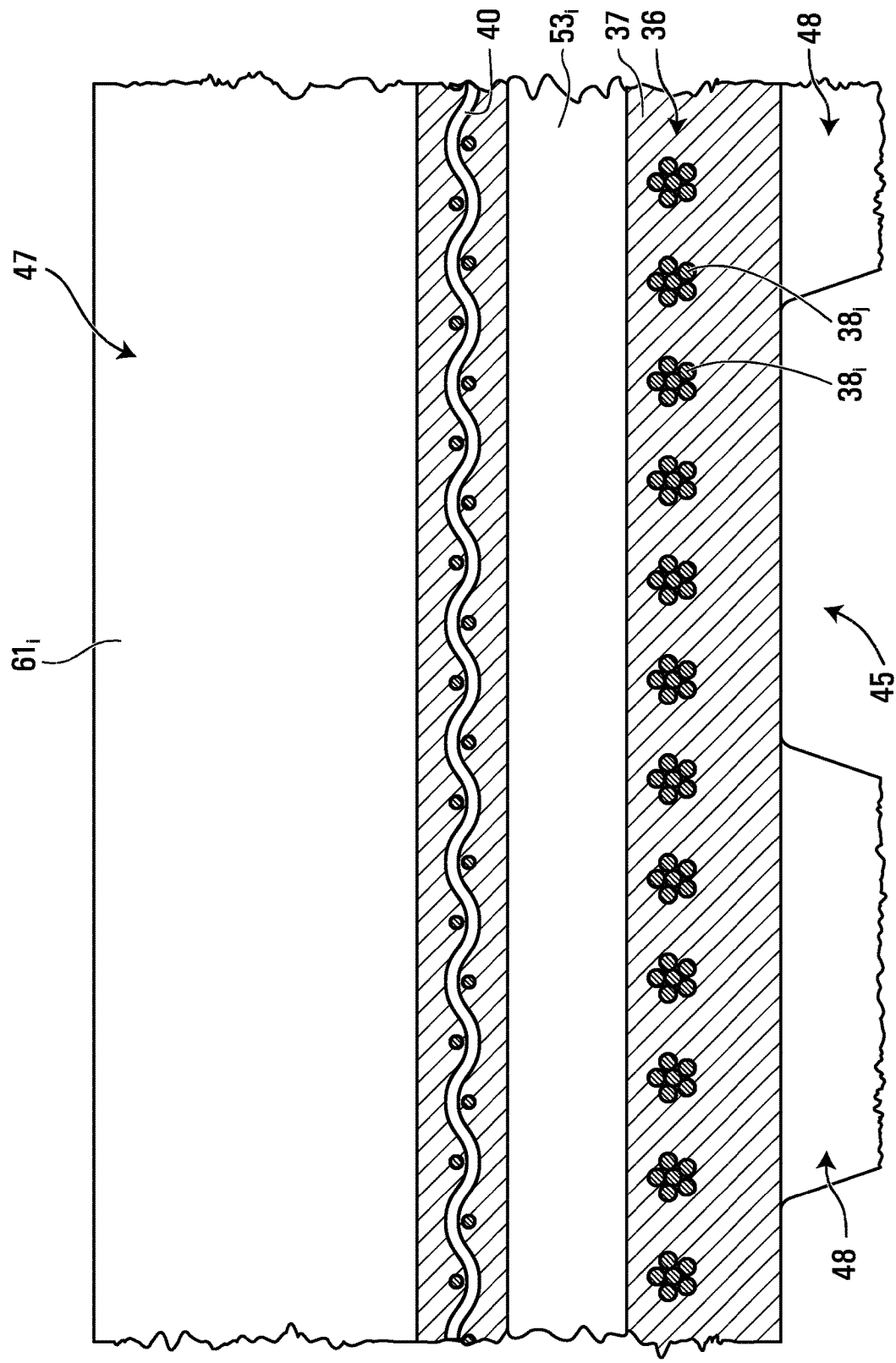
FIG. 13 shows a partial cross-sectional view of another embodiment of the track of the track system.
Figure 14A:
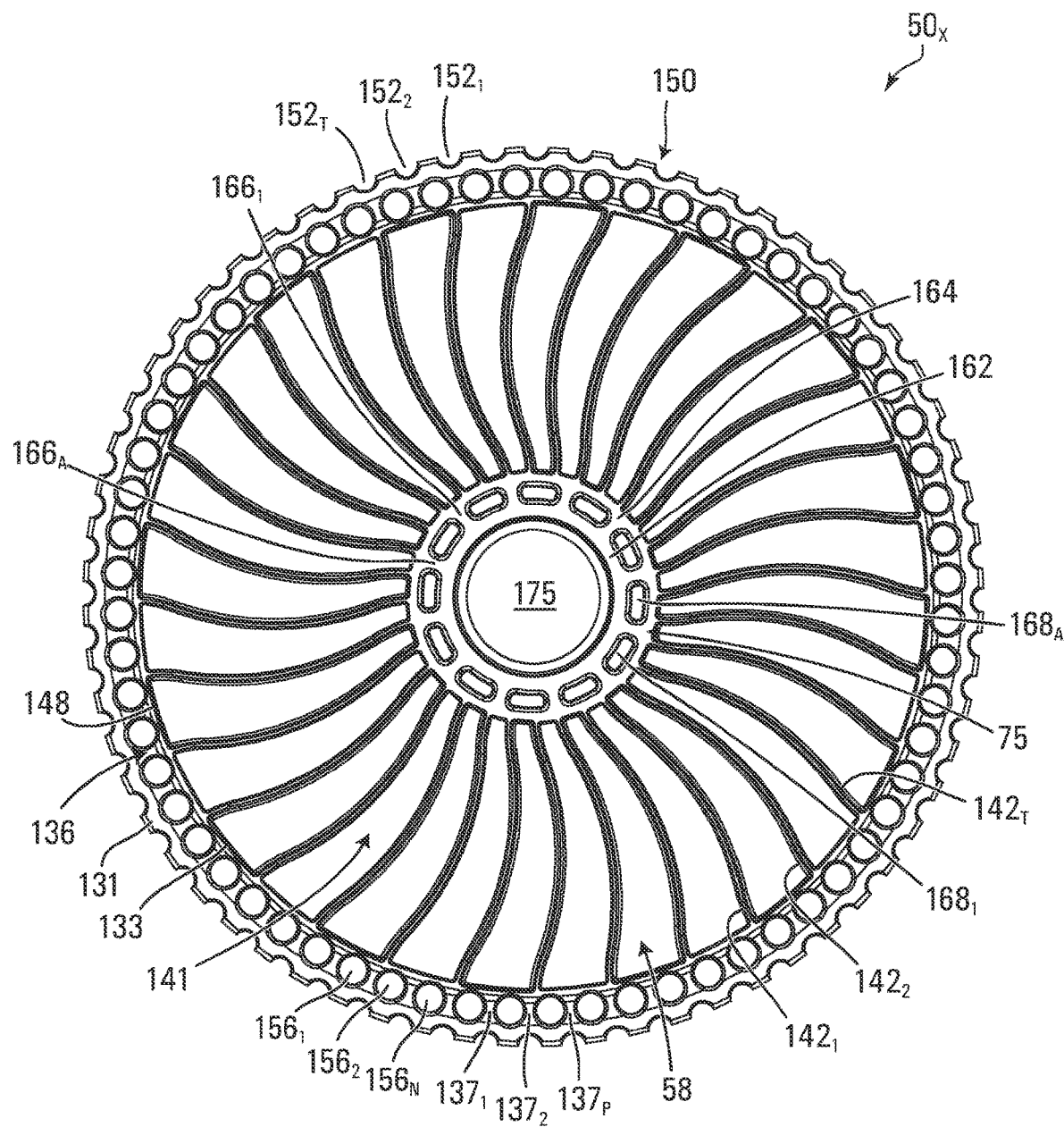
FIGS. 14A and 14B respectively show a side view and a perspective view of an idler wheel of the track system.
Figure 14B:
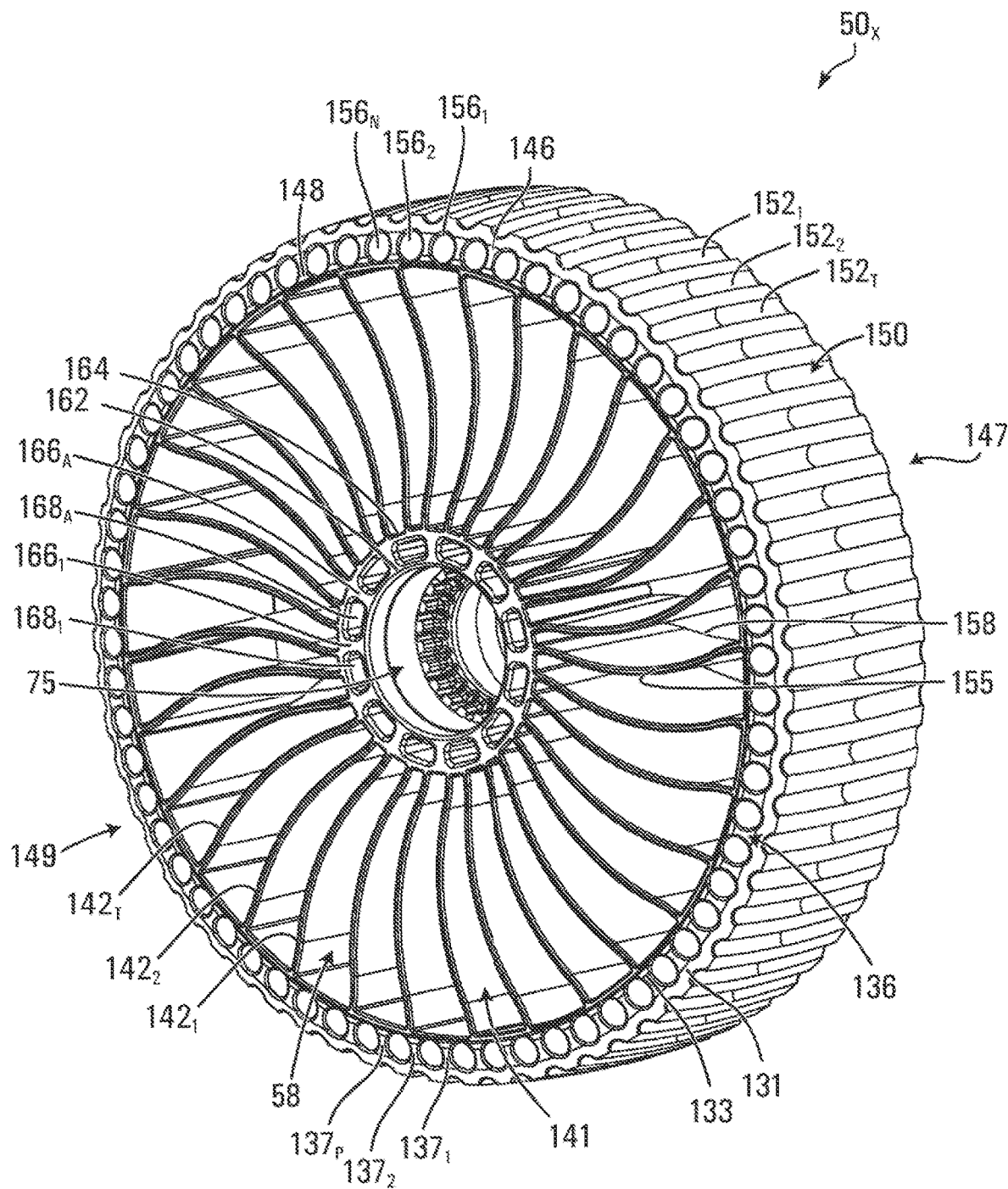
Figure 15:
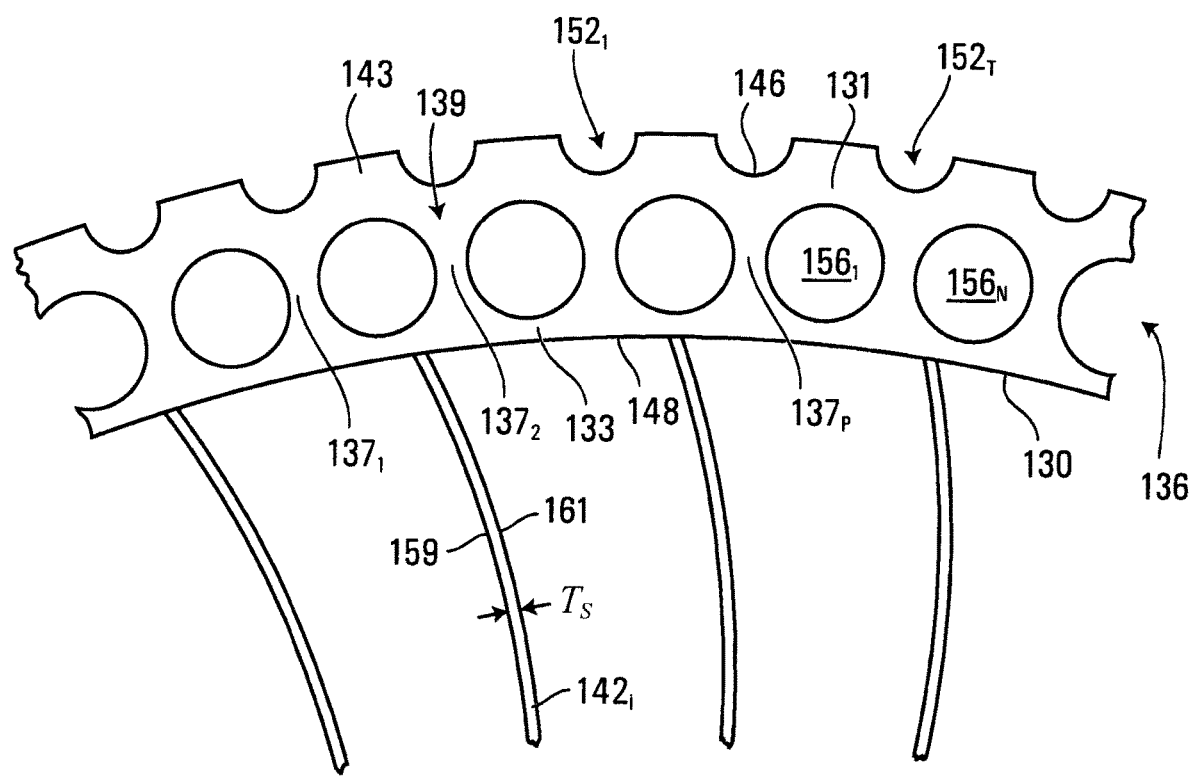
FIG. 15 shows a close-up view of part of a non-pneumatic tire of the idler wheel.
Figure 16:
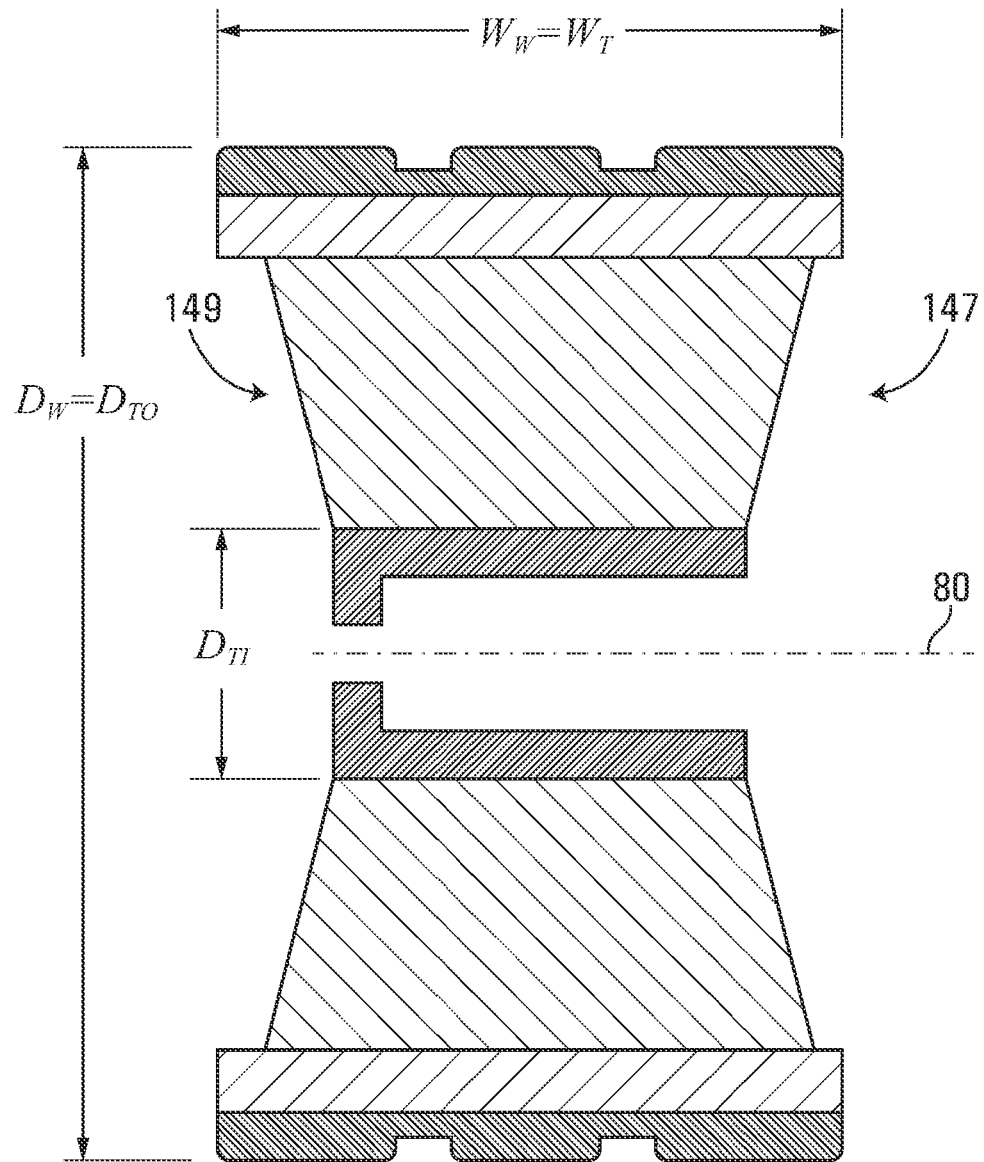
FIG. 16 shows a cross-sectional view of the idler wheel.
Figure 17:
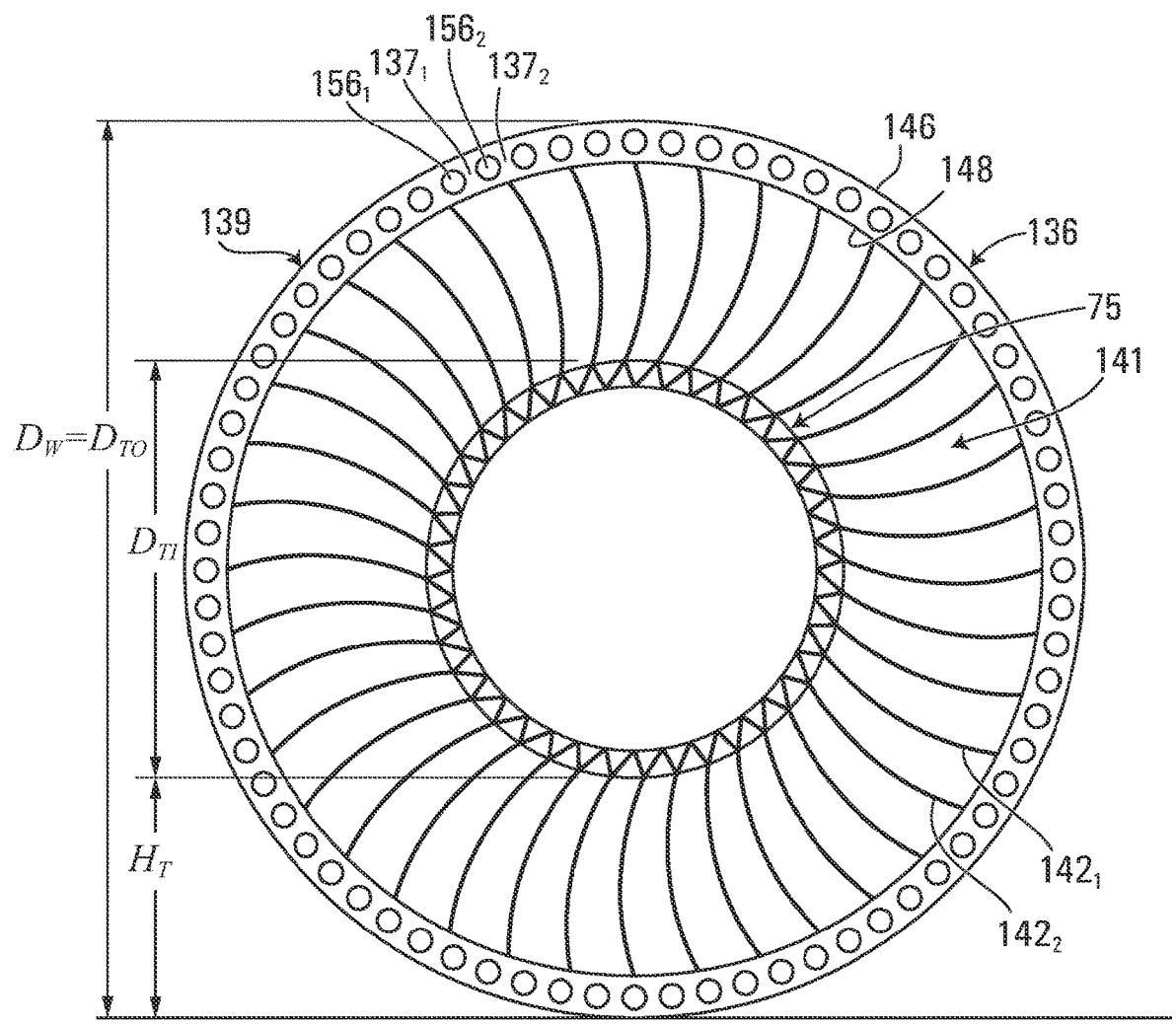
FIGS. 17 to 19 show representations of the idler wheel in different conditions.

In this embodiment, as shown in FIG. 12, the track 41 is free of transversal stiffening rods embedded in its elastomeric material. That is, the track 41 does not comprise transversal stiffening rods embedded in its elastomeric material and extending transversally to its longitudinal direction. FIG. 13 shows a variant in which the track 41 may comprise transversal stiffening rods $53_1$-$53_M$ embedded in its elastomeric material and extending transversally to its longitudinal direction in other embodiments. This absence of transversal stiffening rods makes the track 41 more flexible in its widthwise direction than if the track 41 had the transversal stiffening rods $53_1$-$53_M$ but was otherwise identical.

The track 41 may be constructed in various other ways in other embodiments. For example, in some embodiments, the track 41 may comprise a plurality of parts (e.g., rubber sections) interconnected to one another in a closed configuration, the track 41 may have recesses or holes that interact with the drive wheel 42 in order to cause the track 41 to be driven (e.g., in which case the drive/guide lugs 48 may be used only to guide the track 41 without being used to drive the track 41), and/or the ground-engaging outer side 47 of the track 41 may comprise various patterns of traction projections.

The drive wheel 42 is rotatable about an axis of rotation 49 for driving the track 41 in response to rotation of an axle of the ATV 10. In this example, the axis of rotation 49 corresponds to the axle of the ATV 10. More particularly, in this example, the drive wheel 42 has a hub which is mounted to the axle of the ATV 10 such that power generated by the prime mover 15 and delivered over the powertrain 14 of the ATV 10 rotates the axle, which rotates the drive wheel 42, which imparts motion of the track 41. In this embodiment in which the track system 20$_i$ is mounted where a ground-engaging wheel 21$_i$ could otherwise be mounted, the axle of the ATV 10 is capable of rotating the drive wheel 42 of the track system 20$_i$ or the ground-engaging wheel 21$_i$.

In this embodiment, the drive wheel 42 comprises a drive sprocket 43 engaging the drive/guide lugs 48 of the inner side 45 of the track 41 in order to drive the track 41. In this case, the drive sprocket 43 comprises a plurality of teeth 46$_1$-46$_T$ distributed circumferentially along its rim to define a plurality of lug-receiving spaces therebetween that receive the drive/guide lugs 48 of the track 41. The drive wheel 42 may be configured in various other ways in other embodiments. For example, in embodiments where the track 41 comprises recesses or holes, the drive wheel 42 may have teeth that enter these recesses or holes in order to drive the track 41. As yet another example, in some embodiments, the drive wheel 42 may frictionally engage the inner side 45 of the track 41 in order to frictionally drive the track 41.

The idler wheels 50$_1$-50$_4$, 55$_1$-55$_8$ are not driven by power supplied by the prime mover 15, but are rather used to do at least one of supporting part of the weight of the ATV 10 on the ground via the track 41, guiding the track 41 as it is driven by the drive wheel 42, and tensioning the track 41.

Each of the idler wheels 50$_1$-50$_4$, 55$_1$-55$_8$ has an axial direction defined by an axis of rotation 80 of that idler wheel (also referred to as a "Y" direction), a radial direction (also referred to as a "Z" direction), and a circumferential direction (also referred to as a "X" direction). Each of the idler wheels 50$_1$-50$_4$, 55$_1$-55$_8$ has an outer diameter $D_W$ and a width $W_W$ and comprises an inboard lateral side 47 for facing a center of the ATV 10 in the widthwise direction of the ATV 10 and an outboard lateral side 49 opposite the inboard lateral side 47. Each of the idler wheels 50$_1$-50$_4$, 55$_1$-55$_8$ has an area of contact 25 with the inner side 45 of the track 41 that has a dimension $L_C$, referred to as a "length", in the circumferential direction of that idler wheel and a dimension, referred to as a "width", in the axial direction of that idler wheel.

More particularly, in this embodiment, the leading idler wheels 50$_1$, 50$_2$ and the trailing idler wheels 50$_3$, 50$_4$ maintain the track 41 in tension and can help to support part of the weight of the ATV 10 on the ground via the track 41. The leading idler wheels 50$_1$, 50$_2$ are spaced apart along the widthwise direction of the track system 20$_i$, and so are the trailing idler wheels 50$_3$, 50$_4$.

Each idler wheel 50$_x$ of the leading and trailing idler wheels 50$_1$-50$_4$ contacts the inner side 45 of the track 41 such that a longitudinal end segment 52 of the track 41 turns about the idler wheel 50$_x$. That is, the idler wheel 50$_x$ contacts both the top run 65 of the track 41 and the bottom run 66 of the track 41 such that the longitudinal end segment 52 of the track 41 includes a longitudinal end part 67 of the top run 65 of the track 41 and a longitudinal end part 73 of the bottom run 66 of the track 41. In this embodiment, the longitudinal end segment 52 of the track 41 is located between the axis of rotation 80 of the idler wheel 50$_x$ and a given one of the longitudinal ends 57, 59 of the track system 20$_i$ that is adjacent to the idler wheel 50$_x$. Thus, in this example, the longitudinal end segment 52 of the track 41 is that segment of the track 41 between points $A_1$ and $B_1$ and defines an an angle of wrap a of the track 41 about the idler wheel 50$_x$.

The idler wheels 55$_1$-55$_8$ are roller wheels that roll on the inner side 45 of the track 41 along the bottom run 66 of the track 41 to apply the bottom run 66 on the ground. The idler wheels 55$_1$-55$_8$ move on respective ones of a plurality of idler wheel paths 51$_1$, 51$_2$ of the inner surface 32 of the carcass 35 of the track 41. Each of the idler wheel paths 51$_1$, 51$_2$ extends adjacent to respective ones of the drive/guide lugs 48 to allow these lugs to guide motion of the track 41. As the roller wheels 55$_1$-55$_8$ roll on respective ones of the idler wheel paths 51$_1$, 51$_2$, these paths can be referred to as "rolling paths".

In some embodiments, one or more of the idler wheels 50$_1$-50$_4$, 55$_1$-55$_8$ may be resiliently deformable as the track 41 moves around them, including in response to encountering obstacles of the ground (e.g., rocks, portions of trees, debris, bumps, abrupt changes in ground level, etc.). This may help to absorb shocks when the track system 20$_i$ encounters obstacles and/or may make it easier for the track system 20$_i$ to surmount obstacles.

That is, in some embodiments, an idler wheel 50$_i$ or 55$_i$ may deform under load and regain its original shape upon removal of the load. The idler wheel 50$_i$ or 55$_i$ comprises a resiliently-deformable wheel portion 77. For example, in some embodiments, the resiliently-deformable wheel portion 77 may comprise a tire. For instance, in some embodiments, the tire may be a non-pneumatic tire. In other embodiments, the tire may be a pneumatic tire.

For example, in some embodiments, each idler wheel 50$_x$ of the leading and trailing idler wheels 50$_1$-50$_4$ may be resiliently deformable in response to encountering obstacles. By resiliently deforming, the idler wheel 50$_x$ allows a change in curvature of the longitudinal end segment 52 of the track 41 when the longitudinal end segment 52 of the endless track 41 contacts an obstacle on the ground. For instance, when the longitudinal end segment 52 of the track 41 adjacent to the idler wheel 50$_x$ contacts an obstacle as the ATV 10 moves, the idler wheel 50$_x$ can elastically deform, by being elastically compressed under load, to allow a change in curvature of the longitudinal end segment 52 of the track 41 in order to generally conform to a contacted part of the obstacle. This elastic deformation of the idler wheel 50$_x$ absorbs at least part of a shock resulting from contact with the obstacle. Also, the change in curvature of the longitudinal end segment 52 of the track 41 may enhance its traction on the obstacle and can thus facilitate climbing of the track system 16$_i$ over the obstacle. As the obstacle is surmounted and stress on the idler wheel 50$_x$ that had been compressed is reduced, the idler wheel 50$_x$ can regain its original shape.

The idler wheels 50$_1$-50$_4$, 55$_1$-55$_8$ may be arranged in other configurations and/or the track system 20$_i$ may comprise more or less idler wheels in other embodiments.

The frame 44 supports components of the track system 20$_i$, including the idler wheels 50$_1$-50$_4$, 55$_1$-55$_8$. More particularly, in this embodiment, the front idler wheels 50$_1$, 50$_2$ are mounted to the frame 44 in a front longitudinal end region of the frame 44 proximate the front longitudinal end 57 of the track system 20$_i$, while the rear idler wheels 50$_3$, 50$_4$ are mounted to the frame 44 in a rear longitudinal end region of the frame 44 proximate the rear longitudinal end 59 of the track system $20_i$. The roller wheels $55_1$-$55_8$ are mounted to the frame 44 in a central region of the frame 44 between the front idler wheels $50_1$, $50_2$ and the rear idler wheels $50_3$, $50_4$. Each of the roller wheels $55_1$-$55_8$ may be rotatably mounted directly to the frame 44 or may be rotatably mounted to a link which is pivotally mounted to the frame 44 to which is rotatably mounted an adjacent one of the roller wheels $55_1$-$55_8$, thus forming a "tandem".

The frame 44 is supported at a support area 39. More specifically, in this case, the frame 44 is supported by the axle of the ATV 10 to which is coupled the drive wheel 42, such that the support area 39 is intersected by the axis of rotation 49 of the drive wheel 42.

In this embodiment, the track system $20_i$ is movable relative to the frame 12 of the ATV 10, such as when the ATV 10 travels on uneven terrain. More particularly, the frame 44 of the track system $20_i$ is movable relative to the frame 12 of the ATV 10 to facilitate motion of the track system $20_i$ on uneven terrain and enhance its traction on the ground. The frame 44 of the track system $20_i$ is pivotable relative to the frame 12 of the ATV 10 about a pivot axis 51. More specifically, in this embodiment, the pivot axis 51 corresponds to the axis of rotation 49 of the drive wheel 42 and the frame 44 can pivot about the axle of the ATV 10 to which the drive wheel 42 is coupled. In other embodiments, the pivot axis 51 of the frame 44 may be located elsewhere (e.g., lower) than the axis of rotation 49 of the drive wheel 42.

The idler wheels $50_1$-$50_4$, $55_1$-$55_8$ may be designed to enhance use or performance of the track system $20_i$ and/or the ATV 10, such as, for example, by being lightweight and/or by better handling loads, including, for instance, those resulting from tension of the track 41 (e.g., at low speed and high torque) and/or from unevenness or other aspects of the ground, including impacts with obstacles on the ground (e.g., at high speed).

Examples of embodiments in which this may be achieved in respect of the leading and trailing idler wheels $50_1$-$50_4$ are discussed below.

1. Idler Wheel Comprising a Non-Pneumatic Tire (NPT)

In some embodiments, as shown in FIGS. 14 to 18, each idler wheel $50_x$ of the leading and trailing idler wheels $50_1$-$50_4$ comprises a non-pneumatic tire 58 and a hub 75 for connecting the idler wheel $50_x$ to the frame 44 of the track system $20_i$. The non-pneumatic tire 58 is a compliant wheel structure that is not supported by gas (e.g., air) pressure and that is resiliently deformable (i.e., resiliently changeable in configuration) as the track system $20_i$ contacts the ground.

The non-pneumatic tire 58 comprises an annular beam 136 and an annular support 141 that is disposed between the annular beam 136 and the hub 75 and configured to support loading on the idler wheel $50_x$ as the track system $20_i$ engages the ground. In this embodiment, the non-pneumatic tire 58 is tension-based such that the annular support 141 is configured to support the loading on the idler wheel $50_x$ by tension. That is, under the loading on the idler wheel $50_x$ (i.e., due to loading on the track system $20_i$, the tension of the track 41, etc.), the annular support 141 is resiliently deformable such that a portion 127 of the annular support 141 between the axis of rotation 80 of the idler wheel $50_x$ and the area of contact 25 of the idler wheel $50_x$ with the track 41 is compressed and a portion 129 of the annular support 141 between the axis of rotation 80 of the idler wheel $50_x$ and a peripheral part 27 of the idler wheel $50_x$ not in contact with the track 41 is in tension to support the loading.

The annular beam 136 of the non-pneumatic tire 58 is configured to deflect under the loading on the idler wheel $50_x$ at the area of contact 25 of the idler wheel $50_x$ with the track 41. in some situations, depending on the loading on the idler wheel $50_x$ (e.g., such as when the idler wheel $50_x$ encounters an obstacle on the ground), as discussed later, the annular beam 136 can function like a beam in transverse deflection. An outer peripheral extent 146 of the annular beam 136 and an inner peripheral extent 148 of the annular beam 136 deflect at the area of contact 25 of the idler wheel $50_x$ with the inner side 45 of the track 41 under the loading on the idler wheel $50_x$.

More particularly, in this embodiment, the annular beam 136 comprises a shear band 139. In some situations, such as when the idler wheel $50_x$ encounters an obstacle on the ground, the shear band 139 is configured to deflect predominantly by shearing at the area of contact 25 of the idler wheel $50_x$ with the track 41 under the loading on the idler wheel $50_x$. That is, under the loading on the idler wheel $50_x$ when encountering an obstacle on the ground, the shear band 139 deflects significantly more by shearing than by bending at the area of contact 25 of the idler wheel $50_x$ with the track 41. The shear band 139 is thus configured such that, at a center of the area of contact 25 of the idler wheel $50_x$ with the track 41 in the circumferential direction of the idler wheel $50_x$, a shear deflection of the shear band 139 is significantly greater than a bending deflection of the shear band 139. For example, in some embodiments, at the center of the area of contact 25 of the idler wheel $50_x$ with the track 41 in the circumferential direction of the idler wheel $50_x$, a ratio of the shear deflection of the shear band 139 over the bending deflection of the shear band 139 may be at least 1.2, in some cases at least 1.5, in some cases at least 2, in some cases at least 3, and in some cases even more (e.g., 4 or more). For instance, in some embodiments, the annular beam 136 may be designed based on principles discussed in U.S. Patent Application Publication 2014/0367007, which is hereby incorporated by reference herein.

Figure 21:
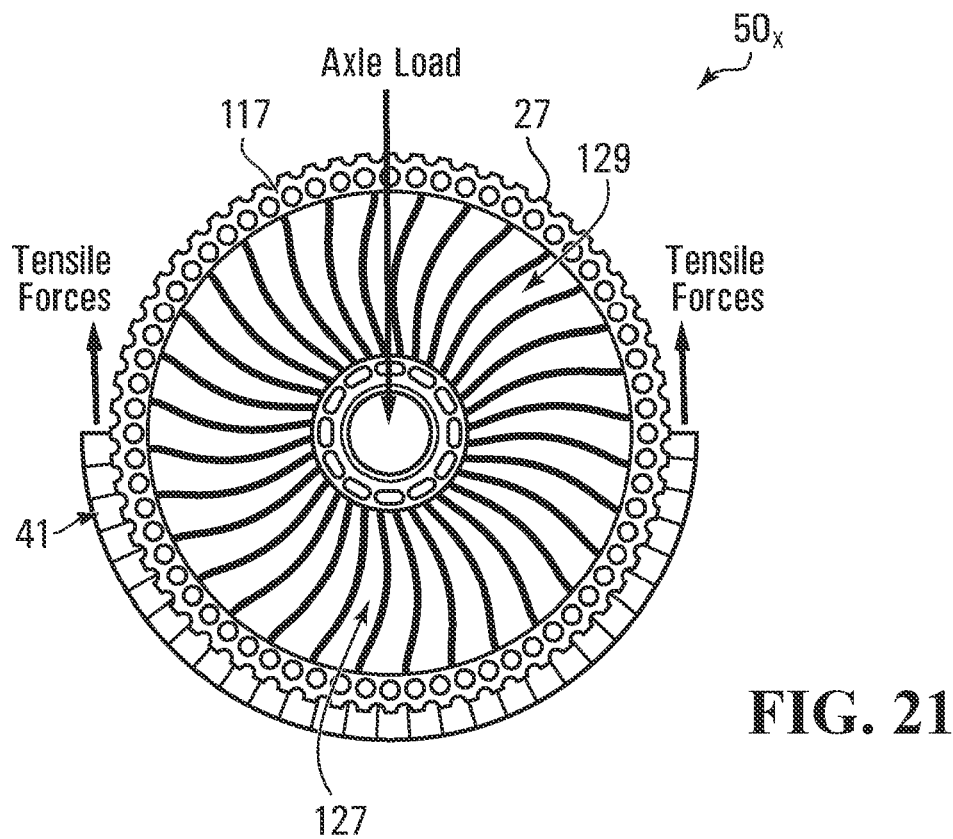
FIG. 21 shows a representation of an embodiment of the idler wheel and the track.
Figure 22:
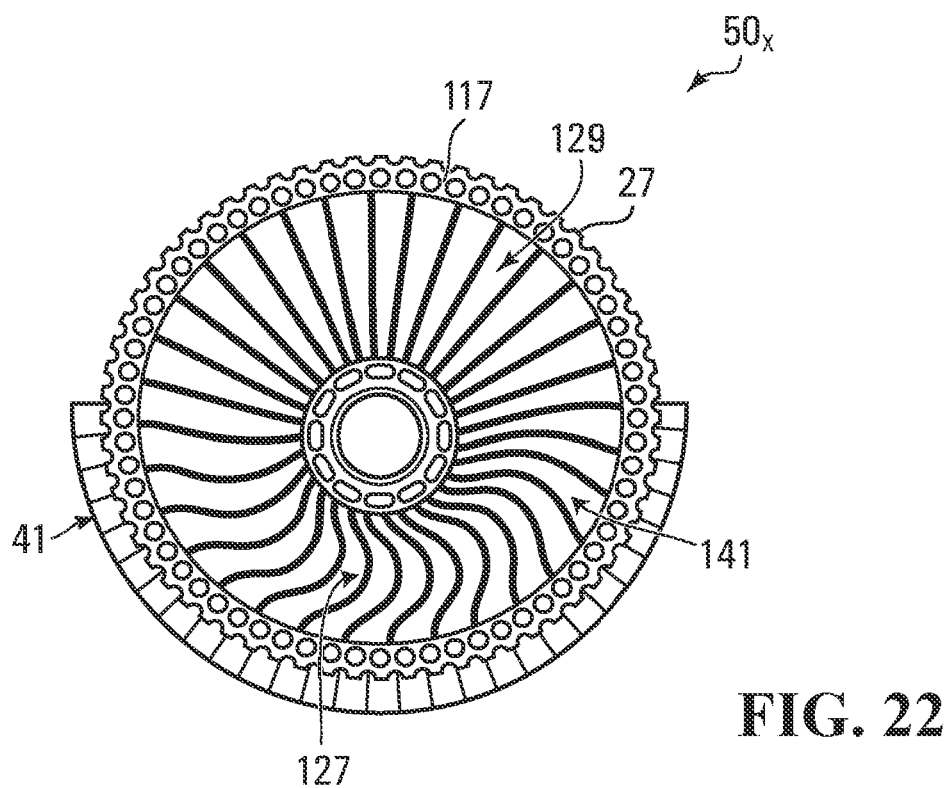
FIG. 22 shows the idler wheel under the track tension load.

The annular beam 136 therefore has a high bending stiffness and a comparatively low shear stiffness. As such, the annular beam 136, including the shear band 139, will deflect due to a shear force more easily than it will deflect due to a bending moment. The loading to which the annular beam 136 of the idler wheel $50_x$ is subjected to can be at least predominantly bending-based or at least predominantly shear-based in various situations, explained as follows:

At least predominantly bending-based (i.e., predominantly or entirely bending-based): with reference to FIGS. 21 and 22, a portion 117 of the annular beam 136 corresponding to the peripheral part 27 of the idler wheel $50_x$ not in contact with the track 41 functions like an arch. This arch supports tension loads from the portion 129 of the annular support 141 between the axis of rotation 80 of the idler wheel $50_x$ and the peripheral part 27 of the idler wheel $50_x$ not in contact with the track 41 and transmits a large bending moment. This can occur when the loading on the idler wheel $50_x$ is at least predominantly due to the tension of the track 41 in contact with it in normal operation without any obstacle encountering the idler wheel $50_x$.

Figure 18:
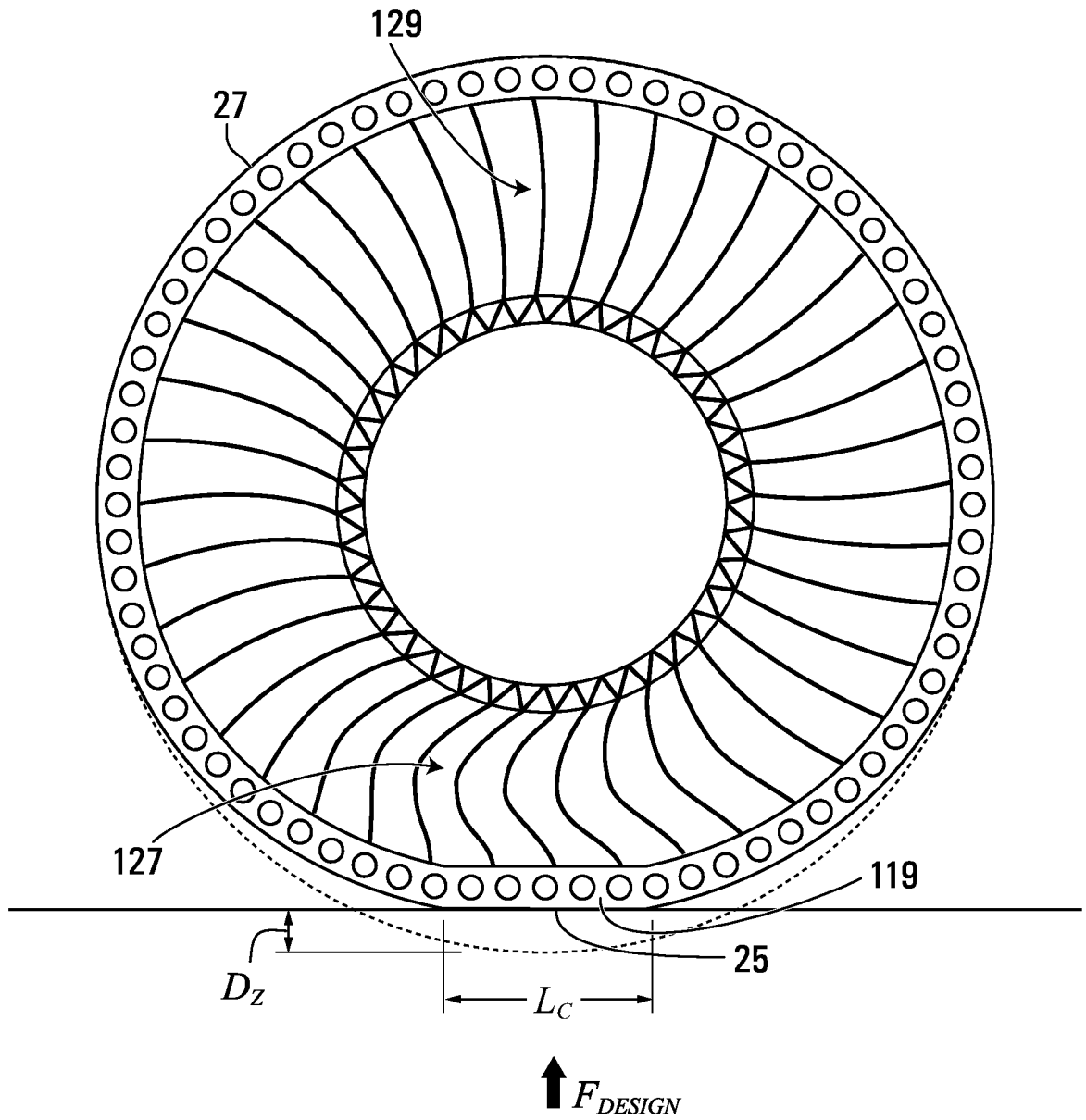
Figure 19:
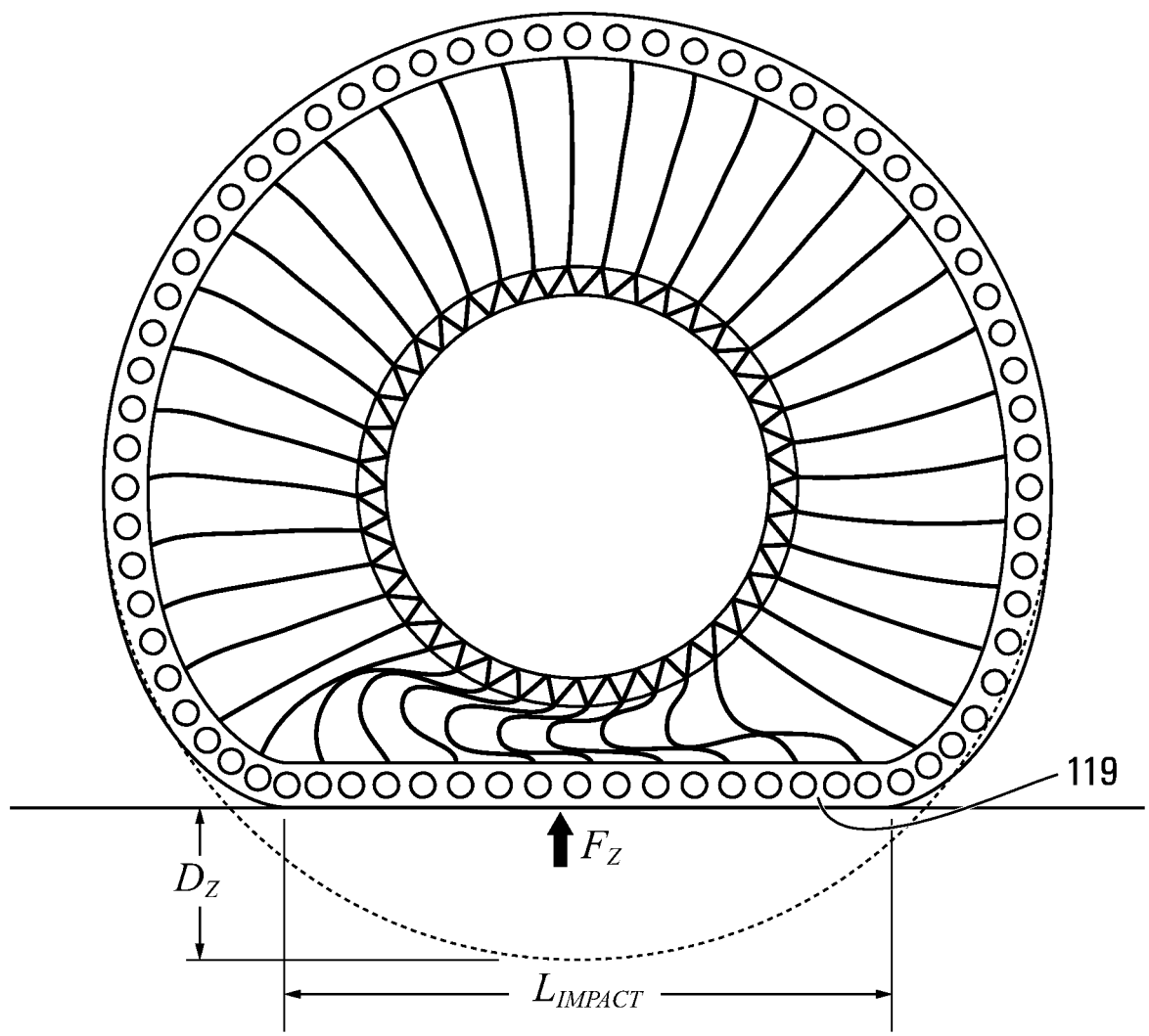
Figure 23:
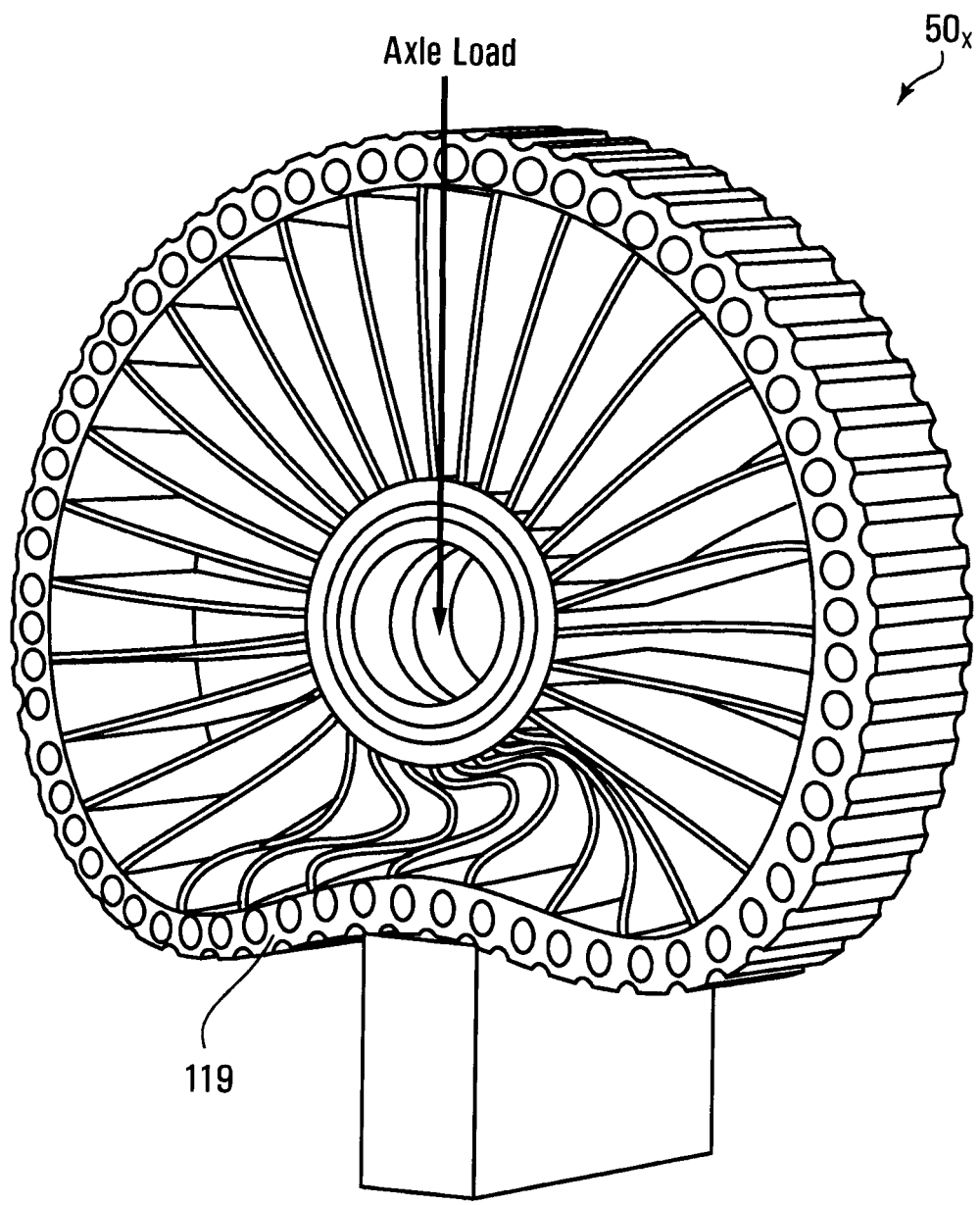
FIG. 23 shows the idler wheel under an obstacle load.

At least predominantly shear-based (i.e., predominantly or entirely shear-based): in FIGS. 18, 19, and 23, a portion 119 of the annular beam 136 is subjected to a transverse deflection which is accompanied by large shear forces acting on the annular beam 136. This may occur, for instance, when the idler wheel $50_x$ encounters an obstacle on the ground. In the case of FIGS. 18 and 19, the annular beam 136 is loaded against a flat surface, which can represent what happens when the obstacle is mild. In the case of FIG. 23, the annular beam 136 is loaded against a sharp object, which can represent what happens when the obstacle is more severe.

Since it is stiff in bending and compliant in shear, the annular beam 136 will be stiff, with little deflection, in the load case of FIG. 22, and, conversely, will deflect comparatively easily for the load cases shown in FIGS. 18, 19, and 23 in which the transverse beam deflection due to shear will be higher than the deflection due to bending.

The idler wheel $50_x$ does, however, deflect when subjected to the load of FIG. 22. This is due to bending of elements (e.g., spokes) of the portion 127 of the annular support 141 between the axis of rotation 80 of the idler wheel $50_x$ and the area of contact 25 of the idler wheel $50_x$ with the track 41 that are compressed.

The annular beam 136 remains basically an annular form which is translated (e.g., up in this figure) due to tensile forces of the track 41 shown in FIG. 21. This movement can sometimes be referred to a counter deflection. Yet, as the load is also supported in tension by elements (e.g., spokes) of the portion 129 of the annular support 141 between the axis of rotation 80 of the idler wheel $50_x$ and the peripheral part 27 of the idler wheel $50_x$ not in contact with the track 41, the idler wheel $50_x$ develops only a small deflection, even when subjected to large track loads under normal operation.

Through extensive numerical and physical testing, the inventors have developed useful relationships between deflection due to bending and deflection due to shear, for cases where the annular beam 136 is subjected to a transverse deflection. This can occur during an encounter with an obstacle on the ground, such as an impact with the obstacle. While the physics of an obstacle impact, such as shown in FIG. 23, may be complex, this can be related to the simple case shown in FIG. 19 where an impact occurs when loaded against a flat surface. For example, in some embodiments, a contact length $L_{IMPACT}$ equal to 40% of the outer diameter $D_W$ of the idler wheel $50_x$ correlates to a moderate to severe impact deflection.

When the deflection due to shear is higher than the deflection due to bending, the annular beam 136 becomes fairly complaint in transverse beam deflection. This may be very favorable to operation of the track system $20_i$, as it may decouple a stiffness of the idler wheel $50_x$ in normal operation to the stiffness of the idler wheel $50_x$ in impact loading, which will be further discussed in a later section.

For instance, in some embodiments, the inventors have found that a ratio of a deflection due to bending to a deflection due to shear of 2:1 when the annular beam 136 is loaded against a flat surface to a contact length of 40% of the outer diameter of the idler wheel $50_x$ may provide good wheel performance. In some embodiments, this ratio can be 3:1, in others 4:1, and in some cases even higher.

In this example of implementation, the shear band 139 comprises an outer rim 131, an inner rim 133, and a plurality of openings $156_1$-$156_N$ between the outer rim 131 and the inner rim 133. The shear band 139 comprises a plurality of interconnecting members $137_1$-$137_P$ that extend between the outer rim 131 and the inner rim 133 and are disposed between respective ones of the openings $156_1$-$156_N$. The interconnecting members $137_1$-$137_P$ may be referred to as "webs" such that the shear band 139 may be viewed as being "web-like" or "webbing". The shear band 139, including the openings $156_1$-$156_N$ and the interconnecting members $137_1$-$137_P$, may be arranged in any other suitable way in other embodiments.

The openings $156_1$-$156_N$ of the shear band 139 help the shear band 139 to deflect predominantly by shearing at the area of contact 25 of the idler wheel $50_x$ with the track 41 under the loading on the idler wheel $50_x$ in some situations as discussed above. In this embodiment, the openings $156_1$-$156_N$ extend from the inboard lateral side 147 to the outboard lateral side 149 of the non-pneumatic tire 58. That is, the openings $156_1$-$156_N$ extend laterally though the shear band 139 in the axial direction of the idler wheel $50_x$. The openings $156_1$-$156_N$ may extend laterally without reaching the inboard lateral side 147 and/or the outboard lateral side 149 of the non-pneumatic tire 58 in other embodiments. The openings $156_1$-$156_N$ may have any suitable shape. In this example, a cross-section of each of the openings $156_1$-$156_N$ is circular. The cross-section of each of the openings $156_1$-$156_N$ may be shaped differently in other examples (e.g., polygonal, partly curved and partly straight, etc.). In some cases, different ones of the openings $156_1$-$156_N$ may have different shapes. In some cases, the cross-section of each of the openings $156_1$-$156_N$ may vary in the axial direction of the idler wheel $50_x$. For instance, in some embodiments, the openings $156_1$-$156_N$ may be tapered in the axial direction of the idler wheel $50_x$ such that their cross-section decreases inwardly axially (e.g., to help minimize debris accumulation within the openings $156_1$-$156_N$).

In this embodiment, the non-pneumatic tire 58 comprises a tread 150 for engaging the track 41. The tread 150 may enhance frictional engagement (e.g., "gripping") of the idler wheel $50_x$ on the inner surface 32 of the track 41. The tread 150 is disposed about the outer peripheral extent 146 of the annular beam 136, in this case about the outer rim 131 of the shear band 139. More particularly, in this example the tread 150 comprises a tread base 143 that is at the outer peripheral extent of the tread 150 and a plurality of tread recesses $152_1$-$152_T$ that project from the tread base 143 towards the axis of rotation 80 of the idler wheel $50_x$ in the radial direction of the non-pneumatic tire 58. The tread recesses $152_1$-$152_T$ are spaced apart in the circumferential direction of the non-pneumatic tire 58 and extend across at least a majority of a width $W_T$ of the non-pneumatic tire. More particularly, in this example, the tread recesses $152_1$-$152_T$ extends across substantially an entirety of the width $W_T$ of the non-pneumatic tire 58. The tread 150 may be implemented in any other suitable way in other embodiments (e.g., may comprise a plurality of tread projections, etc.).

The annular support 141 is configured to support the loading on the idler wheel $50_x$ as the track system $20_i$ engages the ground. As mentioned above, in this embodiment, the annular support 141 is configured to support the loading on the idler wheel $50_x$ by tension. More particularly, in this embodiment, the annular support 141 comprises a plurality of support members $142_1$-$142_T$ that are distributed around the non-pneumatic tire 58 and resiliently deformable such that, under the loading on the idler wheel $50_x$, respective ones of the support members $142_1$-$142_T$ in the portion 127 of the annular support 141 between the axis of rotation 80 of the idler wheel $50_x$ and the area of contact 25 of the idler wheel $50_x$ with the track 41 are compressed and bend while other ones of the support members $142_1$-$142_T$ in the portion 129 of the annular support 141 between the axis of rotation 80 of the idler wheel $50_x$ and the peripheral part 27 of the idler wheel $50_x$ not in contact with track 41 are tensioned to support the loading. As they support load by tension when in the portion 129 of the annular support 141, the support members $142_1$-$142_T$ may be referred to as "tensile" members.

In this embodiment, the support members $142_1$-$142_T$ are elongated and extend from the annular beam 136 towards the hub 75 generally in the radial direction of the idler wheel $50_x$. In that sense, the support members $142_1$-$142_T$ may be referred to as "spokes" and the annular support 141 may be referred to as a "spoked" support.

More particularly, in this embodiment, the inner peripheral extent 148 of the annular beam 136 is an inner peripheral surface of the annular beam 136 and each spoke $142_i$ extends from the inner peripheral surface 148 of the annular beam 136 towards the hub 75 generally in the radial direction of the idler wheel $50_x$ and from a first lateral end 155 to a second lateral end 158 in the axial direction of the idler wheel $50_x$. In this case, the spoke $142_i$ extends in the axial direction of the idler wheel $50_x$ for at least a majority of a width $W_T$ of the non-pneumatic tire 58, which in this case corresponds to the width $W_W$ of the idler wheel $50_x$. For instance, in some embodiments, the spoke $142_i$ may extend in the axial direction of the idler wheel $50_x$ for more than half, in some cases at least 60%, in some cases at least 80%, and in some cases an entirety of the width $W_T$ of the non-pneumatic tire 58. Moreover, the spoke $142_i$ has a thickness $T_S$ measured between a first surface face 159 and a second surface face 161 of the spoke $142_i$ that is significantly less than a length and width of the spoke $142_i$.

When the track system $20_i$ moves on the ground, respective ones of the spokes $142_1$-$142_T$ that are disposed in the portion 129 of the spoked support 141 between the axis of rotation 80 of the idler wheel $50_x$ and the peripheral part 27 of the idler wheel $50_x$ not in contact with track 41 are placed in tension while respective ones of the spokes $142_1$-$142_T$ that are disposed in the portion 127 of the spoked support 141 between the area of contact 25 of the idler wheel $50_x$ with the track 41 are placed in compression. The spokes $142_1$-$142_T$ in the portion 127 of the spoked support 141 which are in compression bend in response to the load. Conversely, the spokes $142_1$-$142_T$ in the portion 129 of the spoked support 141 which are placed in tension support the load by tension.

The non-pneumatic tire 58 has an inner diameter $D_{TI}$ and an outer diameter $D_{TO}$, which in this case corresponds to the outer diameter $D_W$ of the leading idler wheels $50_1$, $50_2$. A sectional height $H_T$ of the non-pneumatic tire 58 is half of a difference between the outer diameter $D_{TO}$ and the inner diameter $D_{TI}$ of the non-pneumatic tire 58. The sectional height $H_T$ of the tire may be significant in relation to the width $W_T$ of the non-pneumatic tire 58. In other words, an aspect ratio AR of the non-pneumatic tire 58 corresponding to the sectional height $H_T$ over the width $W_T$ of the non-pneumatic tire 58 may be relatively high. For instance, in some embodiments, the aspect ratio AR of the non-pneumatic tire 58 may be at least 70%, in some cases at least 90%, in some cases at least 110%, and in some cases even more. Also, the inner diameter $D_{TI}$ of the non-pneumatic tire 58 may be significantly less than the outer diameter $D_{TO}$ of the non-pneumatic tire 58 as this may help for compliance of the idler wheel $50_x$. For example, in some embodiments, the inner diameter $D_{TI}$ of the non-pneumatic tire 58 may be no more than half of the outer diameter $D_{TO}$ of the non-pneumatic tire 58, in some cases less than half of the outer diameter $D_{TO}$ of the non-pneumatic tire 58, in some cases no more than 40% of the outer diameter $D_{TO}$ of the non-pneumatic tire 58, in some cases no more than 30% of the outer diameter $D_{TO}$ of the non-pneumatic tire 58, and in some cases even a smaller fraction of the outer diameter $D_{TO}$ of the non-pneumatic tire 58.

In this embodiment, the width $W_T$ of the non-pneumatic tire 58, which corresponds to the width $W_w$ of the idler wheel $50_x$ in this case, may be significant in relation to the width $W_{TR}$ of the track 41. For instance, in some embodiments, a ratio of the width $W_T$ of the non-pneumatic tire 58 over the width $W_{TR}$ of the track 41 may be at least 0.2, in some cases at least 0.3, in some cases at least 0.4, in some cases at least 0.5, and in some cases even more. For example, in some embodiments, a total width $W_{wt}$ of the leading idler wheels $50_1$, $50_2$ or of the trailing idler wheels $50_3$, $50_4$ (i.e., a sum of the widths $W_w$ of the leading idler wheels $50_1$, $50_2$ or of the widths $W_w$ of the trailing idler wheels $50_3$, $50_4$) may correspond to a majority of the width of the track 41. For instance, in some embodiments, the total width $W_{wt}$ of the leading idler wheels $50_1$, $50_2$ or of the trailing idler wheels $50_3$, $50_4$ may correspond to at least 60%, in some cases at least 70%, in some cases at least 80%, and in some cases an even greater part (e.g., up to an entirety) of the width of the track 41.

The hub 75 is disposed centrally of the tire 34 and connects the idler wheel $50_x$ to an axle 56 about which the idler wheel $50_x$ rotates relative to the frame 44 of the track system $20_i$. In this embodiment, the hub 75 comprises an inner member 162, an outer member 164 radially outward of the inner member 162, and a plurality of interconnecting members $166_1$-$166_4$ that interconnect the inner member 162 and the outer member 164 and define openings $168_1$-$168_4$ there between. The hub 75 comprises an opening 175 for receiving the axle 56. The opening 175 may also receive another element (e.g., a bushing) in addition to the axle 56 in some embodiments. The hub 75 may be implemented in any other suitable manner in other embodiments (e.g., it may have any other suitable shape or design).

The idler wheel $50_x$ may be made up of one or more materials. The non-pneumatic tire 58 comprises a tire material that makes up at least a substantial part (i.e., a substantial part or an entirety) of the non-pneumatic tire 58. The hub 75 comprises a hub material that makes up at least a substantial part of the hub 75. In some embodiments, the tire material and the hub material may be different materials. In other embodiments, the tire material and the hub material may be a common material (i.e., the same material).

In this embodiment, the tire material constitutes at least part of the annular beam 136 and at least part of the spokes $142_1$-$142_T$. Also, in this embodiment, the tire material constitutes at least part of the tread 150. More particularly, in this embodiment, the tire material constitutes at least a majority (e.g., a majority or an entirety) of the annular beam 136, the tread 150, and the spokes $142_1$-$142_T$. In this example of implementation, the tire material makes up an entirety of the tire 134, including the annular beam 136, the spokes $142_1$-$142_T$, and the tread 150. The non-pneumatic tire 58 is thus monolithically made of the tire material. In this example, therefore, the annular beam 136 is free of (i.e., without) a substantially inextensible reinforcing layer running in the circumferential direction of the idler wheel $50_x$ (e.g., a layer of metal, composite (e.g., carbon fibers, other fibers), and/or another material that is substantially inextensible running in the circumferential direction of the idler wheel $50_x$). In that sense, the annular beam 136 may be said to be "unreinforced".

The tire material is elastomeric. For example, in this embodiment, the tire material comprises a polyurethane (PU) elastomer. For instance, in some cases, the PU elastomer may be composed of a TDI pre-polymer, such as PET-95A, cured with MCDEA, commercially available from COIM. Other materials that may be suitable include using PET95-A or PET60D, cured with MOCA. Other materials available from Chemtura may also be suitable. These may include Adiprene E500X and E615X prepolymers, cured with C3LF or HQEE curative. Blends of the above prepolymers are also possible. Prepolymer C930 and C600, cured with C3LF or HQEE may also be suitable, as are blends of these prepolymers.

Polyurethanes that are terminated using MDI or TDI are possible, with ether and/or ester and/or polycaprolactone formulations, in addition to other curatives known in the cast polyurethane industry. Other suitable resilient, elastomeric materials would include thermoplastic materials, such as HYTREL co-polymer, from DuPont, or thermoplastic polyurethanes such as Elastollan, from BASF. Materials in the 95A to 60D hardness level may be particularly useful, such as Hytrel 5556, Hytrel 5526, Laripur 6260, Texin 970 and Elastollan C98A. Some resilient thermoplastics, such as plasticized nylon blends, may also be used. The Zytel line of nylons from DuPont may be particularly useful. The tire material may be any other suitable material in other embodiments.

In this embodiment, the tire material may exhibit a non-linear stress vs. strain behavior. For instance, the tire material may have a secant modulus that decreases with increasing strain of the tire material. The tire material may have a high Young's modulus that is significantly greater than the secant modulus at 100% strain (a.k.a. "the 100% modulus"). Such a non-linear behavior of the tire material may provide efficient load carrying during normal operation and enable impact loading and large local deflections without generating high stresses. For instance, the tire material may allow the non-pneumatic tire 58 to operate at a low strain rate (e.g., 2% to 5%) during normal operation yet simultaneously allow large strains (e.g., when the ATV 10 engages obstacles) without generating high stresses. This in turn may be helpful to minimize vehicle shock loading and enhance durability of the non-pneumatic tire 58.

The non-pneumatic tire 58 may comprise one or more additional materials in addition to the tire material in other embodiments (e.g., different parts of the annular beam 136, different parts of the tread 150, and/or different parts of the spokes $142_i$-$142_T$ may be made of different materials). For example, in some embodiments, different parts of the annular beam 136, different parts of the tread 150, and/or different parts of the spokes $142_1$-$142_T$ may be made of different elastomers. As another example, in some embodiments, the annular beam 136 may comprise one or more substantially inextensible reinforcing layers running in the circumferential direction of the idler wheel $50_x$ (e.g., one or more layers of metal, composite (e.g., carbon fibers, other fibers), and/or another material that is substantially inextensible running in the circumferential direction of the idler wheel $50_x$).

In this embodiment, the hub material constitutes at least part of the inner member 162, the outer member 164, and the interconnecting members $166_1$-$166_4$ of the hub 75. More particularly, in this embodiment, the hub material constitutes at least a majority (e.g., a majority or an entirety) of the inner member 162, the outer member 164, and the interconnecting members $166_1$-$166_4$. In this example of implementation, the hub material makes up an entirety of the hub 75.

In this example of implementation, the hub material is polymeric. More particularly, in this example of implementation, the hub material is elastomeric. For example, in this embodiment, the hub material comprises a polyurethane (PU) elastomer. For instance, in some cases, the PU elastomer may be PET-95A commercially available from COIM, cured with MCDEA.

The hub material may be any other suitable material in other embodiments. For example, in other embodiments, the hub material may comprise a stiffer polyurethane material, such as COIM's PET75D cured with MOCA. In some embodiments, the hub material may not be polymeric. For instance, in some embodiments, the hub material may be metallic (e.g., steel, aluminum, etc.).

The hub 75 may comprise one or more additional materials in addition to the hub material in other embodiments (e.g., different parts of the inner member 162, different parts of the outer member 164, and/or different parts of the interconnecting members $166_1$-$166_4$ may be made of different materials).

The idler wheel $50_x$ may be manufactured in any suitable way. For example, in some embodiments, the non-pneumatic tire 58 and/or the hub 75 may be manufactured via centrifugal casting, a.k.a. spin casting, which involves pouring one or more materials of the idler wheel $50_x$ into a mold that rotates about an axis. The material(s) is(are) distributed within the mold via a centrifugal force generated by the mold's rotation. In some cases, vertical spin casting, in which the mold's axis of rotation is generally vertical, may be used. In other cases, horizontal spin casting, in which the mold's axis of rotation is generally horizontal, may be used. The idler wheel $50_x$ may be manufactured using any other suitable manufacturing processes in other embodiments.

The idler wheel $50_x$ may be lightweight. That is, a mass $M_W$ of the idler wheel $50_x$ may be relatively small. For example, in some embodiments, a ratio $M_{normalized}$ of the mass $M_W$ of the idler wheel $50_x$ in kilograms over the outer diameter $D_W$ of the idler wheel $50_x$ normalized by the width $W_W$ of the idler wheel $50_x$, $$M_{normalized} = \frac{\left(\frac{M_w}{D_w}\right)}{W_w}$$

may be no more than 0.0005 kg/mm², in some cases no more than 0.0004 kg/mm², in some cases no more than 0.0003 kg/mm², in some cases no more than 0.0002 kg/mm², in some cases no more than 0.00015 kg/mm², in some cases no more than 0.00013 kg/mm², in some cases no more than 0.00011 kg/mm², and in some cases even less (e.g., no more than 0.0001).

For instance, in some embodiments, the outer diameter of the idler wheel $50_x$ may be 120 mm (4.7"), the width of the idler wheel $50_x$ may be 60 mm (2.4"), and the mass $M_W$ of the idler wheel $50_x$ may be less than 3 kg, in some cases no more than 2 kg, in some cases no more than 1 kg, and in some cases even less.

While actual track operation is more complex, as previously discussed, good correlation to loading of the idler wheel $50_x$ against a flat surface has been established by the inventors. Thus, in some embodiments, a radial compliance $C_z$ of the idler wheel $50_x$ may be significant, when loaded against a flat surface. That is, a radial stiffness $K_z$ of the idler wheel $50_x$ may be relatively low for shock absorption (e.g., ride quality). The radial stiffness $K_z$ of the idler wheel $50_x$ is a rigidity of the idler wheel $50_x$ in the radial direction of the idler wheel $50_x$, i.e., a resistance of the idler wheel $50_x$ to deformation in the radial direction of the idler wheel $50_x$ when loaded. The radial compliance $C_z$ of the idler wheel $50_x$ is the inverse of the radial stiffness $K_z$ of the idler wheel $50_x$ (i.e., $C_z=1/K_z$).

For example, in some embodiments, a ratio $K_{z\ normalized}$ of the radial stiffness $K_z$ of the idler wheel $50_x$ over the outer diameter $D_W$ of the idler wheel $50_x$ normalized by the width $W_W$ of the idler wheel $50_x$ $$K_{Znormalized} = \frac{K_z}{\frac{D_W}{W_W}}$$

may be between 0.0001 kgf/mm³ and 0.0002 kgf/mm³, where the radial stiffness $K_z$ of the idler wheel $50_x$ is taken at a design load $F_{DESIGN}$ of the idler wheel $50_x$, i.e., a normal load expected to be encountered by the idler wheel $50_x$ in use such that only the tire 34 deflects by a normal deflection. Herein, a force or load may be expressed in units of kilogram-force (kgf), but this can be converted into other units of force (e.g., Newtons).

The radial stiffness $K_z$ of the idler wheel $50_x$ may be evaluated in any suitable way in various embodiments.

For example, in some embodiments, the radial stiffness $K_z$ of the idler wheel $50_x$ may be gauged using a standard SAE J2704.

As another example, in some embodiments, the radial stiffness $K_z$ of the idler wheel $50_x$ may be gauged by standing the idler wheel $50_x$ upright on a flat hard surface and applying a downward vertical load $F_z$ on the idler wheel $50_x$ at the axis of rotation 35 of the idler wheel $50_x$ (e.g., via the hub 32). The downward vertical load $F_z$ causes the idler wheel $50_x$ to elastically deform from its original configuration to a biased configuration by a deflection $D_z$. The deflection $D_z$ is equal to a difference between a height of the idler wheel $50_x$ in its original configuration and the height of the idler wheel $50_x$ in its biased configuration. The radial stiffness $K_z$ of idler wheel $50_x$ is calculated as the downward vertical load $F_Z$ over the measured deflection $D_Z$.

For instance, in some embodiments, the radial stiffness $K_z$ of the idler wheel $50_x$ may be no more than 15 kgf/mm, in some cases no more than 11 kgf/mm, in some cases no more than 8 kgf/mm, and in some cases even less.

The radial compliance $C_z$ of the idler wheel $50_x$ is provided at least by a radial compliance $C_{zt}$ of the non-pneumatic tire 58. For instance, in this embodiment, the spokes $142_1$-$142_T$ can deflect significantly in the radial direction of the idler wheel $50_x$ under the loading on the idler wheel $50_x$.

For example, in some embodiments, a volume fraction $V_{fs}$ of the spoked support 141 comprising the spokes $142_1$-$142_T$ may be minimized. The volume fraction $V_{fs}$ of the spoked support 141 refers to a ratio of a volume occupied by material of the spoked support 141 (i.e., a collective volume of the spokes $142_1$-$142_T$) over a volume bounded by the annular beam 136 and the hub 75. A high value of the volume fraction $V_{fs}$ increases the amount of material between the outer diameter $D_{TO}$ and the inner diameter $D_{TI}$ of the non-pneumatic tire 58, whereas a low value of the volume fraction $V_{fs}$ decreases the amount of material between the outer diameter $D_{TO}$ and the inner diameter $D_{TI}$ of the non-pneumatic tire 58. At very high deflections, as shown in FIG. 19, the spokes $142_1$-$142_T$ begin to self-contact. This, then, enables load transfer from the ground to the hub 75 via compression. While this may be counterintuitive, minimizing material in the spoked support 141 may be beneficial to robustness of the idler wheel $50_x$ in off-road use.

For instance, in some embodiments, the volume fraction $V_{fs}$ of the spoked support 141 may be no more than 15%, in some cases no more than 12%, in some cases no more than 10%, in some cases no more than 8%, in some cases no more than 6%, and in some cases even less. For example, in some embodiments, the volume fraction $V_{fs}$ of the spoked support 141 may be between 6% and 9%.

The non-pneumatic tire 58 of the idler wheel $50_x$ may be implemented in any other suitable way in other embodiments.

For example, in some embodiments, the annular beam 136 of the non-pneumatic tire 58 of the idler wheel $50_x$ may comprise one or more reinforcing layers running in the circumferential direction of the idler wheel $50_x$ to reinforce the annular beam 136, such as one or more substantially inextensible reinforcing layers running in the circumferential direction of the idler wheel $50_x$ (e.g., one or more layers of metal, composite (e.g., carbon fibers, other fibers), and/or another material that is substantially inextensible running in the circumferential direction of the idler wheel $50_x$). For instance, this may reinforce the annular beam 136 by protecting it against cracking and/or by better managing heat generated within it as it deforms in use.

Figure 33:
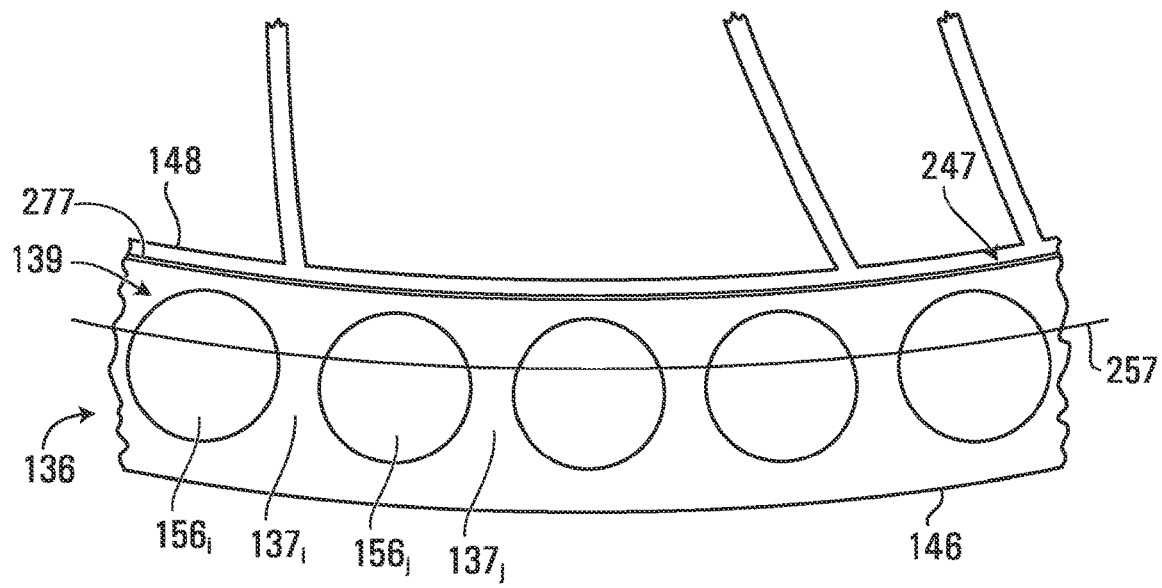
FIG. 33 shows an example of an embodiment in which the annular beam of the non-pneumatic tire comprises a reinforcing layer.

For example, in some embodiments, as shown in FIG. 33, the annular beam 136 may comprise a reinforcing layer 247 running in the circumferential direction of the idler wheel $50_x$.

The reinforcing layer 247 is unnecessary for the annular beam 136 to deflect predominantly by shearing in some situations (e.g., when encountering an obstacle on the ground), i.e., unnecessary for the shear band 139 to deflect significantly more by shearing than by bending at the area of contact 25 of the idler wheel $50_x$ with the track 41. That is, the annular beam 136 would deflect predominantly by shearing even without the reinforcing layer 247. In other words, the annular beam 136 would deflect predominantly by shearing if it lacked the reinforcing layer 247 but was otherwise identical. Notably, in this embodiment, this is due to the openings $156_1$-$156_N$ and the interconnecting members $137_1$-$137_P$ of the shear band 139 that facilitate deflection predominantly by shearing.

The annular beam 136 has the reinforcing layer 247 but is free of any equivalent reinforcing layer running in the circumferential direction of the idler wheel $50_x$ and spaced from the reinforcing layer 247 in the radial direction of the idler wheel $50_x$. That is, the annular beam 136 has no reinforcing layer that is equivalent, i.e., identical or similar in function and purpose, to the reinforcing layer 247 and spaced from the reinforcing layer 247 in the radial direction of the idler wheel $50_x$. The annular beam 136 therefore lacks any reinforcing layer that is comparably stiff to (e.g., within 10% of a stiffness of) the reinforcing layer 247 in the circumferential direction of the idler wheel $50_x$ and spaced from the reinforcing layer 247 in the radial direction of the idler wheel $50_x$.

In this embodiment, the annular beam 136 has the reinforcing layer 247 but is free of any substantially inextensible reinforcing layer running in the circumferential direction of the idler wheel $50_x$ and spaced from the reinforcing layer 247 in the radial direction of the idler wheel $50_x$. Thus, the reinforcing layer 247 is a sole reinforcing layer of the annular beam 136.

More particularly, in this embodiment, the annular beam 136 has the reinforcing layer 247 located on a given side of a neutral axis 257 of the annular beam 136 and is free of any substantially inextensible reinforcing layer running in the circumferential direction of the idler wheel $50_x$ on an opposite side of the neutral axis 257 of the annular beam 136. That is, the reinforcing layer 247 is located between the neutral axis 257 of the annular beam 136 and a given one of the inner peripheral extent 148 and the outer peripheral extent 146 of the annular beam 136 in the radial direction of the idler wheel $50_x$, while the annular beam 136 is free of any substantially inextensible reinforcing layer running in the circumferential direction of the idler wheel $50_x$ between the neutral axis 257 of the annular beam 136 and the other one of the inner peripheral extent 148 and the outer peripheral extent 146 of the annular beam 136 in the radial direction of the idler wheel $50_x$.

The neutral axis 257 of the annular beam 136 is an axis of a cross-section of the annular beam 136 where there is substantially no tensile or compressive stress in the circumferential direction of the idler wheel $50_x$ when the annular beam 136 deflects at the contact patch 25 of the idler wheel $50_x$. In this example, the neutral axis 257 is offset from a midpoint of the annular beam 136 between the inner peripheral extent 148 and the outer peripheral extent 146 of the annular beam 136 in the radial direction of the idler wheel $50_x$. More particularly, in this example, the neutral axis 257 is closer to a given one of the inner peripheral extent 148 and the outer peripheral extent 146 of the annular beam 136 than to an opposite one of the inner peripheral extent 148 and the outer peripheral extent 146 of the annular beam 136 in the radial direction of the idler wheel $50_x$.

In this embodiment, the reinforcing layer 247 is disposed radially inwardly of the neutral axis 257 of the annular beam 136, and the annular beam 136 is free of any substantially inextensible reinforcing layer running in the circumferential direction of the idler wheel $50_x$ radially outwardly of the neutral axis 257 of the annular beam 136.

In this example, the reinforcing layer 247 is disposed between the inner peripheral extent 148 of the annular beam 136 and the openings $156_1$-$156_N$ in the radial direction of the idler wheel $50_x$, while the annular beam 136 is free of any substantially inextensible reinforcing layer running in the circumferential direction of the idler wheel $50_x$ between the outer peripheral extent 146 of the annular beam 136 and the openings $156_1$-$156_N$ in the radial direction of the idler wheel $50_x$.

The reinforcing layer 247 may be implemented in any suitable way in various embodiments.

Figure 34:
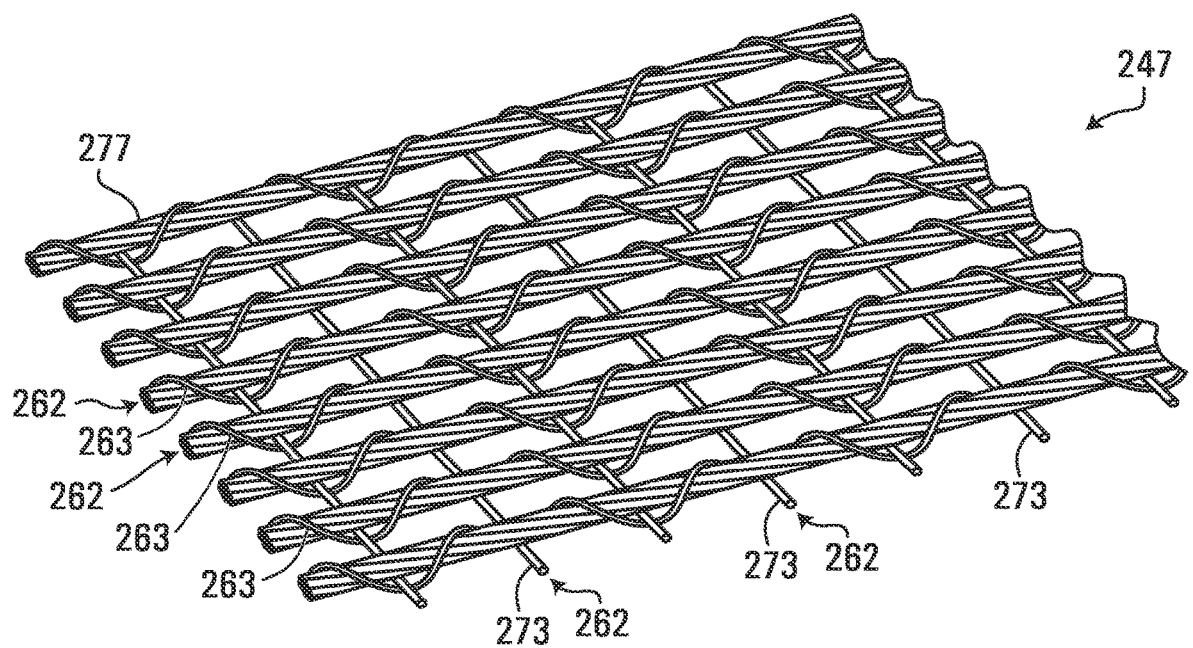
FIG. 34 shows an example of an embodiment of the reinforcing layer.

For example, in some embodiments, as shown in FIG. 34, the reinforcing layer 247 may include a layer of elongate reinforcing elements 262 that reinforce the annular beam 136 in one or more directions in which they are elongated, such as the circumferential direction of the idler wheel $50x$ and/or one or more directions transversal thereto.

For instance, in some embodiments, the elongate reinforcing elements 262 of the reinforcing layer 247 may include reinforcing cables 263 that are adjacent and generally parallel to one another. For instance, the reinforcing cables 263 may extend in the circumferential direction of the idler wheel $50_x$ to enhance strength in tension of the annular beam 136 along the circumferential direction of the idler wheel $50_x$. In some cases, a reinforcing cable may be a cord or wire rope including a plurality of strands or wires. In other cases, a reinforcing cable may be another type of cable and may be made of any material suitably flexible longitudinally (e.g., fibers or wires of metal, plastic or composite material).

Figure 35:
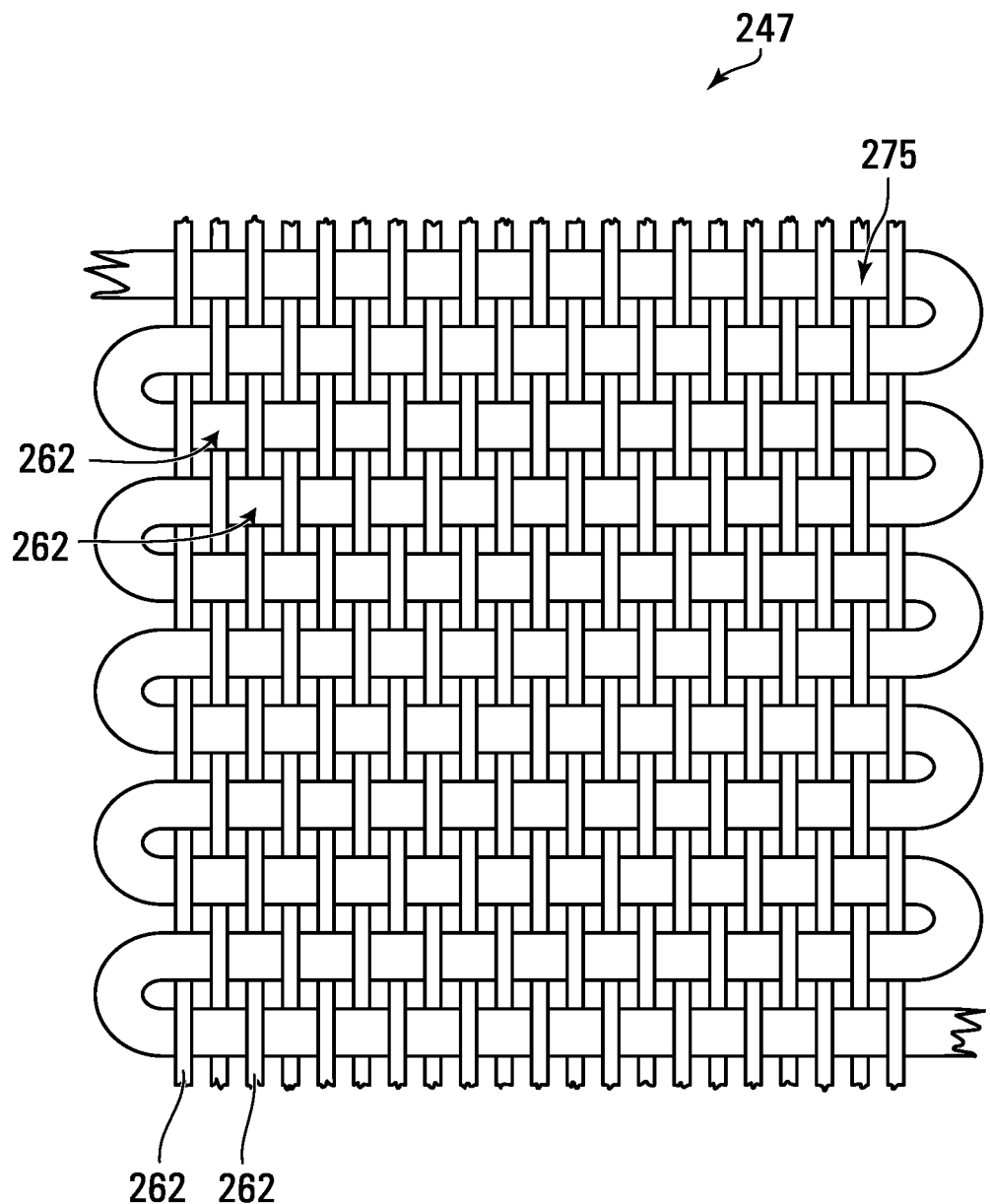
FIG. 35 shows an example of another embodiment of the reinforcing layer.

In some embodiments, the elongate reinforcing elements 262 of the reinforcing layer 247 may include constitute a layer of reinforcing fabric 265. Reinforcing fabric comprises pliable material made usually by weaving, felting, knitting, interlacing, or otherwise crossing natural or synthetic elongated fabric elements, such as fibers, filaments, strands and/or others. For instance, as one example, in some embodiments such as that of FIG. 34, the elongate reinforcing elements 262 of the reinforcing layer 247 that include the reinforcing cables 263 may also include transversal fabric elements 273 that extend transversally (e.g., perpendicularly) to and interconnect the reinforcing cables 263. Thus, in this example, the reinforcing layer 247, including its reinforcing cables 263 and its transversal fabric elements 273 can be viewed as a reinforcing fabric or mesh (e.g., a "tire cord" fabric or mesh). As another example, in some embodiments, as shown in FIG. 35, the reinforcing fabric 247 may include textile 275 (e.g., woven or nonwoven textile).

In other examples of implementation, the reinforcing layer 247 may include a reinforcing sheet (e.g., a thin, continuous layer of metallic material, such as steel or aluminum that extends circumferentially).

The reinforcing layer 247 may be made of one or more suitable materials. A material 277 of the reinforcing layer 247 may be stiffer and stronger than the elastomeric material 45 of the annular beam 136 in which it is disposed. For instance, in some embodiments, the material 277 of the reinforcing layer 247 may be a metallic material (e.g., steel, aluminum, etc.). In other embodiments, the material 277 of the reinforcing layer 247 may be a stiff polymeric material, a composite material (e.g., a fiber-reinforced composite material), etc.

In this example of implementation, the reinforcing layer 247 comprises the reinforcing mesh or fabric that includes the reinforcing cables 263 and the transversal fabric elements 273 which are respectively 3 strands of steel wire of 0.28 mm diameter, wrapped together to form a cable, and high tenacity nylon cord of 1400×2.

In some embodiments, the reinforcing layer 247 may allow the elastomeric material 45 (e.g. PU) of the annular beam 136 to be less stiff, and this may facilitate processability in manufacturing the tire 34. For example, in some embodiments, the modulus of elasticity (e.g., Young's modulus) of the elastomeric material 45 of the annular beam 136 may be no more than 200 MPa, in some cases no more than 150 MPa, in some cases no more than 100 MPa, in some cases no more than 50 MPa, and in some cases even less.

The reinforcing layer 247 may be provided in the annular beam 136 in any suitable way. In this embodiment, the reinforcing layer 247 may be formed as a hoop and placed in the mold before the elastomeric material 45 of the tire 34 is introduced in the mold. As the elastomeric material 45 is distributed within the mold via the centrifugal force generated by the mold's rotation, the reinforcing layer 247 is embedded in that portion of the elastomeric material 45 that forms the annular beam 136.

The reinforcing layer 247 may provide various benefits to the idler wheel $50_x$ in various embodiments.

For example, in this embodiment, the reinforcing layer 247 may help to protect the annular beam 136 against cracking. More particularly, in this embodiment, as it reinforces the annular beam 136 proximate to the inner peripheral extent 148 of the annular beam 136 that experiences tensile stresses when the annular beam 136 deflects in use, the reinforcing layer 247 may help the annular beam 136 to better withstand these tensile stresses that could otherwise increase potential for cracking to occur in the elastomeric material 45 of the annular beam 136.

As another example, in this embodiment, the reinforcing layer 247 may help to better manage heat generated within the annular beam 136 as it deforms in use. A thermal conductivity of the material 277 of the reinforcing layer 247 may be greater than a thermal conductivity of the elastomeric material 45 of the annular beam 136, such that the reinforcing layer 247 can better conduct and distribute heat generated within the tire 34 as it deforms in use. This may allow a highest temperature of the elastomeric material 45 to remain lower and therefore allow the idler wheel $50_x$ to remain cooler and/or run faster at a given load than if the reinforcing layer 247 was omitted.

More particularly, in this embodiment, a ratio of the thermal conductivity of the material 277 of the reinforcing layer 247 over the thermal conductivity of the elastomeric material 45 of the annular beam 136 may be at least 50, in some cases at least 75, in some cases at least 100, and in some cases even more. For instance, in some embodiments, the thermal conductivity of the material 277 of the reinforcing layer 247 may be at least 10 W/m/° C., in some cases at least 20 W/m/° C., in some cases at least 30 W/m/° C., in some cases at least 40 W/m/° C., and in some cases even more.

A thermal conductivity of a unidirectional composite layer can be calculated by the following equation:

$$K_i = V_C K_C + (1-V_C) K_M \qquad (10)$$

Where: Ki=thermal conductivity of the ply in direction i
$V_C$=cable volume fraction in direction i
$K_C$=cable thermal conductivity
$K_M$=matrix thermal conductivity From Equation (10) the thermal conductivity of a composite is orthotopic; i.e., it is different in different directions. The tire designer can thus tune the composite layer to have the desired conductivity in the circumferential direction (say, the "1" direction) independently of the lateral direction (say, the "2") direction.

Most elastomers, such as rubber and polyurethane, are good thermal insulators. The inventors have found that even a fairly low cable volume fraction is sufficient to raise the thermal conductivity to a level that adequately evacuates heat. With a steel cable, Equation (10) shows that a cable volume fraction of 0.10 gives a composite layer thermal conductivity of 5.2 W/m/° C. This value, or even a value as low as 2.0 W/m/° C. may be sufficient to improve thermal performance.

In some embodiments, steel may be used as the reinforcing material in both the circumferential and lateral directions. For example, to better dissipate heat and homogenize temperature, a steel cable of 3 strands of 0.28 mm diameter at a pace of 1.8 mm could be used in both the vertical and lateral directions. Such a composite layer has an average thickness of about 1.0 mm, and a steel volume fraction of about 0.10 in both vertical and lateral directions. As previously stated, this yields a thermal conductivity of about 5.2 W/m/° C. for the composite layer.

Figure 36:
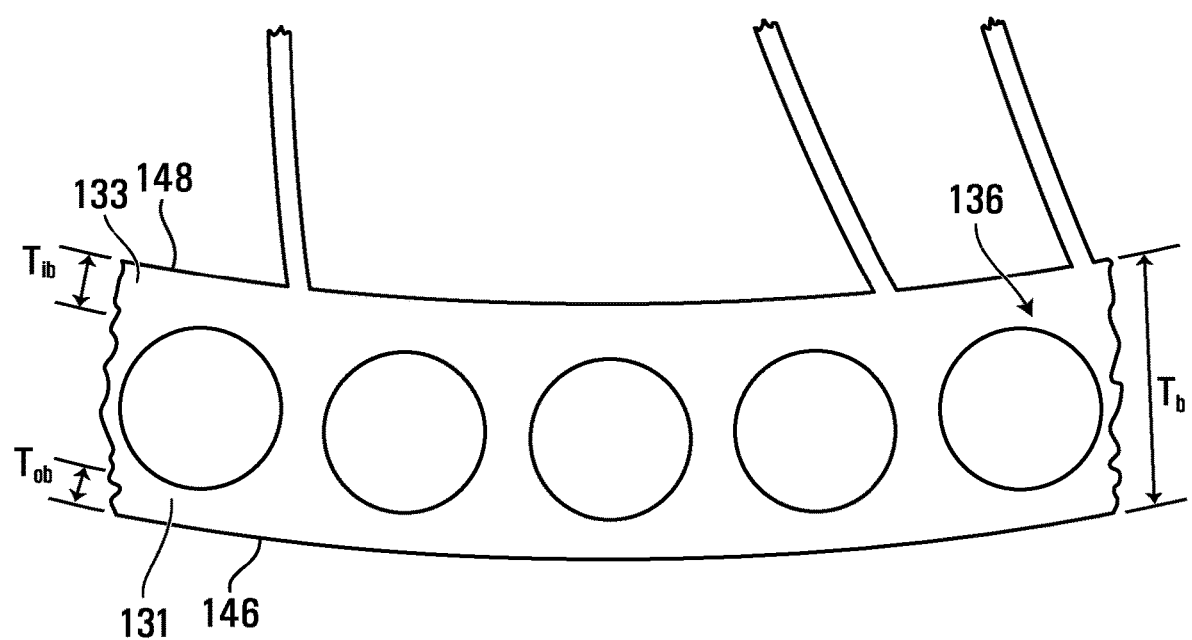
FIG. 36 shows an example of an embodiment in which a thickness of the annular beam of the non-pneumatic tire is increased.

In some embodiments, in addition to or instead of including the reinforcing layer 247, as shown in FIG. 36, a thickness $T_b$ of the annular beam 136 in the radial direction of the idler wheel $50_x$ may be increased in order to reinforce the annular beam 136. More particularly, in this embodiment, the inner rim 133 may be increased in thickness. For instance, the inner rim 133 of the annular beam 136 may be thicker than the outer rim 131 of the annular beam 136 in the radial direction of the idler wheel $50_x$. This may help the annular beam 136 to better withstand tensile stresses proximate to the inner peripheral extent 148 of the annular beam 136 when the annular beam 136 deflects in use.

For example, in this embodiment, a ratio of a thickness $T_b$ of the annular beam 136 in the radial direction of the idler wheel $50_x$ over the outer diameter $D_W$ of the idler wheel $50_x$ may be at least 0.05, in some cases at least 0.07, in some cases as least 0.09, and in some cases even more.

As another example, in this embodiment, a ratio of a thickness $T_{ib}$ of the inner rim 133 of the annular beam 136 in the radial direction of the idler wheel $50_x$ over a thickness $T_{ob}$ of the outer rim 131 of the annular beam 136 in the radial direction of the v may be at least 1.2, in some cases at least 1.4, in some cases as least 1.6, and in some cases even more.

In other embodiments, the non-pneumatic tire 58 may comprise foam. Various types of foam may be used. For instance, in some embodiments, the foam may be polyurethane foam (e.g., closed-cell polyurethane foam).

2. Leading and Trailing Idler Wheels Having Different Behaviors

In some embodiments, the leading idler wheels $50_1$, $50_2$ may behave differently from the trailing idler wheels $50_3$, $50_4$ in order to accommodate different loading conditions to which these idler wheels may be subjected.

For example, in some embodiments, a given one of the trailing idler wheels $50_3$, $50_4$, say the trailing idler wheel $50_3$, may be subject to a relatively high load (e.g., as much as 450 kgf) due to the tension of the track 41 when the track system $20_i$ is operated at low speed and high torque. It may thus be desirable for the trailing idler wheel $50_3$ to be relatively rigid in that case. Otherwise, excessive deformation may result in "ratcheting" where the track 41 would slip over the trailing idler wheel $50_3$ if the trailing idler wheel $50_3$ would deflect too much.

Meanwhile, in some embodiments, a given one of the leading idler wheels $50_1$, $50_2$, say the leading idler wheel $50_1$, may be subject to a relatively high load when the track system $20_i$ encounters an obstacle on the ground at high speed. It may thus be desirable for the leading idler wheel $50_1$ to be relatively flexible in that case. Otherwise, if the leading idler wheel $50_1$ would be too rigid, a significant shock may be transmitted to the ATV 10 and the vehicle's ability to envelop and pass over the obstacle may be reduced.

Accordingly, in some embodiments, the leading idler wheel $50_1$ and the trailing idler wheel $50_3$ may behave differently, such as, for example, by designing them such that the radial stiffness $K_z$ of each of the leading idler wheel $50_1$ and the trailing idler wheel $50_3$ varies depending on a type of loading on that idler wheel and/or the radial stiffness $K_z$ of the leading idler wheel $50_1$ is different from the radial stiffness $K_z$ of the trailing idler wheel $50_3$ for a given load.

2.1 Idler Wheel Having Different Behaviors in Response to Different Types of Loading In some embodiments, each idler wheel $50_x$ of the leading idler wheel $50_1$ and the trailing idler wheel $50_3$ may have different behaviors in response to different types of loading, such as a first type of loading when the tension of the track 41 is high (i.e., "high track tension loading"), like when the track system $20_i$ is operated at low speed and high torque, and a second type of loading when the track system $20_i$ encounters an obstacle on the ground (i.e., "obstacle loading"), like an impact with the obstacle at high speed. This may allow the leading idler wheel $50_1$ and the trailing idler wheel $50_3$ to be structurally identical but yet behave differently as needed.

For example, in some embodiments, the radial stiffness $K_z$ of the idler wheel $50_x$ under the high track tension loading, denoted $K_{z1}$, may be different from the radial stiffness $K_z$ of the idler wheel $50_x$ under the obstacle loading, denoted $K_{z2}$. For instance, the radial stiffness $K_{z1}$ of the idler wheel $50_x$ under the high track tension loading may be greater than the radial stiffness $K_{z2}$ of the idler wheel $50_x$ under the obstacle loading such that the idler wheel $50_x$ is relatively stiffer under the high track tension loading to resist excessive deformation and track ratcheting issues and relatively more flexible (i.e., less stiff) under the obstacle loading to better handle the obstacle.

Thus, the idler wheel $50_x$ may be viewed as having "decoupled" radial stiffness characteristics whereby the radial stiffness $K_z$ of the idler wheel $50_x$ has a given value $K_{z1}$ under the high track tension loading and another value $K_{z1}$ under the obstacle loading. This "tuning" of the radial stiffness $K_z$ of the idler wheel $50_x$ may be implemented in any suitable ways in various embodiments.

In some embodiments, a ratio $K_{z1}/K_{z2}$ of the radial stiffness $K_{z1}$ of the idler wheel $50_x$ under the high track tension loading over the radial stiffness $K_{z2}$ of the idler wheel $50_x$ under the obstacle loading may be at least 2, in some cases at least 3, in some cases at least 4, in some cases at least 5, and in some cases even more (e.g., 6 or more).

A test can be conducted to measure the ratio $K_{z1}/K_{z2}$ of the radial stiffness $K_{z1}$ of the idler wheel $50_x$ under the high track tension loading over the radial stiffness $K_{z2}$ of the idler wheel $50_x$ under the obstacle loading.

Figure 20:
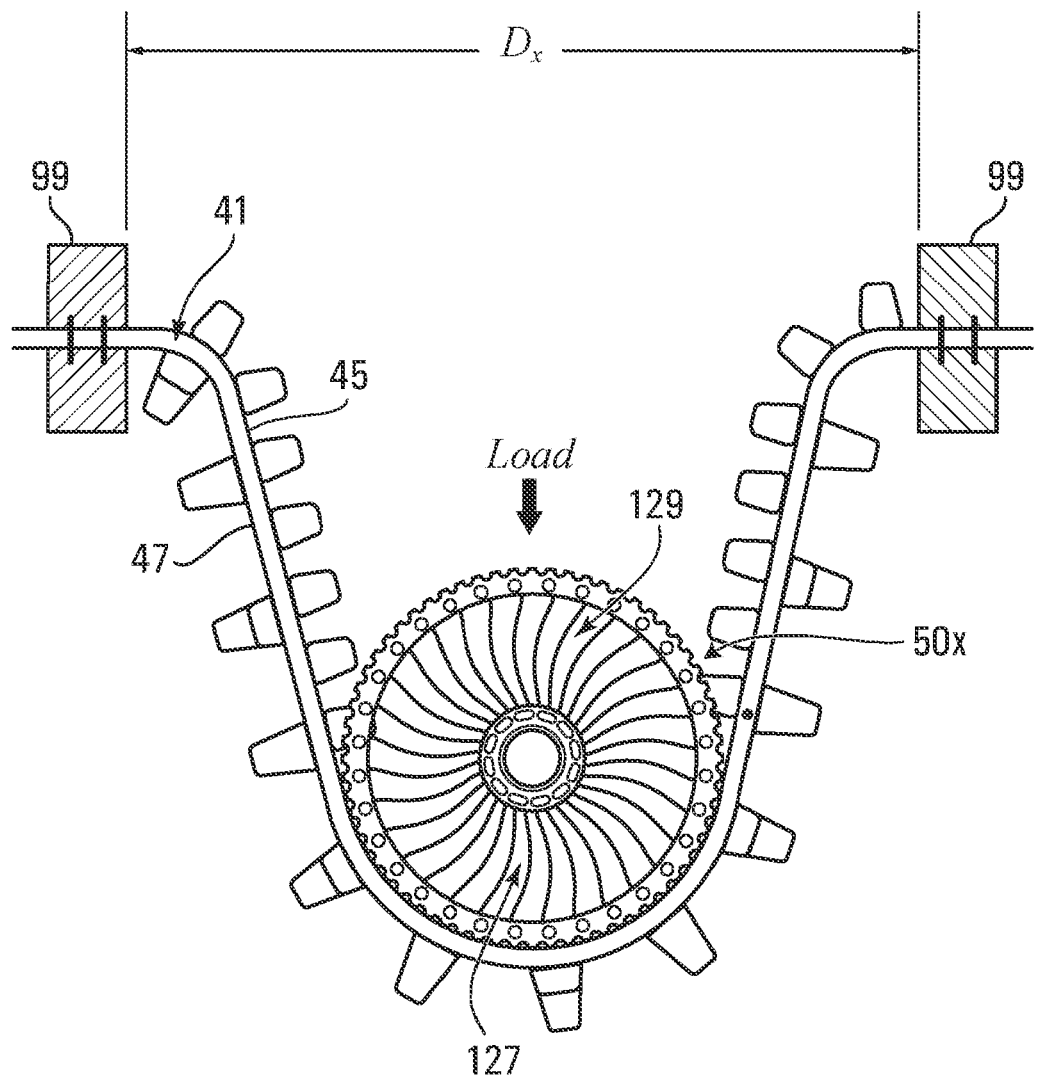
FIG. 20 shows a system for measuring a radial stiffness of the idler wheel under a track tension load.
Figure 27:
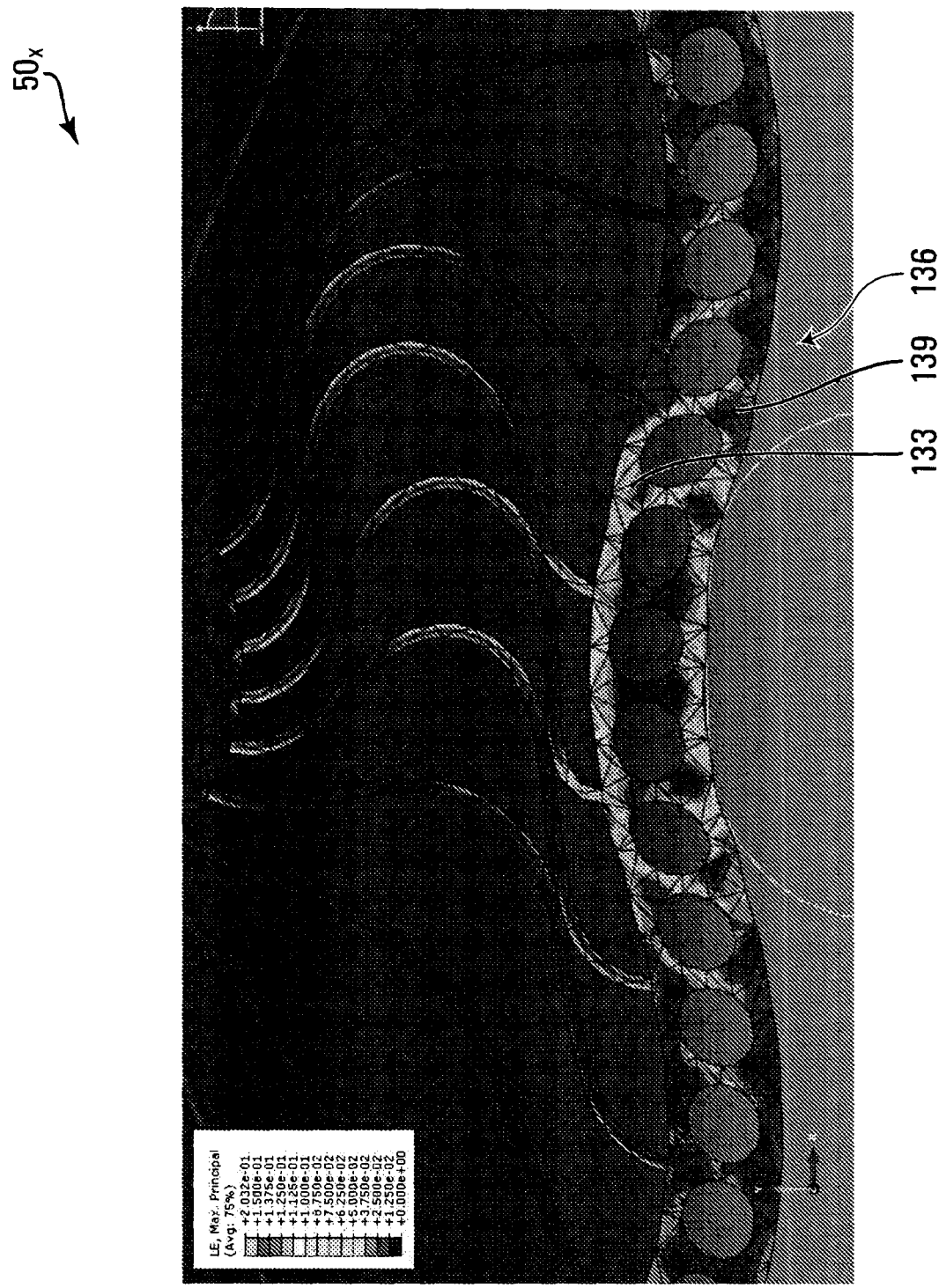

For example, in some embodiments, the radial stiffness $K_{z1}$ of the idler wheel $50_x$ under the high track tension loading may be measured by generating load v. deflection data when loading the idler wheel $50_x$ on a system as depicted in FIG. 20. With reference to FIG. 20, the idler wheel $50_x$ may be loaded in the Z direction against a section of the track 41 suspended between two fixtures 99, the two fixtures 99 being movable in the X direction and the distance $D_x$ between the two fixtures 99 in the X direction being set to approximate the geometry of the track system $20_i$. The radial stiffness $K_{z2}$ of the idler wheel $50_x$ under the obstacle loading may be measured by generating load v. deflection data when loading the idler wheel $50_x$ against an obstacle. An obstacle as shown in FIG. 23 or FIG. 27 may be affixed onto a loading plate with an adaptor for a load v. deflection testing system such as an Instron testing system.

In some embodiments, the decoupled radial stiffness characteristics of the idler wheel $50_x$ may be achieved by constructing the idler wheel $50_x$ according to principles described above in section 1 such that the idler wheel $50_x$ comprises the non-pneumatic tire 58 comprising the annular beam 136 and the spoked support 141.

FIGS. 21 to 23 show examples of a finite element model of the idler wheel $50_x$ in some embodiments. In one embodiment, the non-pneumatic tire 58 of the idler wheel $50_x$ has a width $W_T$=70 mm and an outer diameter $D_{TO}$ 240 mm. These dimensions are suitable for use of the non-pneumatic tire 58 in the track system $20_i$ of the tracked vehicle 10 (ATV or UTV). In this embodiment, the tire material of the non-pneumatic tire 58 is Hytrel 5556 (Dupont) and has a Young's modulus of 207 MPa at ambient temperature.

FIG. 21 shows the idler wheel $50_x$ and the track 41 under no load. In this embodiment, the track 41 is inextensible relative to the non-pneumatic tire 58. The track 41 wraps around approximately 165 degrees of the tread 150 of the non-pneumatic tire 58. FIG. 22 shows the idler wheel $50_x$ being loaded against the track 41 (i.e. under the track tension loading), which results in the development of tensile forces in the track 41 which resiliently deform the non-pneumatic tire 58. That is, in a track tension loading state of the idler wheel $50_x$, a portion 127 of the annular support 141 between the axis of rotation 80 of the idler wheel $50_x$ and the area of contact of the idler wheel $50_x$ with the track 41 is compressed.

FIG. 23 shows one of the leading idler wheels $50_1$, $50_2$ when the track system $20_i$ responds to an impact with an obstacle at high speed (i.e. under the impact loading). The obstacle is a rectangular object with a width=30 mm=12.5% of the outer diameter $D_{TO}$ of the non-pneumatic tire 58 and a height=80 mm. Due to the design of the non-pneumatic tire 58, the non-pneumatic tire 58 can resiliently deform as shown in FIG. 22 and envelop the obstacle. This may be very beneficial to off-road vehicle performance. The non-pneumatic tire 58 represents un-sprung mass; as such, the speed with which it can deform is much faster than the speed with which the suspension 18 can displace one of the leading idler wheels $50_1$, $50_2$, or the speed with which a center of gravity of the ATV 10 can change. Thus, the ability of the non-pneumatic tire 58 to resiliently deform as shown in FIG. 22 is a critical improvement in off-road vehicle behavior.

Figure 24:
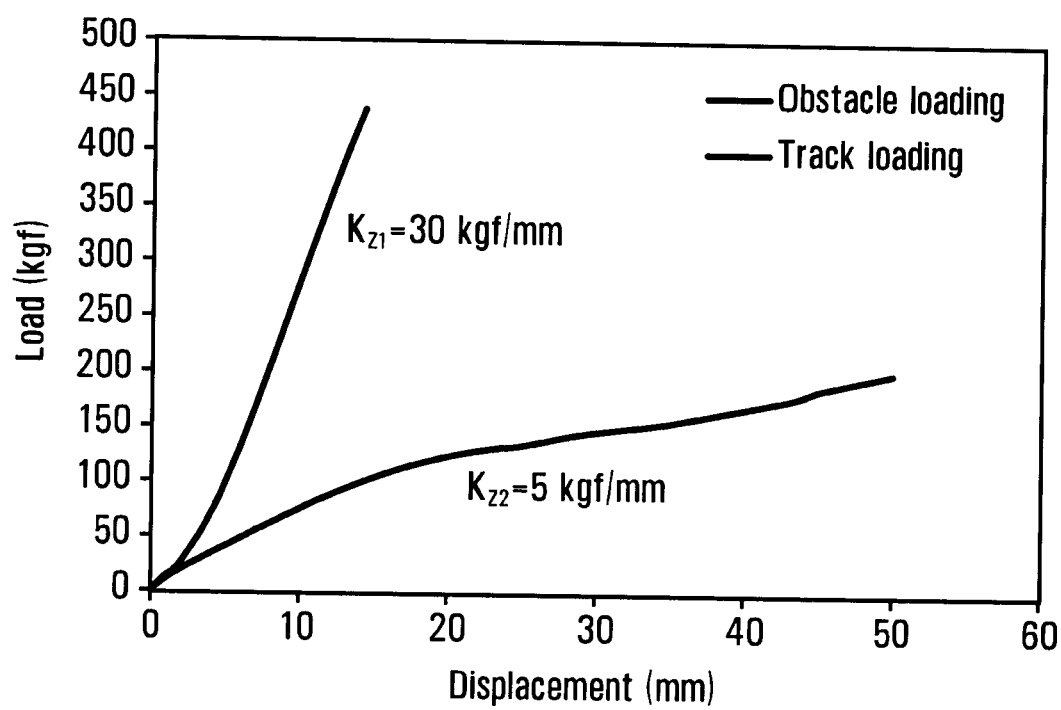
FIG. 24 shows a chart that relates load and displacement for the idler wheel of FIGS. 22 and 23.

FIG. 24 shows an example of a load vs. deflection plot for the FEA model shown in FIGS. 22 and 23. The loading of the idler wheel $50_x$ against the track 41 is predicted to result in a radial stiffness $K_{z1}$ of about 30 kgf/mm while the impact with the obstacle is predicted to result in a radial stiffness $K_{z2}$ of about 5 kgf/mm. Accordingly, the ratio $K_{z1}/K_{z2}$ of the radial stiffness $K_{z1}$ of the idler wheel $50_x$ under the track tension loading over the radial stiffness $K_{z2}$ of the idler wheel $50_x$ under the obstacle loading is 6 where the obstacle has a width=30 mm=12.5% of the outer diameter $D_{TO}$ of the non-pneumatic tire 58.

Because of the different loading behavior of the idler wheel $50_x$ under the track tension loading and under the obstacle loading, the track system $20_i$ may use identical leading idler wheels $50_1$, $50_2$ and trailing wheels $50_3$, $50_4$ with no performance compromise. Under normal use, the radial stiffness $K_{Z2}$ of the idler wheels $50_x$ will ensure track tensioning while the radial stiffness $K_{Z1}$ of the idler wheels $50_x$ will enable the idler wheels $50_x$ to resiliently deform on impact with an obstacle.

Figure 25:
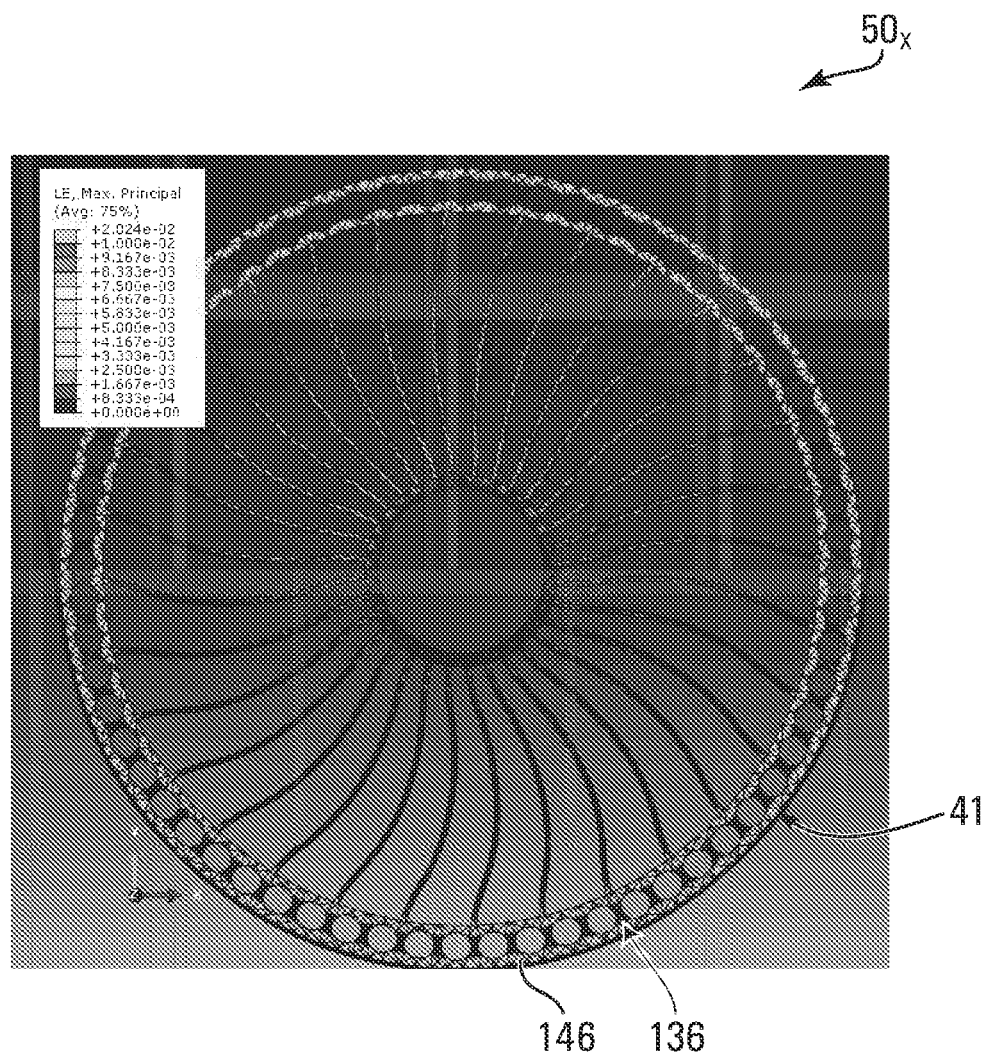
FIGS. 25 to 27 respectively show structural modeling results for another embodiment of the idler wheel under no load, under the track tension load, and under the obstacle load.
Figure 26:
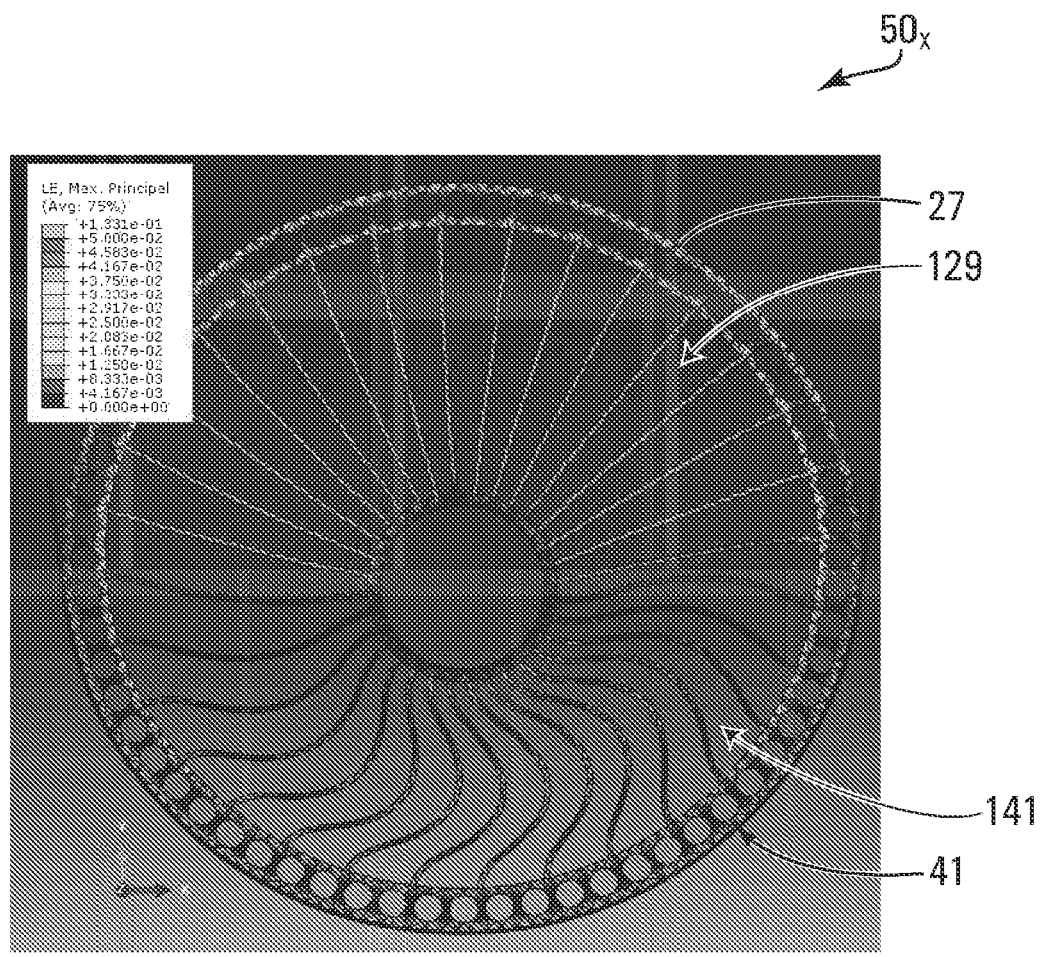

Structural modeling results are shown in FIGS. 25 to 27 for an example of another embodiment of the idler wheel $50_X$. The maximum strains are shown for an idler wheel $50_X$ of 120 mm diameter and 60 mm in width at 20° C. The non-pneumatic tire 48 of the idler wheel $50_X$, that is the annular beam 136, the spoked support 141 and the hub 75 are all made from Hytrel 5526 or Ellastollan S98A. The track 41 is modeled as a 1 mm thick steel belt in frictionless contact with the idler wheel $50_X$.

FIG. 25 shows the idler wheel $50_X$ and the track 41 under no load (that is, under no initial tension on the track 41) at a rotation of the track 41 of 200 rad/s. The maximum principle strain of the idler wheel $50_X$ is predicted to be about 0.9% at the outer peripheral extent 146 of the annular beam 136 and the radial displacement of the idler wheel $50_X$ is predicted to be about 1 mm. FIG. 26 shows the idler wheel $50_X$ and the track 41 under the track tension loading with a load of 450 kgf at a rotation of the track 41 of 50 rad/s. The maximum principle strain in the spoked support 141 is predicted to be about 3% in the portion 129 of the spoked support 141 between the axis of rotation 80 of the idler wheel $50_x$ and the peripheral part 27 of the idler wheel $50_x$ not in contact with the track 41. FIG. 27 shows the idler wheel $50_X$ under the impact loading when responding to an impact with an obstacle modeled as a semi-sphere having a diameter of 30 mm. The maximum principle strain of the idler wheel $50_X$ is predicted to be about 15% at the inner rim 133 of the shear band 139 of the annular beam 136 in the region of contact with the obstacle.

2.2 Leading and Trailing Idler Wheels that are Structurally Different

In some embodiments, as shown in FIGS. 28 to 32, the leading idler wheel $50_1$ and the trailing idler wheel $50_3$ may be structurally different to accommodate different types of loading, such the high track tension loading and the obstacle loading which are discussed above in section 2.1.

For example, in some embodiments, the radial stiffness $K_z$ of the leading idler wheel $50_1$ may be different from the radial stiffness $K_z$ of the trailing idler wheel $50_3$ for a given load. For instance, in some embodiments, the radial stiffness $K_z$ of the leading idler wheel $50_1$ may be less than the radial stiffness $K_z$ of the trailing idler wheel $50_3$ for a given load, such that the trailing idler wheel $50_3$ is relatively stiffer under the high track tension loading to resist excessive deformation and track ratcheting issues and the leading idler wheel $50_1$ is relatively more flexible (i.e., less stiff) under the obstacle loading to better handle the obstacle.

In some embodiments, a ratio of the radial stiffness $K_z$ of the leading idler wheel $50_1$ over the radial stiffness $K_z$ of the trailing idler wheel $50_3$ for a given load may no more than 0.9, in some cases no more than 0.7, in some cases no more than 0.5, and in some cases even lower.

The leading idler wheel $50_1$ and the trailing idler wheel $50_3$ may structurally differ in any suitable way.

Figure 28:
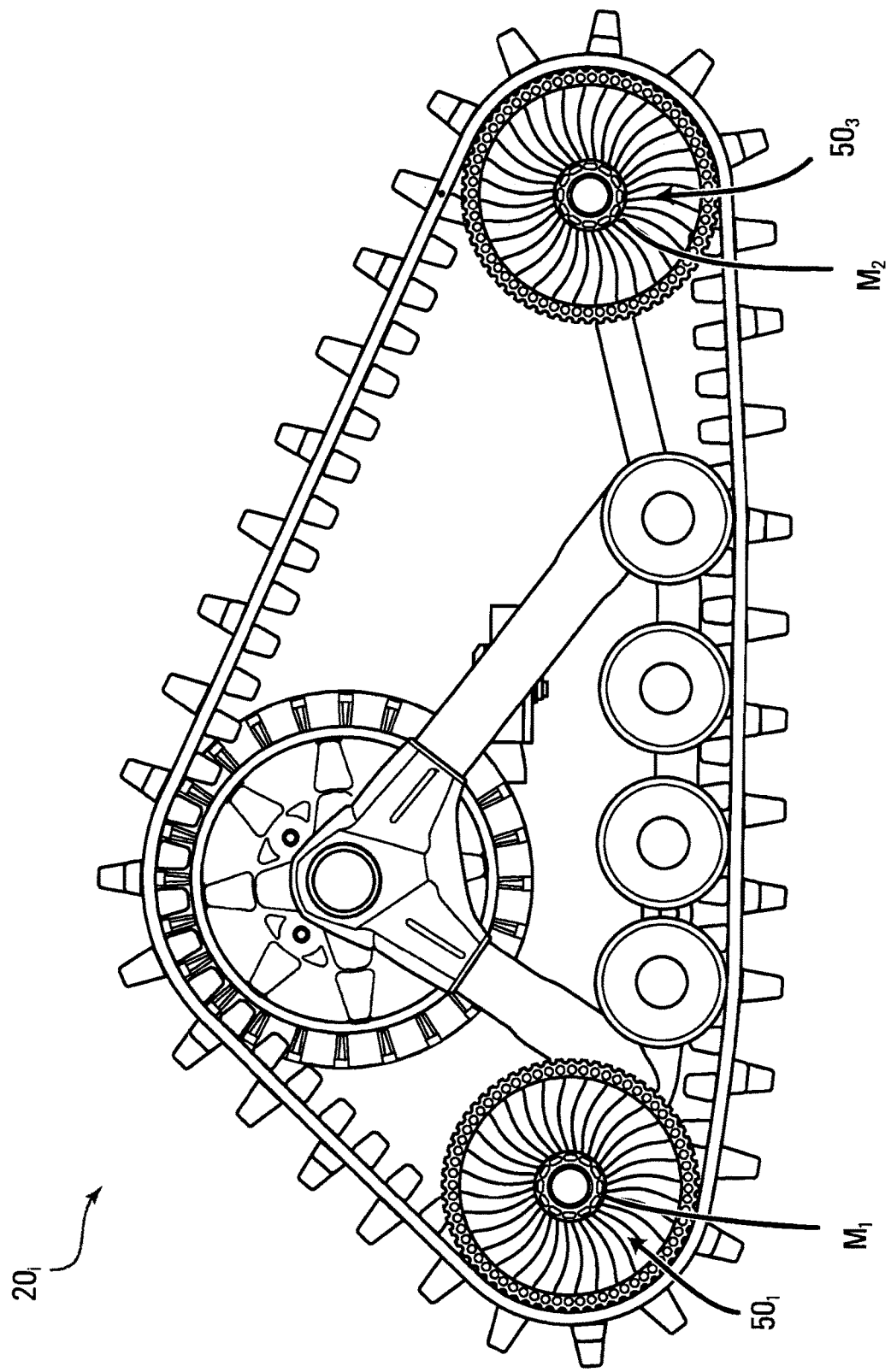
FIG. 28 shows a side view of a rear one of the track systems where a leading idler wheel and a trailing idler wheel are made of different materials.

For example, in some embodiments, as shown in FIG. 28, a material $M_1$ of the leading idler wheel $50_1$ may be different from a material $M_2$ of the trailing idler wheel $50_3$. For instance, in embodiments where each of the leading idler wheel $50_1$ and the trailing idler wheel $50_3$ is constructing according to principles described above in section 1 such that it comprises the non-pneumatic tire 58 comprising the annular beam 136 and the spoked support 141, the material $M_1$ of the leading idler wheel $50_1$ may be the tire material of the non-pneumatic tire 58 of the leading idler wheel $50_1$ and the material $M_2$ of the trailing idler wheel $50_3$ may be the tire material of the non-pneumatic tire 58 of the trailing idler wheel $50_3$.

For instance, in some embodiments, a modulus of elasticity (i.e., Young's modulus) of the material $M_1$ of the leading idler wheel $50_1$ may be different from a modulus of elasticity of the material $M_2$ of the trailing idler wheel $50_3$. In this example, the modulus of elasticity of the material $M_1$ of the leading idler wheel $50_1$ may be less than the modulus of elasticity of the material $M_2$ of the trailing idler wheel $50_3$. In some embodiments, a ratio of the modulus of elasticity of the material $M_1$ of the leading idler wheel $50_1$ over the modulus of elasticity of the material $M_2$ of the trailing idler wheel $50_3$ may be no more than 0.9, in some cases no more than 0.7, in some cases no more than 0.5, and in some cases even less.

Alternatively or additionally, in some embodiments, a shape of the leading idler wheel $50_1$ may be different from a shape of the trailing idler wheel $50_3$. For instance, in embodiments where each of the leading idler wheel $50_1$ and the trailing idler wheel $50_3$ is constructing according to principles described above in section 1 such that it comprises the non-pneumatic tire 58 comprising the annular beam 136 and the spoked support 141, a shape of the non-pneumatic tire 58 of the leading idler wheel $50_1$ may be different from a shape of the non-pneumatic tire 58 of the trailing idler wheel $50_3$.

For instance, a shape of the annular beam 136 (e.g., a number and/or a configuration of the openings $156_1$-$156_N$) and/or a shape of the spoked portion 141 (e.g., a number and/or a configuration of the spokes $142_1$-$142_T$) of the non-pneumatic tire 58 of the leading idler wheel $50_1$ may be different from a shape of the annular beam 136 (e.g., a number and/or a configuration of the openings $156_1$-$156_N$) and/or a shape of the spoked portion 141 (e.g., a number and/or a configuration of the spokes $142_1$-$142_T$) of the non-pneumatic tire 58 of the trailing idler wheel $50_3$.

Figure 29:
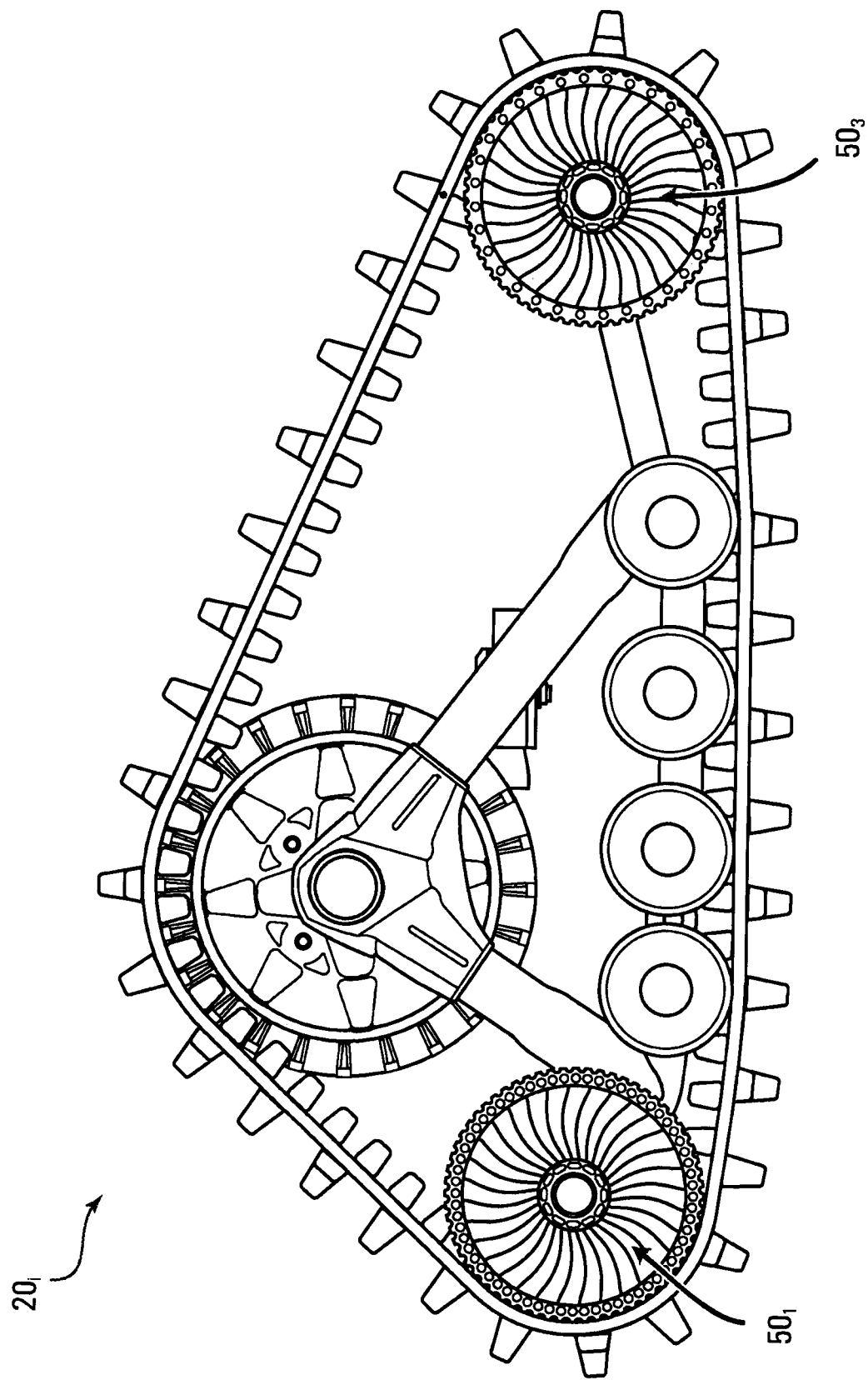
FIG. 29 shows a side view of the rear one of the track systems where a number of openings of an annular beam of a non-pneumatic tire of the leading idler wheel is greater than that of a non-pneumatic tire of the trailing idler wheel.
Figure 30:
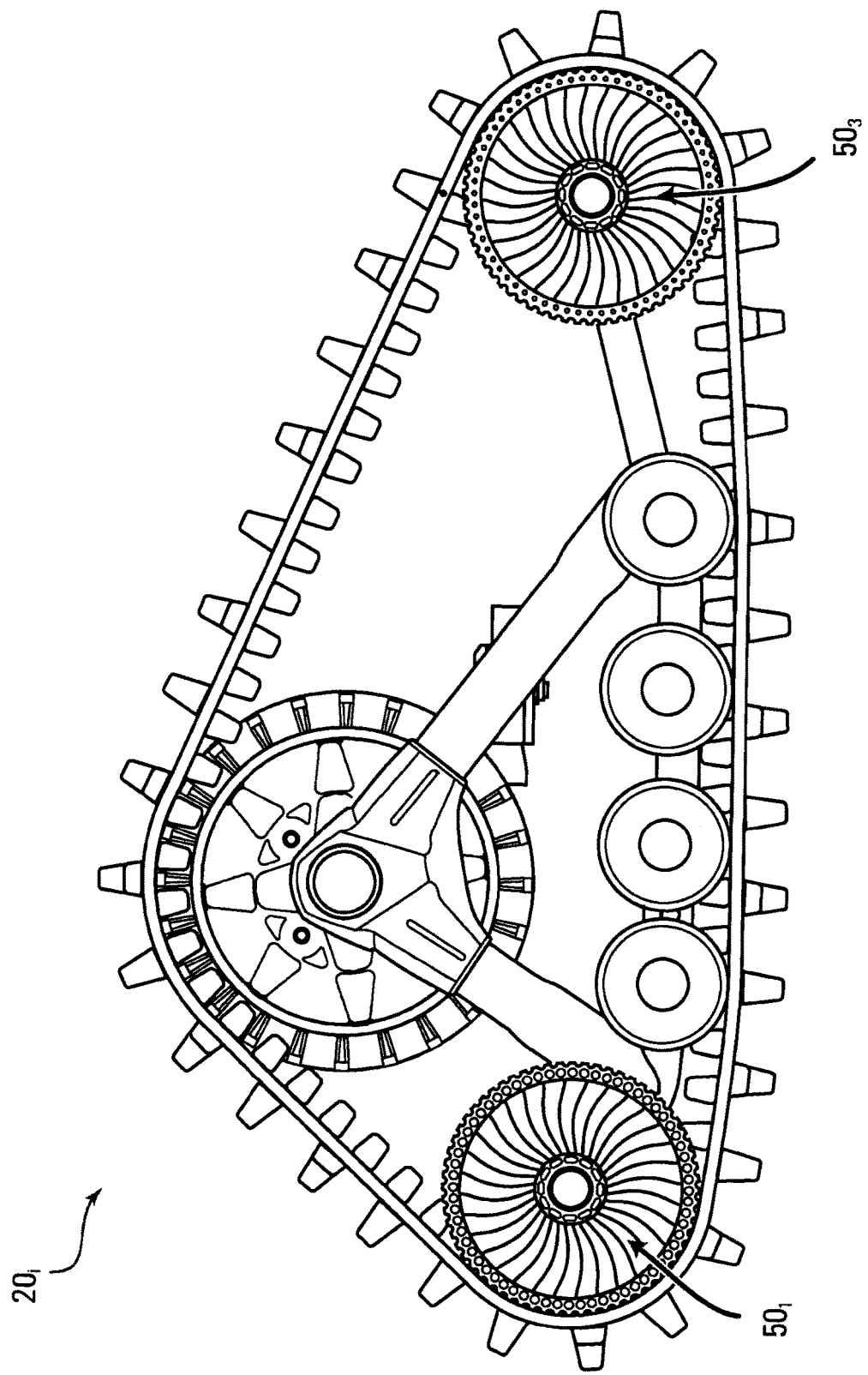
FIG. 30 shows a side view of a rear one of the track systems where a size of one or more of the openings of the annular beam of the non-pneumatic tire of the leading idler wheel is greater than that of the non-pneumatic tire of the trailing idler wheel.
Figure 31:
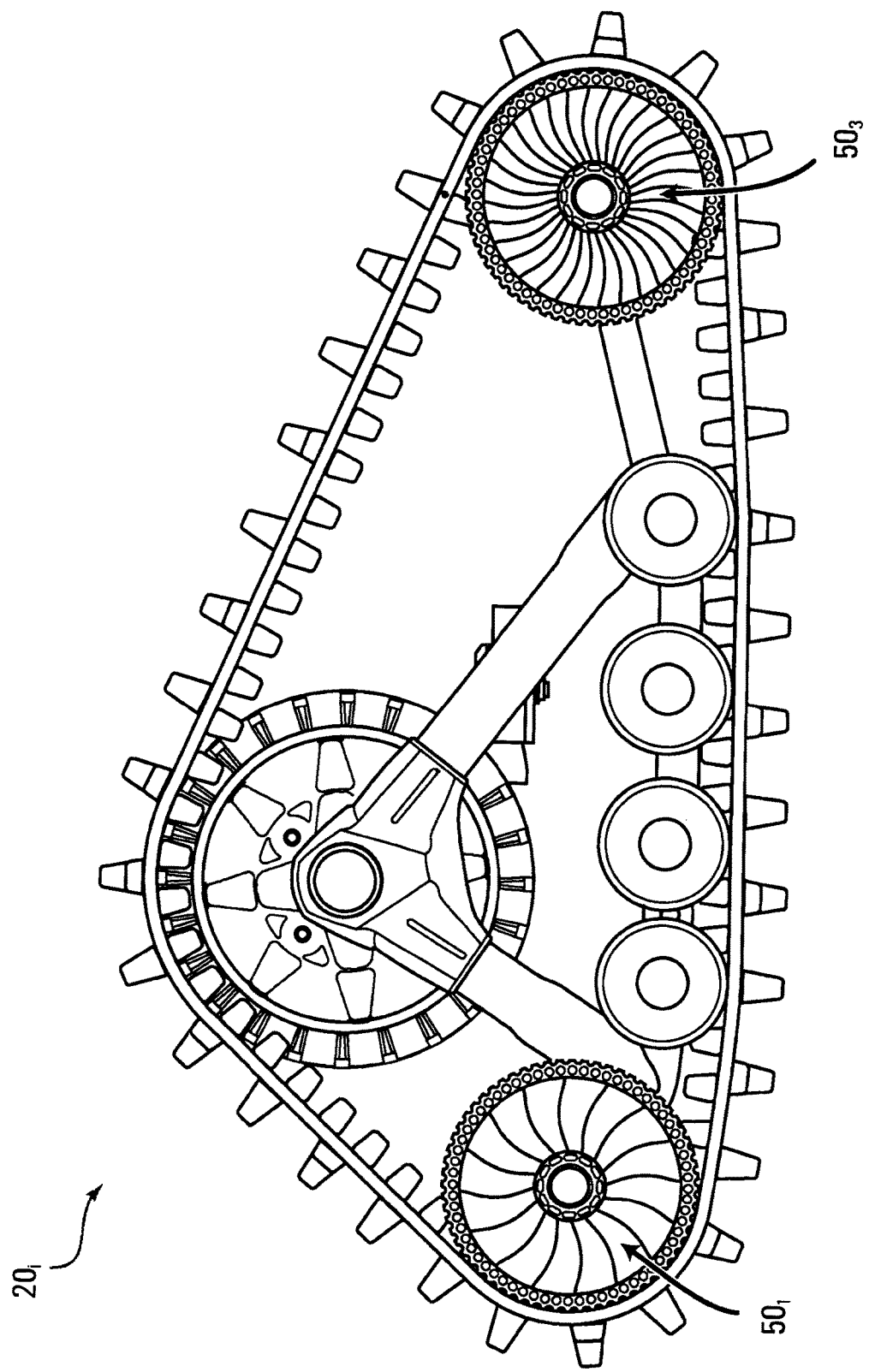
FIG. 31 shows a side view of the rear one of the track systems where a number of spokes of the non-pneumatic tire of the leading idler wheel is less than that of the non-pneumatic tire of the trailing idler wheel.
Figure 32:
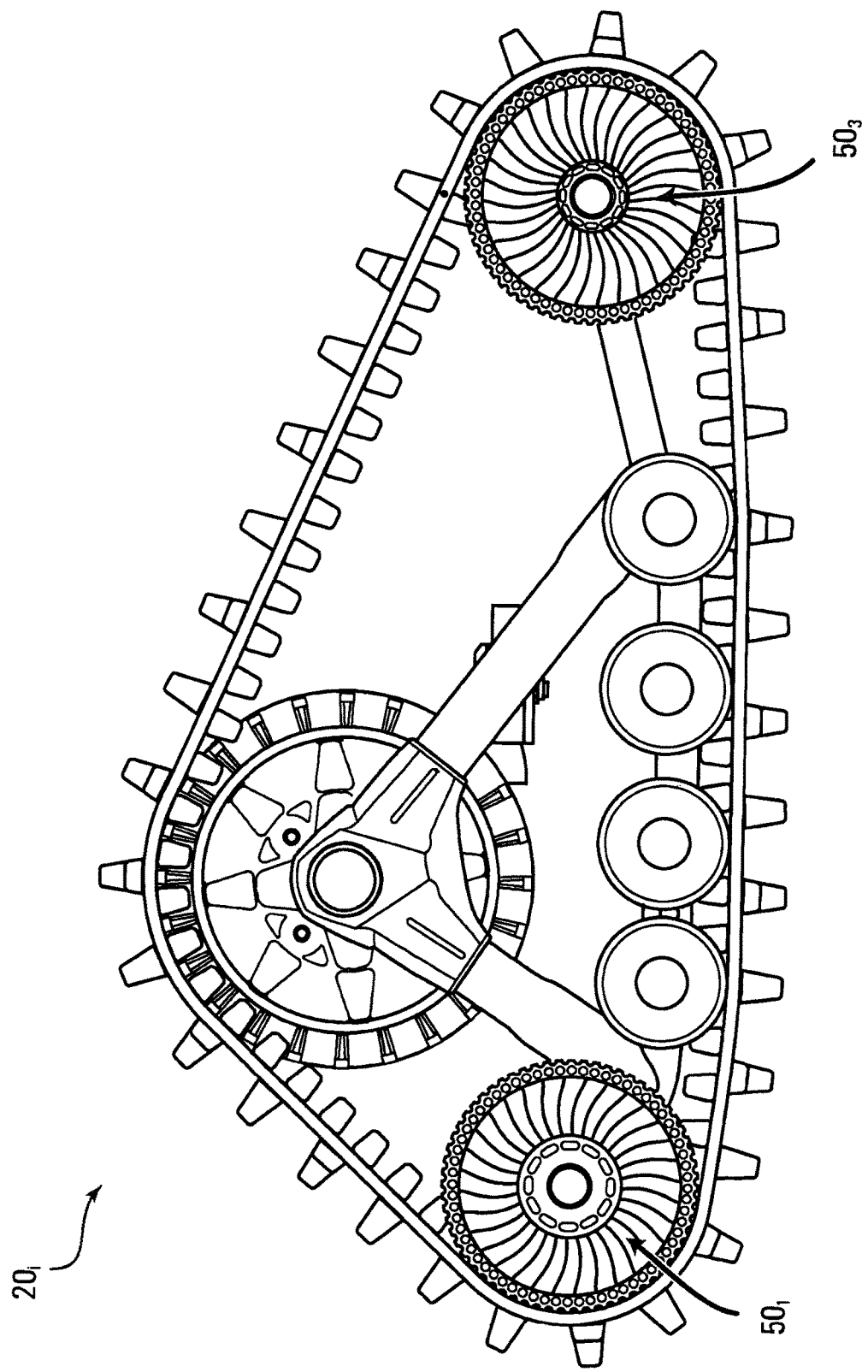
FIG. 32 shows a side view of the rear one of the track systems where a size of one or more of the spokes of the non-pneumatic tire of the leading idler wheel is less than that of the non-pneumatic tire of the trailing idler wheel.

Examples of this are shown in FIGS. 29 to 32. For instance, in some embodiments: as shown in FIG. 29, the number of openings $156_1$-$156_N$ of the annular beam 136 of the non-pneumatic tire 58 of the leading idler wheel $50_1$ may be greater than that of the non-pneumatic tire 58 of the trailing idler wheel $50_3$; as shown in FIG. 30, a size of one or more of the openings $156_1$-$156_N$ of the annular beam 136 of the non-pneumatic tire 58 of the leading idler wheel $50_1$ may be greater than that of the non-pneumatic tire 58 of the trailing idler wheel $50_3$; as shown in FIG. 31, the number of spokes $142_1$-$142_T$ of the non-pneumatic tire 58 of the leading idler wheel $50_1$ may be less than that of the non-pneumatic tire 58 of the trailing idler wheel $50_3$; and/or, as shown in FIG. 32, a size of one or more of the spokes $142_1$-$142_T$ of the non-pneumatic tire 58 of the leading idler wheel $50_1$ may be less than that of the non-pneumatic tire 58 of the trailing idler wheel $50_3$. This may allow the trailing idler wheel $50_3$ to be relatively stiffer than the leading idler wheel $50_1$ to accommodate the high track tension loading to resist excessive deformation and track ratcheting issues, and the leading idler wheel $50_1$ to be relatively more flexible (i.e., less stiff) than the trailing idler wheel $50_3$ to accommodate the obstacle loading to better handle the obstacle.

The track system $20_i$ may be configured in various other ways in other embodiments.

For example, in some embodiments, the track system $20_i$ may comprise more or less than two leading idler wheels such as the leading idler wheels $50_1$, $50_2$ and/or more or less than two trailing idler wheels such as the trailing idler wheel $50_3$, $50_4$ adjacent to each of its longitudinal ends. For instance, in some embodiments, the track system $20_i$ may have a single leading idler wheel adjacent to its front longitudinal end and/or a single leading idler wheel adjacent to its rear longitudinal end.

As another example, in some embodiments, one or more of the support wheels $55_1$-$55_8$ may be resilient wheels that are resilient deformable as discussed above in connection with the idler wheels $50_1$,$50_4$. For instance, in some cases, one or more of the support wheels $55_1$-$55_8$ may be resilient wheels similar in construction to, but smaller than, the idler wheels $50_1$-$50_4$.

While in this embodiment the track systems $20_1$-$20_4$ are part of the ATV 10, in other embodiments, track systems constructed according to principles discussed herein in respect of the track systems $20_1$-$20_4$ may be part of other types of vehicles.

Figure 37:
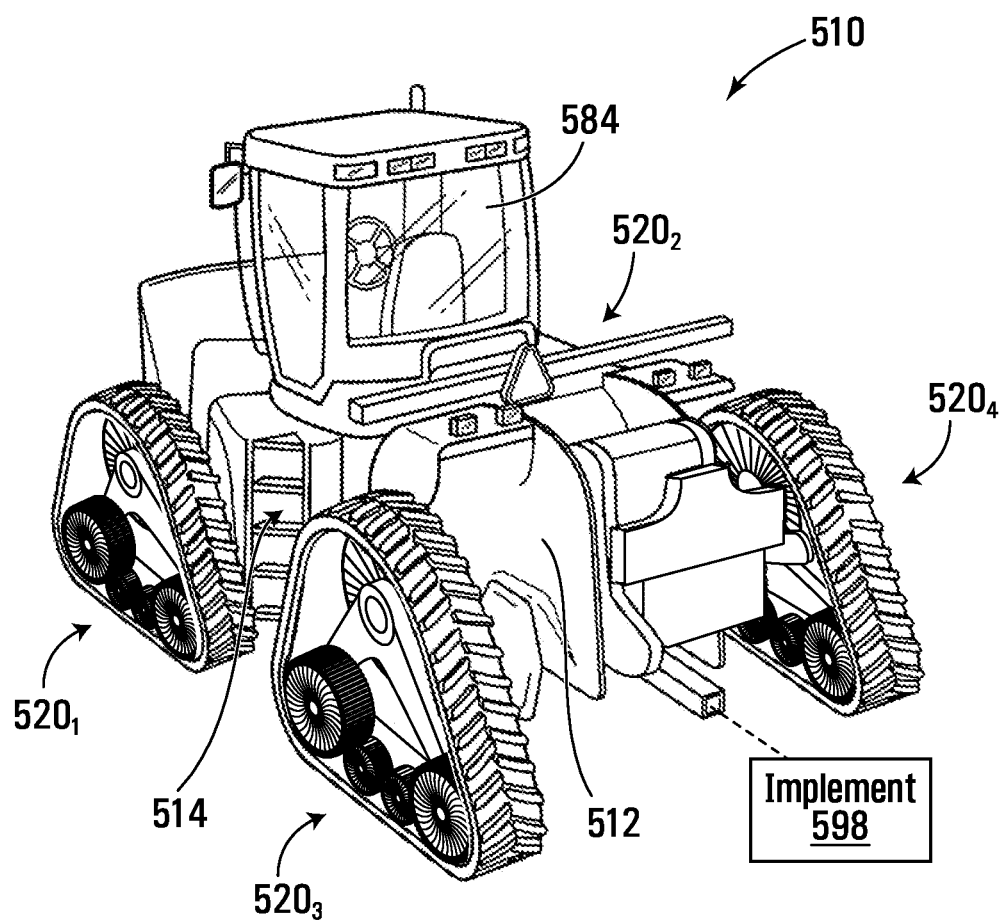
FIG. 37 shows an example of an agricultural vehicle comprising a track system in accordance with an embodiment of the invention.
Figure 38:
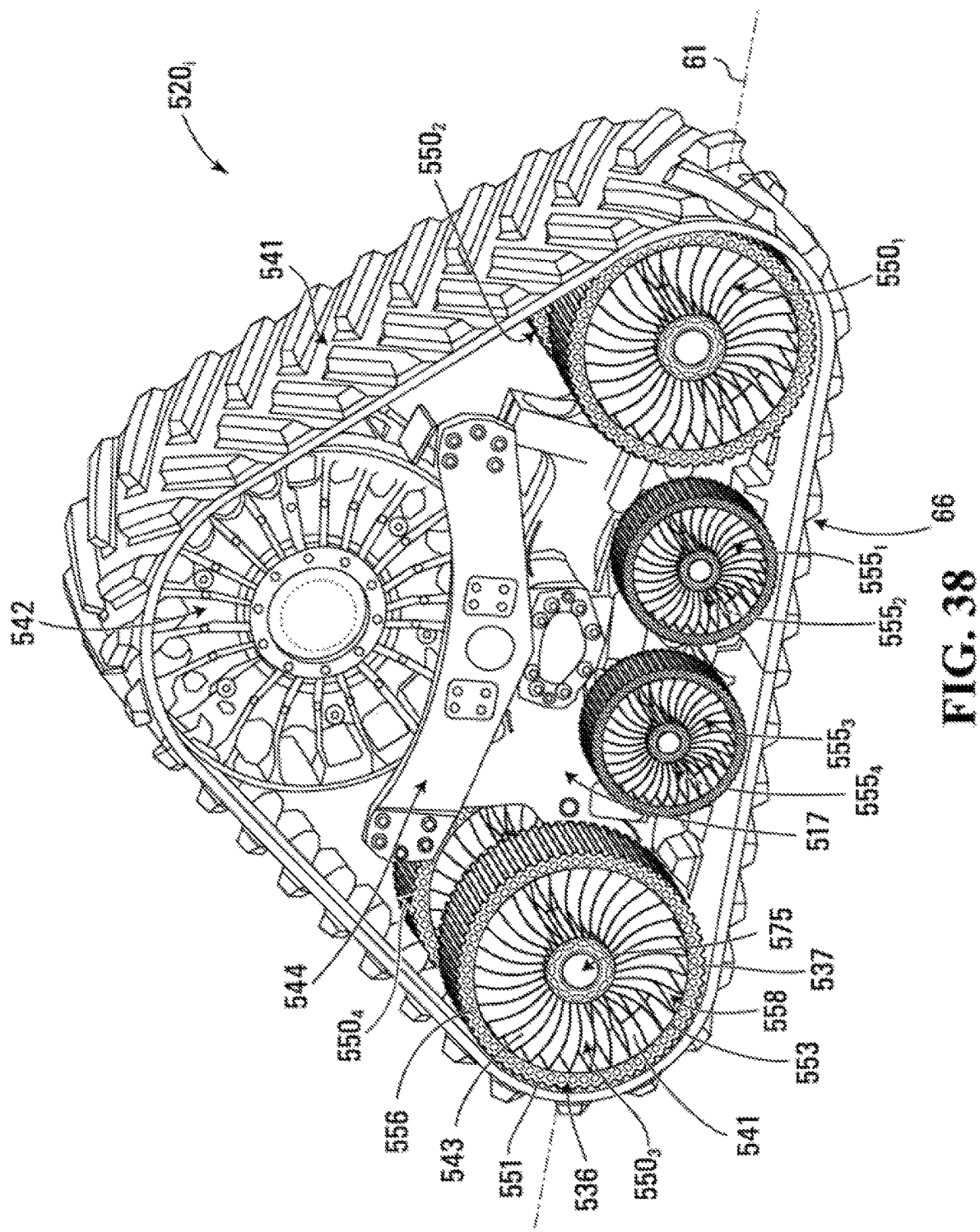
FIG. 38 shows a perspective view of the track system of FIG. 37.

For example, with additional reference to FIGS. 37 and 38, in some embodiments, an agricultural vehicle 510 may comprise track systems $520_1$-$520_4$ constructed according to principles discussed herein in respect of the track systems $20_1$-$20_4$. The agricultural vehicle 510 is a heavy-duty vehicle designed to travel in agricultural fields to perform agricultural work using a work implement 598. In this embodiment, the agricultural vehicle 510 is a tractor. In other embodiments, the agricultural vehicle 510 may be a combine harvester, another type of harvester, or any other type of agricultural vehicle.

The agricultural vehicle 510 comprises a frame 512, a powertrain 514, the track systems $520_1$-$520_4$, the work implement 598, and an operator cabin 584, which enable an operator to move the agricultural vehicle 510 on the ground and perform agricultural work using the work implement 598. The operator cabin 584 is where the operator sits and controls the agricultural vehicle 510. More particularly, the operator cabin 584 comprises a user interface that allows the operator to steer the agricultural vehicle 510 on the ground and perform agricultural work using the working implement 598.

The working implement 598 is used to perform agricultural work. For example, in some embodiments, the work implement 598 may be a combine head, a cutter, a scraper pan, a tool bar, a planter, or any other type of agricultural work implement.

Each track system $520_i$ may be constructed according to principles described herein in respect of the track systems $20_1$-$20_4$, by comprising a track-engaging assembly 517 and a track 541 disposed around the track-engaging assembly 517, wherein the track-engaging assembly 517 comprises a frame 544 and a plurality of track-contacting wheels which includes a drive wheel 542 and a plurality of idler wheels $550_1$-$550_4$, $555_1$-$555_4$, which includes leading idler wheels $550_1$, $550_4$, trailing idler wheels $550_3$, $550_4$, and support wheels (i.e., mid-rollers) $555_1$-$555_4$, and wherein each of the idler wheels $550_1$-$550_4$, $555_1$-$555_4$ may comprise a non-pneumatic tire 558 and a hub 575 constructed according to principles described herein in respect of the non-pneumatic tire 58 and the hub 75. The non-pneumatic tire 558 comprises an annular beam 536 and an annular support 541 that may be constructed according principles described herein in respect of the annular beam 136 and the annular support 141. For instance, the annular beam 536 comprises a shear band 539 comprising openings 556 and the annular support 541 comprises spokes 543 that may be constructed according to principles described herein in respect of the shear band 139 and the spokes $142_1$-$142_T$. In this embodiment, the shear band 539 comprises intermediate rims 551, 553 between an outer rim 531 and an inner rim 533 such that the openings 556 and interconnecting members 537 are arranged into three circumferential rows between adjacent ones of the rims 531, 551, 553, 533.

In this embodiment, the non-pneumatic tire 558 of each of idler wheels $550_1$-$550_4$, $555_1$-$555_4$, including the mid-rollers $555_1$-$555_4$, may help the idler wheels $550_1$-$550_4$, $555_1$-$555_4$ and the track 541 better accommodate the ground on which the agricultural vehicle 10 travels. For example, in some embodiments, the non-pneumatic tire 558 of each of the idler wheels $550_1$-$550_4$, $555_1$-$555_4$, including the mid-rollers $555_1$-$555_4$, may deflect when the ground is uneven in a widthwise direction of the track system $520_i$. For instance, this may occur when the agricultural vehicle 10 is travelling on uneven soil of an agricultural field and/or travelling (i.e., "roading") on a road (i.e., a paved road having a hard surface of asphalt, concrete, gravel, or other pavement), such as between agricultural fields, where the road has a cross slope (e.g., a "crown") for leading water away from the road (i.e., to avoid water accumulation on the road).

As another example, in some embodiments, track systems constructed according to principles discussed herein in respect of the track systems $20_1$-$20_4$ may be used as part of a construction vehicle (e.g., a loader, a bulldozer, an excavator, a dump truck, etc.), a forestry vehicle, or a military vehicle.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track system for traction of a vehicle, the track system comprising:
   a track for engaging the ground; and
   a track-engaging assembly for driving and guiding the track around the track-engaging assembly, the track-engaging assembly comprising:
      a drive wheel for driving the track; and
      a plurality of idler wheels spaced apart in a longitudinal direction of the track system, front and rear ones of the idler wheels guiding the track at front and rear ends of the track system, each idler wheel comprising a non-pneumatic tire that comprises:
         an annular beam configured to deflect at an area of contact of the non-pneumatic tire with the track and comprising an elastomeric material that constitutes at least a majority of the annular beam, the annular beam comprising a plurality of openings distributed and spaced from one another in a circumferential direction of the non-pneumatic tire, wherein each of the openings extends from a first lateral side of the non-pneumatic tire to a second lateral side of the non-pneumatic tire, and further comprising a plurality of interconnecting members, each interconnecting member extending between consecutive ones of the openings and extending continuously in the circumferential direction between the consecutive ones of the openings; and
         a plurality of spokes disposed radially inwardly of the annular beam and configured to resiliently deform under loading on the idler wheel such that respective ones of the spokes between an axis of rotation of the idler wheel and the area of contact of the non-pneumatic tire with the track are in compression and respective ones of the spokes between the axis of rotation of the idler wheel and a peripheral part of the idler wheel not in contact with the track are in tension.

2. The track system of claim 1, wherein each of the spokes is curved.

3. The track system of claim 1, wherein the annular beam is configured to deflect more by shearing than by bending when the idler wheel encounters an obstacle on the ground.

4. The track system of claim 1, wherein the non-pneumatic tire comprises a tread.

5. The track system of claim 4, wherein the elastomeric material of the annular beam is a first elastomeric material and the tread comprises a second elastomeric material different from the first elastomeric material.

6. The track system of claim 1, wherein a ratio of a width of the non-pneumatic tire over a width of the track is at least 0.2.

7. The track system of claim 1, wherein laterally-spaced ones of the idler wheels are spaced from one another in a widthwise direction of the track system.

8. The track system of claim 7, wherein a sum of widths of two of the laterally-spaced ones of the idler wheels corresponds to at least a majority of a width of the track.

9. The track system of claim 1, wherein a ratio of a mass of the idler wheel over an outer diameter of the idler wheel normalized by a width of the idler wheel is no more than 0.0005 kg/mm².

10. The track system of claim 1, wherein a radial stiffness of the idler wheel is no more than 15 kgf/mm.

11. The track system of claim 1, wherein: the spokes extend from the annular beam to a hub of the idler wheel; and a ratio of a volume occupied by the spokes over a volume bounded by the annular beam and the hub of the idler wheel is no more than 15%.

12. The track system of claim 1, wherein an inner diameter of the non-pneumatic tire is no more than half of an outer diameter of the non-pneumatic tire.

13. The track system of claim 1, wherein the drive wheel is located between axes of rotation of the front and rear ones of the idler wheels in the longitudinal direction of the track system.

14. The track system of claim 1, wherein axes of rotation of the idler wheels are movable relative to an axis of rotation of the drive wheel when the track system moves on the ground.

15. The track system of claim 1, wherein mid-roller ones of the idler wheels are disposed between the front and rear ones of the idler wheels in the longitudinal direction of the track system.

16. The track system of claim 15, wherein each of the front and rear ones of the idler wheels is larger in diameter than a given one of the mid-roller ones of the idler wheels.

17. The track system of claim 16, wherein each of the front and rear ones of the idler wheels is wider than the given one of the mid-roller ones of the idler wheels in a widthwise direction of the track system.

18. A vehicle comprising the track system of claim 1.

19. The track system of claim 1, wherein a ratio of a radial stiffness of the idler wheel over an outer diameter of the idler wheel normalized by a width of the idler wheel is between 0.0001 kgf/mm³ and 0.0002 kgf/mm³.

20. The track system of claim 1, wherein a radial stiffness of the idler wheel is different under different types of loading on the idler wheel.

21. The track system of claim 20, wherein: a first one of the different types of loading on the idler wheel occurs when the track system is operated at lower speed and higher torque than when a second one of the different types of loading on the idler wheel occurs; and the radial stiffness of the idler wheel is greater under the first one of the different types of loading on the idler wheel than under the second one of the different types of loading on the idler wheel.

22. The track system of claim 20, wherein the tension of the track is greater in the first one of the different types of loading on the idler wheel than the second one of the different types of loading on the idler wheel.

23. The track system of claim 22, wherein the second one of the different types of loading on the idler wheel is associated with an impact on the track system.

24. The track system of claim 1, wherein a material of the non-pneumatic tire of a first one of the idler wheels is different from a material of the non-pneumatic tire of a second one of the idler wheels.

25. The track system of claim 1, wherein a material of the annular beam of the non-pneumatic tire of a first one of the idler wheels is different from a material of the annular beam of the non-pneumatic tire of a second one of the idler wheels.

26. The track system of claim 1, wherein a material of the spokes of the non-pneumatic tire of a first one of the idler wheels is different from a material of the spokes of the non-pneumatic tire of a second one of the idler wheels.

27. The track system of claim 1, wherein the non-pneumatic tire is free of any reinforcing layer running in a circumferential direction of the non-pneumatic tire.

28. The track system of claim 1, wherein a spacing of the openings in the circumferential direction of the non-pneumatic tire is less than a dimension of a given one of the openings in the circumferential direction of the non-pneumatic tire.

29. The track system of claim 1, wherein: each idler wheel comprises a hub disposed radially inwardly of the spokes; and the non-pneumatic tire is molded about the hub.

30. The system of claim 29, wherein a material of the hub is different from a material of the spokes.

31. A track system for traction of a vehicle, the track system comprising:
a track for engaging the ground; and
a track-engaging assembly for driving and guiding the track around the track-engaging assembly, the track-engaging assembly comprising:
a drive wheel for driving the track;
front and rear idler wheels spaced apart in a longitudinal direction of the track system for guiding the track at front and rear ends of the track system; and
mid-roller wheels disposed between the front and rear idler wheels in the longitudinal direction of the track system, each mid-roller wheel comprising a non-pneumatic tire and a hub, the non-pneumatic tire comprising an outer annular surface configured to engage the ground track, an inner annular surface opposite to the outer annular surface and facing an axis of rotation of the mid-roller wheel, a plurality of spokes disposed radially inwardly of the inner annular surface and configured to resiliently deform under loading on the mid-roller wheel such that respective ones of the spokes between the axis of rotation of the mid-roller wheel and an area of contact of the non-pneumatic tire with the track are in compression and respective ones of the spokes between the axis of rotation of the mid-roller wheel and a peripheral part of the mid-roller wheel not in contact with the track are in tension, a first lateral surface, and a second lateral surface opposite to the first lateral surface, the non-pneumatic tire comprising an elastomeric material extending from the outer annular surface to the inner annular surface and from the first lateral surface to the second lateral surface, the elastomeric material defining a plurality of openings distributed around the non-pneumatic tire and spaced from one another in a circumferential direction of the non-pneumatic tire, wherein each of the openings extends from the first lateral surface to the second lateral surface, and comprising a plurality of interconnecting members, each interconnecting member extending between consecutive ones of the openings and extending continuously in the circumferential direction between the consecutive ones of the openings, the hub comprising a material different from the elastomeric material, the non-pneumatic tire being molded about the hub.

* * * * *